US012641455B2

(12) United States Patent
Park et al.

(10) Patent No.: US 12,641,455 B2
(45) Date of Patent: May 26, 2026

(54) METHOD AND DEVICE FOR MEASURING INTERFERENCE SIGNAL IN WIRELESS COMMUNICATION SYSTEM

(71) Applicant: Samsung Electronics Co., Ltd., Gyeonggi-do (KR)

(72) Inventors: Jinhyun Park, Gyeonggi-do (KR); Hoondong Noh, Gyeonggi-do (KR); Youngrok Jang, Gyeonggi-do (KR); Hyoungju Ji, Gyeonggi-do (KR); Seungri Jin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 717 days.

(21) Appl. No.: 17/778,114

(22) PCT Filed: Nov. 19, 2020

(86) PCT No.: PCT/KR2020/016410
§ 371 (c)(1),
(2) Date: May 19, 2022

(87) PCT Pub. No.: WO2021/101285
PCT Pub. Date: May 27, 2021

(65) Prior Publication Data
US 2022/0386156 A1      Dec. 1, 2022

(30) Foreign Application Priority Data

Nov. 19, 2019      (KR) ........................ 10-2019-0149119

(51) Int. Cl.
*H04W 24/08*       (2009.01)
*H04L 5/00*        (2006.01)
*H04W 24/10*       (2009.01)
(52) U.S. Cl.
CPC .......... *H04W 24/08* (2013.01); *H04L 5/0048* (2013.01); *H04W 24/10* (2013.01)

(58) Field of Classification Search
CPC .... H04W 24/08; H04W 24/10; H04L 5/0005; H04L 5/0048; H04L 5/14; H04J 11/00; H04B 17/345
See application file for complete search history.

(56) References Cited

U.S. PATENT DOCUMENTS 10,911,166 B2      2/2021   Kwak et al.
2018/0287739 A1*  10/2018   Kim ..................... H04J 11/0023
(Continued)

FOREIGN PATENT DOCUMENTS

KR      1020180070260      6/2018

OTHER PUBLICATIONS

Huawei, HiSilicon, "Leftover Issues on CLI", R2-1915881, 3GPP TSG-RAN WG2 Meeting #108, Nov. 18-22, 2019, 3 pages.
(Continued)

*Primary Examiner* — Marcus Smith
*Assistant Examiner* — Zhaohui Yang
(74) *Attorney, Agent, or Firm* — The Farrell Law Firm, P.C.

(57)            ABSTRACT

An operating method of a first terminal in a wireless communication system may include: receiving at least one configuration information about at least one reference signal transmitted by a second terminal; selecting at least one piece of the at least one configuration information when an uplink bandwidth part of the second terminal and a downlink bandwidth part of the first terminal are different from each other; measuring cross-link interference (CLI) through the reference signal based on the selected configuration information; and reporting a result of the measuring, to the base station.

15 Claims, 19 Drawing Sheets

(56)                References Cited

U.S. PATENT DOCUMENTS

| | | |
|---|---|---|
| 2019/0274155 A1 | 9/2019 | Bhattad et al. |
| 2020/0351690 A1* | 11/2020 | Zhu ..................... H04B 17/318 |
| 2021/0185726 A1* | 6/2021 | Xu ..................... H04W 74/002 |
| 2021/0314987 A1* | 10/2021 | Ericson ................. H04W 72/21 |
| 2021/0351887 A1* | 11/2021 | Qi ........................... H04L 5/005 |
| 2021/0409986 A1* | 12/2021 | Wang .................. H04B 17/309 |

OTHER PUBLICATIONS

LGE, "Introduction of Cross Link Interference (CLI) Handling and Remote Interference Management (RIM)", R2-1916211, 3GPP TSG-RAN2 Meeting #107bis, Nov. 18-22, 2019, 48pgs.
Nokia, Nokia Shanghai Bell, "Remaining Issues on UE CLI Measurements", R2-1914591, 3GPP TSG-RAN2#108, Nov. 18-22, 2019, 8 pages.
Oppo, "Open Issues for CLI Measurement", R2-1914554, 3GPP TSG-RAN WG2 Meeting #108, Nov. 18-22, 2019, 4 pages.
International Search Report dated Feb. 26, 2021 issued in counterpart application No. PCT/KR2020/016410, 15 pages.
LG Electronics Inc., "Report on [106#39][NR/CLI] Measurement Object and Event Triggers", R2-1911352, 3GPP TSG-RAN2 Meeting #107, Aug. 26-30, 2019, 18 pages.
Korean Office Action dated Apr. 21, 2024 issued in counterpart application No. 10-2019-0149119, 6 pages.
MCC Support, Final Report of 3GPP TSG RAN WG1 #98 v1.0.0 (Prague, Czech Rep, Aug. 26-30, 2019), R1-1909942, 3GPP TSG RAN WG1 Meeting #98bis, Oct. 14-18, 2019, 179 pages.
Korean Office Action dated Feb. 24, 2025 issued in counterpart application No. 10-2019-0149119, 8 pages.

* cited by examiner

Duration
4-04

Frequency
resource
4-03

UE
bandwidth
part
4-10

Slot
4-20

Frequency

Time control resource set#1 —4-01 control resource set#2 —4-02

METHOD AND DEVICE FOR MEASURING INTERFERENCE SIGNAL IN WIRELESS COMMUNICATION SYSTEM

PRIORITY

This application is a National Phase Entry of PCT International Application No. PCT/KR2020/016410, which was filed on Nov. 19, 2020, and claims priority to Korean Patent Application No. 10-2019-0149119, which was filed on Nov. 19, 2019, the entire content of each of which is incorporated herein by reference.

TECHNICAL FIELD

The disclosure relates to a wireless communication system, and more particularly, to a method and device for measuring cross-link interference between downlink and uplink.

BACKGROUND ART

In order to meet the increasing demand with respect to wireless data traffic after the commercialization of 4$^{th}$ generation (4G) communication systems, efforts have been made to develop improved 5$^{th}$ generation (5G) communication systems or pre-5G communication systems. For this reason, the 5G communication system or the pre-5G communication system is called a beyond 4G network communication system or a post-long term evolution (LTE) system. In order to achieve a high data rate, consideration is given to implementing 5G communication systems in millimeter wave (mmW) frequency bands (e.g., 60 GHz bands). In order to reduce path loss of radio waves and increase a propagation distance of radio waves in millimeter wave frequency bands, in 5G communication systems, discussions are underway about technologies such as beamforming, massive multiple-input multiple-output (MIMO), full dimensional MIMO (FD-MIMO), array antenna, analog beamforming, and large scale antenna. Also, in order to improve networks of systems, in 5G communication systems, development of technologies such as evolved small cell, advanced small cell, cloud radio access network (cloud RAN), ultra-dense network, device-to-device (D2D) communication, wireless backhaul, moving network, cooperative communication, coordinated multi-points (CoMP), and received-interference cancellation is underway. Furthermore, in 5G communication systems, development of an advanced coding modulation (ACM) scheme such as hybrid frequency-shift keying (FSK) and quadrature amplitude modulation (QAM) modulation (FQAM) or sliding window superposition coding (SWSC) and an enhanced network access scheme such as filter-bank multi-carrier (FBMC), non-orthogonal multiple access (NOMA), or sparse code multiple access (SCMA) is underway.

The Internet has evolved from a human-based connection network, where humans create and consume information, to the Internet of things (IoT), where distributed elements such as objects exchange information with each other to process the information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as sensor network, machine to machine (M2M) communication, or machine-type communication (MTC), has recently been studied. In an IoT environment, intelligent Internet technology (IT) services that collect and analyze data generated by connected objects and create new value in human life may be provided. IoT may be applied to a variety of areas, such as smart homes, smart buildings, smart cities, smart cars or connected cars, smart grid, health care, smart home appliances and advanced medical services through convergence and combination between existing information technologies (IT) and various industrial applications.

Various attempts have been made to apply 5G communication systems to IoT networks. For example, technology such as sensor network, M2M communication, or MTC is implemented by 5G communication technology such as beamforming, MIMO, or array antenna. The application of a cloud RAN as big data processing technology may also be considered as an example of convergence of 5G technology and IoT technology.

In addition, in 5G communication systems, a method of measuring cross-link interference between downlink and uplink, while considering various environments such as dynamic/flexible TDD, full duplex, remote interference management (RIM), or the like has been studied.

DESCRIPTION OF EMBODIMENTS

Technical Problem

The disclosure provides a method and device for increasing accuracy of cross-link interference measurement in a wireless communication system.

Solution to Problem

According to an embodiment of the disclosure, there is provided a method including: receiving, from a base station, configuration with a reference signal and information for measuring cross-link interference; determining, based on the configuration, which of an L1 filter or an L3 filter is used in the cross-link interference measurement; and measuring the cross-link interference based on a result of the determining.

Advantageous Effects of Disclosure

According to the disclosure, when cross-link interference measurement and reporting are performed in a wireless communication system, time/frequency resource information of a reference signal or channel used in measurement of cross-link interference may be shared between transmitting and receiving ends to thereby increase the accuracy of the measurement of cross-link interference.

BRIEF DESCRIPTION OF DRAWINGS

FIG. 13 is a diagram illustrating examples of a cross-link interference measurement scenario according to an embodiment of the disclosure.

FIG. 15 is a diagram illustrating an example of a decrease in accuracy of cross-link interference measurement due to mismatch in bandwidths between uplink and downlink, according to an embodiment of the disclosure.

MODE OF DISCLOSURE

Figure 1:
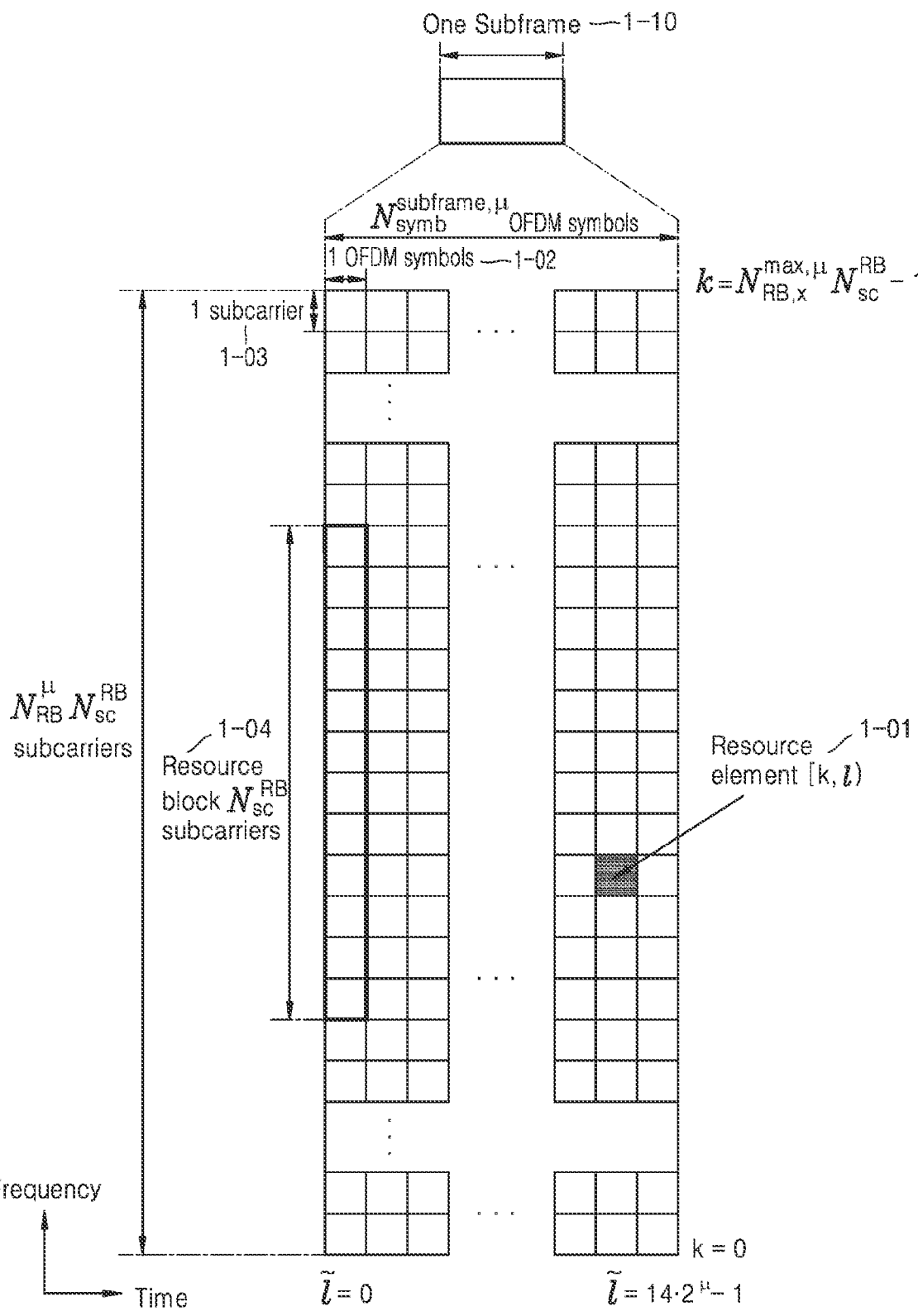
FIG. 1 is a diagram illustrating a basic structure of a time-frequency domain of a wireless communication system according to an embodiment of the disclosure.

Hereinafter, embodiments of the disclosure will be described in detail with reference to the attached drawings.

While describing embodiments of the disclosure, descriptions of techniques that are well known in the art and not directly related to the disclosure are omitted. This is to clearly convey the gist of the disclosure by omitting an unnecessary explanation.

For the same reasons, some elements are exaggerated, omitted, or schematically illustrated in drawings. Also, a size of each element does not entirely reflect a real size of the element. In the drawings, the same or corresponding elements are denoted by the same reference numerals.

The advantages and features of the disclosure and methods of achieving them will become apparent with reference to embodiments of the disclosure described in detail below along with the attached drawings. However, the disclosure may be embodied in many different forms and should not be construed as being limited to the embodiments set forth herein. Rather, these embodiments are provided so that this disclosure will be thorough and complete and will fully convey the concept of the disclosure to those skilled in the art, and the disclosure will only be defined by the appended claims. In the specification, the same reference numerals denote the same elements.

It will be understood that blocks in flowcharts or combinations of the flowcharts may be performed by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s). The computer program instructions may be stored in a computer-executable or computer-readable memory capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

Also, each block of the flowchart illustrations may represent a module, segment, or portion of code, which includes one or more executable instructions for implementing the specified logical function(s). It should also be noted that in some alternative implementations, the functions noted in the blocks may occur out f the order shown. For example, two blocks illustrated successively may actually be executed substantially concurrently, or the blocks may sometimes be performed in a reverse order according to the corresponding function.

As used herein, the term "~unit" means a software component or hardware component such as a field-programmable gate array (FPGA) or an application-specific integrated circuit (ASIC), and performs a specific function. However, "~unit" does not mean to be limited to software or hardware. The term "~unit" may be configured to be in an addressable storage medium or configured to operate one or more processors. Accordingly, for example, the term "~unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. The functionality provided in components and "~units" may be combined into fewer components and "~units" or further separated into additional components and "~units". Further, components and "~units" may be implemented to operate one or more central processing units (CPUs) in a device or a secure multimedia card. As used herein, the "~unit" may include at least one processor.

Hereinafter, embodiments of the disclosure will be described in detail with reference to the attached drawings. In the description of the disclosure, certain detailed explanations of related art are omitted when it is deemed that they may unnecessarily obscure the essence of the disclosure. The terms used herein are those defined in consideration of functions in regard to the disclosure, but the terms may vary according to the intention of users or operators, precedents, etc. Thus, the terms used in the specification should be understood based on the overall description of the disclosure. Hereinafter, a base station is an entity that allocates resources to a terminal and may include at least one of an eNode B, a Node B, a base station (BS), a radio access unit, a base station controller, or a node on a network. The terminal may include a user equipment (UE), a mobile station (MS), a terminal, a cellular phone, a smartphone, a computer, or a multimedia system capable of performing a communication function. However, the disclosure is not limited to the above examples. Hereinafter, a technique for a terminal to receive broadcast information from a base station in a wireless communication system will be described. The disclosure relates to a communication method of converging a 5$^{th}$ generation (5G) communication system for supporting a higher data rate than a 4$^{th}$ generation (4G) system or a post-4G system with Internet of things (IoT) technology, and a system of the communication method. The disclosure may be applied to intelligent services based on 5G communication technology and IoT-related technology (e.g., smart home, smart building, smart city, smart car or connected car, health care, digital education, retail, security, and safety-related services).

In the following description, terms used to indicate broadcast information, terms used to indicate control information, terms related to communication coverage, terms used to indicate a state change, e.g., event, terms used to indicate network entities terms used to indicate messages, terms used to indicate constituent elements of a device, and the like are exemplified for convenience of explanation. Accordingly, the disclosure is not limited to the terms described below, and other terms that refer to objects having equivalent technical meanings can be used.

Hereinafter, for convenience of description, some of terms and names defined by the 3rd Generation Partnership Project Long Term Evolution (3GPP LTE) standard may be used. The disclosure is not, however, limited by the terms and definitions, and may be equally applied to any systems that conform to other standards.

Wireless communication systems providing voice-based services are being developed to broadband wireless communication systems providing high-speed and high-quality packet data services according to communication standards such as high speed packet access (HSPA), long term evolution (LTE) (or evolved universal terrestrial radio access (E-UTRA)), LTE-advanced (LTE-A), and LTE-pro of GPP, high rate packet data (HRPD) and ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL), and employs single carrier-frequency division multiple access (SC-FDMA) for an uplink (UL). The uplink is a radio link through which the terminal (o user equipment (UE)) or a mobile station (MS) transmits data or a control signal to the base station (or an eNode B), and the downlink is a radio link through which the base station transmits data or a control signal to the terminal. The multiple access scheme as described above normally allocates and operates time-frequency resources for carrying data or control information of different users to prevent the time-frequency resources from overlapping with each other, that is, establish orthogonality therebetween, thereby identifying the data or the control information of each user.

As a future communication system after the LTE system, that is, a 5G communication system, has to be able to freely reflect various requirements of a user and a service provider, and thus, services satisfying various requirements need to be supported. Services considered for 5G communication systems include enhanced mobile broadband (eMBB), massive machine type communication (mMTC), and ultra-reliable low-latency communication (URLLC).

According to some embodiments, eMBB may aim to provide a higher data rate than a data rate supported by LTE, LTE-A, or LTE-Pro. For example, in the 5G communication system, eMBB is able to provide a peak data rate of 20 Gbps in a downlink and 10 Gbps in an uplink, in terms of one base station. Simultaneously, eMBB may be able to provide an increased user perceived data rate of a UE. To satisfy the above requirements, the improvement of transmission/receiving technology including more enhanced multi input multi output (MIMO) transmission technology is needed. In addition, it is possible to satisfy the data rate required by the 5G communication system by using a frequency bandwidth wider than 20 MHz in a frequency band of 3 to 6 GHz or 6 GHz or more, instead of the 2 GHz band currently used by LTE.

At the same time, the mMTC is being considered to support application services such as IoT in the 5G communication system. In order for mMTC to efficiently provide the IoT, access by many terminals within a single cell, coverage improvement of a terminal, an increased battery time, a reduction in the cost of a terminal, etc. may be required. The IoT service provides a communication function by using a variety of sensors attached to various devices, and thus needs to support a large number of terminals within a cell (e.g., 1,000,000 terminals/km$^2$). In addition, because terminals supporting mMTC are likely to be located in a dead zone not covered by a cell, e.g., a basement of a building, due to service characteristics, the mMTC service may require a wider coverage compared to other services provided by the 5G systems. A terminal supporting mMTC may be configured as a low-cost terminal, and as it is difficult to frequently exchange the battery of a terminal, a very long battery life time may be required.

Finally, the URLLC that is a cellular-based wireless communication service used for mission-critical purposes needs to provide communication providing ultra-low latency and ultra-high reliability as a service used in remote control for robots or machinery, industrial automation, unmanaged aerial vehicles, remote health care, or emergency alert. For example, the URLLC service needs to satisfy an air interface latency less than 0.5 milliseconds and, at the same time, requires a packet error rate equal to or less than 10$^{-5}$. Accordingly, for the service supporting the URLLC, the 5G communication system is required to provide a transmit time interval (TTI) shorter than those for other services while allocating a broad resource in a frequency band. However, the mMTC, URLLC, and eMBB are examples of different service types, and service types to which the disclosure is applied are not limited thereto.

The services considered in the 5G communication system described above may be converted with each other and provided based on one framework. In other words, for efficient resource management and control, services may be integrated, controlled, and transmitted via one system instead of being independently operated.

Also, although embodiments of the disclosure will be described based on an LTE, LTE-A, LTE Pro, or NR system, the embodiments of the disclosure may be applied to other communication systems having a similar technical background or channel type. The embodiments of the disclosure may be applied to other communication systems through some modifications without departing from the scope of the disclosure based on determination by one of ordinary skill in the art.

The disclosure relates to a method and device for measuring cross-link interference between downlink and uplink.

According to the disclosure, when cross-link interference measurement and reporting are performed in a wireless communication system, the accuracy of cross-link interference measurement may be improvised.

A frame structure of a 5G system will now be described in more detail with reference to the drawings.

FIG. 1 is a diagram illustrating a basic structure of a time-frequency domain of a mobile communication system according to an embodiment of the disclosure.

In FIG. 1, the horizontal axis indicates a time domain, and the vertical axis indicates a frequency domain. A basic resource unit in the time-frequency domain is a resource element (RE) 1-01 and may be defined by one orthogonal frequency division multiplexing (OFDM) symbol 1-02 in a time domain and one subcarrier 1-03 in a frequency axis. In the frequency domain, $$N_{SC}^{RB}$$

(e.g., 12) consecutive REs may constitute a single resource block (RB) 1-04. In an embodiment, a plurality of OFDM symbols may constitute one subframe 1-10.

Figure 2:
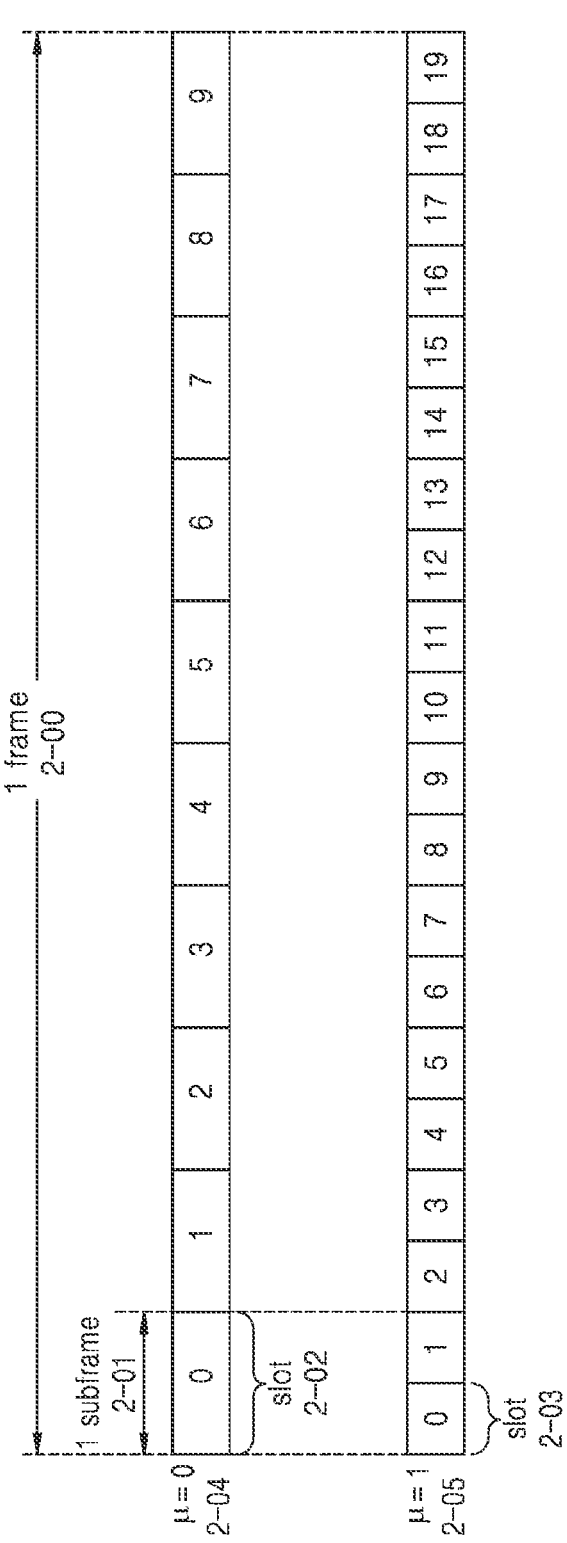
FIG. 2 is a diagram for describing frame, subframe, and slot structures of a wireless communication system, according to an embodiment of the disclosure.

FIG. 2 is a diagram for describing frame, subframe, and slot structures of a mobile communication system, according to an embodiment of the disclosure.

In FIG. 2, illustrated is an example of frame 2-00, subframe 2-01, and slot 2-02 structures. One frame 2-00 may be defined as 10 ms. One subframe 2-01 may be defined as 1 ms, and thus, one frame 2-00 may include a total of 10 subframes 2-01. Also, one slot 2-02 or 2-03 may be defined as 14 OFDM symbols (i.e., the lumber of symbols per $$\text{slot}\left(N_{symb}^{slot}\right) = 14.$$

One subframe 2-01 may include one or more slots 2-02 or 2-03, and the number of slots 2-02 or 2-03 per subframe 2-01 may vary according to a subcarrier spacing configuration value p (2-04 and 2-05). In the example of FIG. 2, the subcarrier spacing configuration values are 0 and 1, i.e., μ=0 (2-04) and μ=1 (2-05). In the case of μ=0 (2-04), one subframe 2-01 may include one slot 2-02, and in the case of μ=1 (2-05), one subframe 2-01 may include two slots 2-03. That is, the number $$N_{slot}^{subframe,\mu}$$

of slots per one subframe may vary according to the set value p for the subcarrier spacing, and thus, the number $$N_{slot}^{frame,\mu}$$

of slots per one frame may vary.

$$N_{slot}^{subframe,\mu} \text{ and } N_{slot}^{frame,\mu}$$

based on the subcarrier spacing configuration value p may be defined as shown in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In an NR system, one component carrier (CC) or serving cell may be composed of up to 250 or more RBs. Accordingly, when a terminal always receives an entire serving cell bandwidth as in the LTE system, power consumption of the terminal may be severe, and to solve this, a base station may configure one or more bandwidth parts (BWPs) for the terminal to support the terminal to change a reception area in cell. In the NR system, the base station may configure, for the terminal, an 'initial BWP' that is a bandwidth of a CORESET #0 (or common search space (CSS)) via a master information block (MIB). Then, the base station may configure the initial BWP (first BWP) of the terminal via RRC signaling, and notify one or more pieces of BWP configuration information that may be indicated via downlink control information (DCI) later. Next, the base station may notify about a BWP ID via the DCI to indicate to the terminal which band to use. When the terminal does not receive the DCI from a currently allocated BWP for a specific period of time or longer, the terminal may return to a 'default BWP' and try to receive the DCI.

Figure 3A:
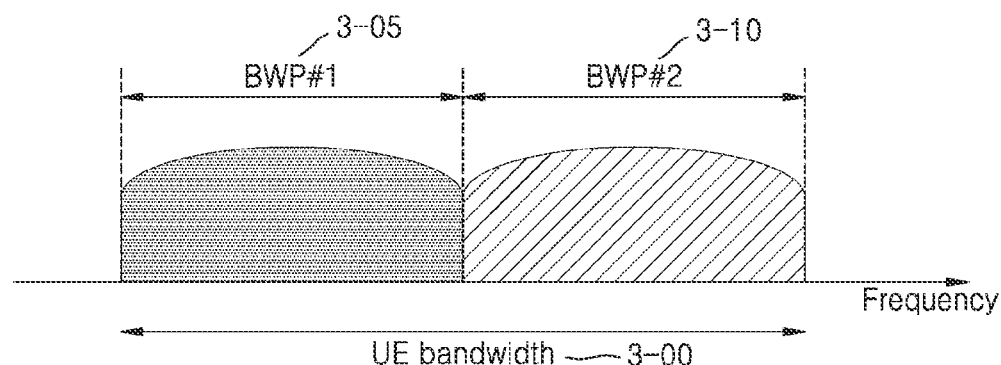
FIG. 3A is a diagram illustrating a configuration example of a bandwidth part (BWP) in a wireless communication system according to an embodiment of the disclosure.

FIG. 3A is a diagram illustrating an example of configuration of a bandwidth part in a wireless communication system, according to an embodiment of the disclosure.

FIG. 3A is a diagram illustrating a BWP configuration in a 5G communication system, according to an embodiment of the disclosure. Referring to FIG. 3A, an example is illustrated, in which a terminal bandwidth 3-00 is configured with two BWPs, i.e., a BWP #1 3-05 and a BWP #2 3-10. A base station may configure one or more BWPs for a terminal and may configure pieces of information as shown in Table 2 below for each BWP.

TABLE 2

| BWP : : = | SEQUENCE { |
|---|---|
| bwp-Id | BWP-Id, |
| (bandwidth part identifier) | |
| locationAndBandwidth | INTEGER (1..65536), |
| (bandwidth part location) | |
| subcarrierSpacing | ENUMERATED {n0, n1, n2, n3, n4, n5}, |
| cyclicPrefix | ENUMERATED {extended} |
| } | |

However, the disclosure is not limited to the above examples, and other various parameters related to BWP than the configuration information described in Table 2 above may be configured for the terminal. The pieces of information described above may be transmitted by a base station to a terminal via higher layer signaling, for example, RRC signaling. At least one BWP from among the configured one or more BWPs may be activated. Whether the configured BWP is to be activated may be semi-statically transmitted from the base station to the terminal through RRC signaling or may be dynamically transmitted through a medium access control (MAC) control element (CE) or DCI.

According to an embodiment, the terminal before radio resource control (RRC) connection may be configured with an initial BWP for initial access through a master information block (MIB) from the base station. In detail, in order to receive system information (e.g., remaining system information (RMSI) or system information block 1 (SIB1)) required for initial access, through a MIB in an initial access stage, the terminal may receive configuration information for a control resource set (CORESET) and a search space, where a physical downlink control channel (PDCCH) may be transmitted. An identity (ID) of a CORESET and a search space configured via the MIB may be considered as 0.

The base station may notify configuration information such as frequency allocation information, time allocation information, and numerology for a CORESET #0 via the MIB to the terminal. Also, the base station may notify configuration informTation for a monitoring period and an occasion for the CORESET #0, that is, configuration information for a search space #0, via the MIB to the terminal. The terminal may consider a frequency domain configured as the CORESET #0 obtained from the MIB, as the initial BWP for initial access. In this case, an ID of the initial BWP may be considered as 0.

A configuration of a BWP supported by the 5G communication systems described above may be used for various purposes.

For example, when a bandwidth supported by the terminal is smaller than a system bandwidth, the bandwidth supported by the terminal may be supported via the configuration of a BWP. For example, by configuring a frequency location (configuration information 2) of a BWP in Table 2 for the terminal, the terminal may transmit/receive data at a specific frequency location in the system bandwidth.

As another example, the base station may configure a plurality of BWPs for the terminal for the purpose of supporting different numerologies. For example, to support data transmission/reception using both subcarrier spacing of 15 kHz and subcarrier spacing of 30 kHz for a terminal, two BWPs may be configured to respectively use the subcarrier spacings of 15 kHz and 30 kHz. Frequency division multiplexing (FDM) may be performed on different BWPs, and when data is to be transmitted/received in a specific subcarrier spacing, a BWP configured at the corresponding subcarrier spacing may be activated.

As another example, the base station may configure BWPs having different sizes of bandwidths for the terminal for a purpose of reducing pow r consumption of the terminal. For example, when the terminal supports a very large bandwidth, for example, a bandwidth of 100 MHz, and always transmits/receives data via the corresponding bandwidth, very large power consumption may occur. In particular, in terms of power consumption, it is very inefficient for the terminal to monitor an unnecessary downlink control channel for a large bandwidth of 100 MHz in a situation where there is no traffic. Accordingly, the base station may configure a BWP of a relative y small bandwidth, for example, a BWP of 20 MHz, for the terminal for a purpose of reducing the power consumption of the terminal. In a situation where there is no traffic, the terminal may perform a monitoring operation in a BWP of 20 MHz, and when data is generated, the terminal may transmit/receive the data by using a BWP of 100 MHz according to an indication by the base station.

In the above method of configuring a BWP, terminal before being RRC-connected may receive configuration information regarding an initial bandwidth part through a master information block (MIB) in an initial access stage. In detail, the terminal may be configured, by an MIB of a physical broadcast channel (PBCH), with a control resource set (CORESET) for a downlink control channel through which downlink control information (DCI) for scheduling a system information block (SIB) may be transmitted. A bandwidth of a CORESET configured by an MIB may be regarded as the initial bandwidth part, and the terminal may receive a PDSCH, through which an SIB is transmitted, via the configured initial bandwidth part. The initial bandwidth part may be used for other system information (OSI), paging, and random access as well as for reception of the SIB.

Figure 3B:
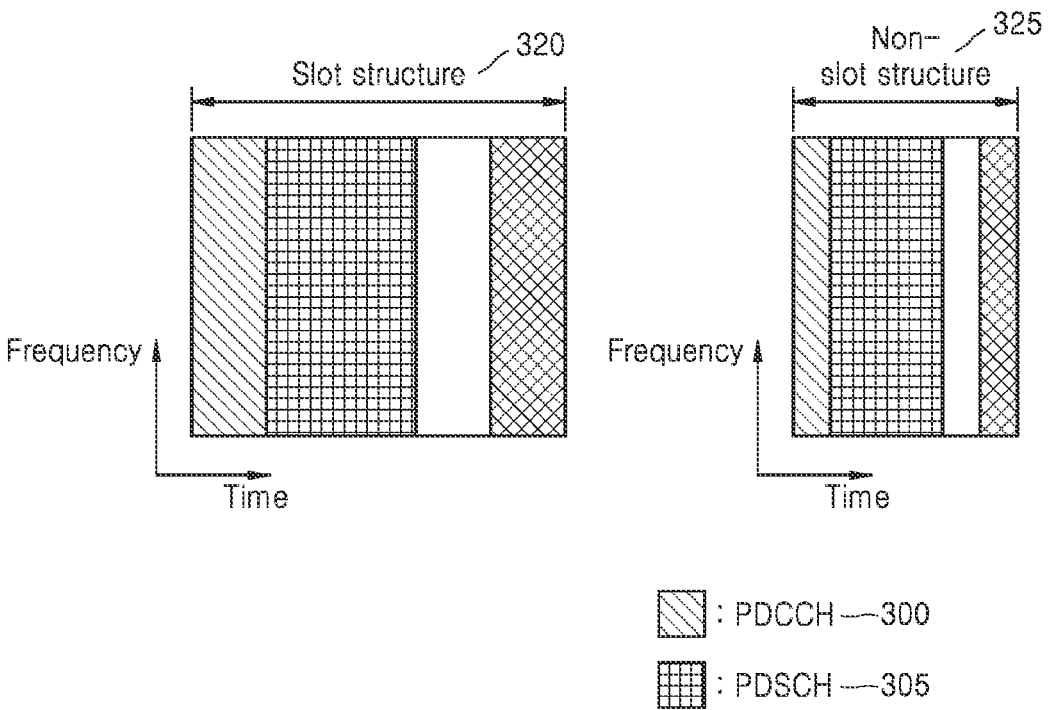
FIG. 3B illustrates an NR slot structure according to an embodiment of the disclosure.

FIG. 3B illustrates a structure of an NR slot structure according to an embodiment of the disclosure.

In an NR system, various slot structures are supported in order to flexibly cope with required capacities of downlink and uplink, which vary according to environments such as time and operation scenarios. Referring to FIG. 3B, in NR, terminals may be configured with slots of various lengths, and the configuration values may include at least one value from among a slot structure 320 consisting of 14 (or 7) OFDM symbols and a non-slot structure 325 consisting of 1, 2, . . . or 7 OFDM symbols. While the non-slot structure 325 is described for convenience of description, the non-slot structure 325 may be expressed using various terms such as a mini slot and a short slot. As described above, a frequency/time resource interval unit configured as a slot or the non-slot structure 325 may be divided, particularly from a time domain view, into a downlink structure (DL only) an up/downlink mixed structure (similar to a LTE special subframe structure), and an uplink structure (UL only). Hereinafter, description will focus on an uplink/downlink mixed structure, which is the most general structure (DL only or UL only may be considered as a special case of UL/DL mixed). In the UL/DL mixed structure, at least one of a DL part, a guard period (GP) 310, and a UL part may be included in one slot or a non-slot structure. The DL part may include a PDCCH 200, a PDSCH 305, and at least one DL RS element among CSI-RS, DL DMRS, etc. Similarly, the UL part may include a PUCCH, a PUSCH 315, and at least one UL RS element among SRS, UL DMRS, etc. Here, the guard period (GP) 310 is a guard period during a transition from DL to UL, and the terminal does not need to perform data transmission/reception during this period, and thus, may perform an operation for UL/DL conversion, such as timing alignment or RF chain conversion.

Hereinafter, a Synchronization Signal (SS)/PBCH bloc of a next-generation mobile communication system (5G or NR system) will be described.

The SS/PBCH block may refer to a physical layer channel block composed of a primary SS (PSS), a secondary SS (SSS), and a PBCH. In detail, the SS/PBCH block may be defined as below.

PSS: a signal serving as a reference for downlink time/frequency synchronization; may provide some information of cell ID.

SSS: serves as a reference for downlink time/frequency synchronization; may provide information of other cell IDs that PSS did not provide. In addition, SSS may act as a reference signal for demodulation of a PBCH.

PBCH: may provide essential system information required for transmission and reception of a data channel and a control channel of a terminal. The essential system information may include search space-related control information indicating radio resource mapping information of a control channel, scheduling control information about a separate data channel for transmitting system information, and the like.

SS/PBCH block: a SS/PBCH block may consist of a combination of PSS, SSS, and PBCH. One or a plurality of SS/PBCH blocks may be transmitted within 5 ms, and each transmitted SS/PBCH block may be distinguished by an index.

The terminal may detect a PSS and an SSS in an initial access stage and may decode a PBCH. The terminal may obtain MIB from a PBCH, and may be configured with CORESET #0 through an MIB. The terminal may perform monitoring on the control region CORESET #0 on the assumption that the selected SS/PBCH block and a demodulation reference signal (DMRS) transmitted in the CORESET #0 is quasi-co located (QCL). The terminal may receive system information based on downlink control information transmitted in CORESET #0. The terminal may obtain random access channel (RACH)-related configuration information required for initial access from the received system information. In consideration of a SS/PBCH index, the terminal may transmit a physical RACH (PRACH) to the base station, and the base station receiving the PRACH may obtain information about the SS/PBCH block index selected by the terminal. The base station may know that which of SS/PBCH blocks the terminal has selected, and that the terminal monitors CORESET #0 corresponding to (or associated with) the SS/PBCH block selected by the terminal.

Hereinafter, downlink control information (hereinafter refer ed to as DCI) in a next-generation mobile communication system (5G or NR system) will be described in detail.

Scheduling information for uplink data (or physical uplink shared channel (PUSCH)) or downlink data (or physical downlink data channel (PDSCH)) in a next-generation mobile communication system (5G or NR system) may be transmitted from the base station to the terminal through DCI. The terminal may monitor a fallback DCI format and a non-fallback DCI format for a PUSCH or a PDSCH. The fallback DCI format may include a fixed field predefined between the base station and the terminal, and the non-fallback DCI format may include a configurable field.

The DCI may be channel-coded and modulated and then be transmitted through a physical downlink control channel (PDCCH). A cyclic redundancy check (CRC) may be attached to a payload of a DCI message and may be scrambled by a radio network temporary identifier (RNTI) corresponding to an identity of the terminal. Different RNTIs may be used for scrambling of CRC attached to a payload of a DCI message, according to the purpose of a DCI message, for example, transmission of UE-specific data, a power control command, a random access response, and the like. In other words, the RNTI may be transmitted not explicitly but included in a CRC calculation process and transmitted. When a DCI message transmitted on a PDCCH is received, the terminal may check CRC by using an allocated RNTI. The terminal may know, based on a CRC check result, that the message has been transmitted to the terminal.

For example, DCI for scheduling a PDSCH for system information (SI) may be scrambled by a system information RNTI (SI-RNTI). DCI for scheduling a PDSCH for a random access response (RAR) message may be scrambled by a random access RNTI (RA-RNTI). DCI for scheduling a PDSCH for a paging message may be scrambled by a paging RNTI (P-RNTI). DCI for notifying a slot format indicator (FI) may be scrambled by an SFI-RNTI. DCI for notifying transmit power control (TPC) may be scrambled by a TPC RNTI. DCI for scheduling a UE-specific PDSCH or PUSCH may be scrambled by a cell RNTI (C-RNTI).

A DCI format 0_0 may be used as fallback DCI for scheduling a PUSCH, and a CRC in this case may be scrambled by a C-RNTI. In an embodiment, the DCI format 0_0 with the CRC scrambled by a C-RNTI may include information as shown in Table 3 below.

TABLE 3

Identifier for DCI formats (DCI format identifier) - [1] bit

Frequency domain resource assignment
$\left\lceil \lceil \log_2 \left( N_{RB}^{UL,BWP} \left( N_{RB}^{UL,BWP} + 1 \right)/2 \right) \rceil \right\rceil$ bits Time domain resource assignment - X bits
Frequency hopping flag - 1 bit
Modulation and coding scheme - 5 bits
New data indicator - 1 bit
Redundancy version - 2 bits
HARQ process number - 4 bits
TPC command for scheduled PUSCH (transmit power control (TPC) command for scheduled PUSCH) - 2 bits
UL/SUL indicator (uplink/supplementary uplink indicator) - 0 or 1 bit A DCI format 0_1 may be used as non-fallback DCI for scheduling a PUSCH, and a CRC in this case may be scrambled by a C-RNTI. In an embodiment, the DCI format 0_1 with the CRC scrambled by a C-RNTI may include information as shown in Table 4 below.

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment For resource allocation type 0, $\left\lceil N_{RB}^{UL,BWP}/P \right\rceil$ bits For resource allocation type 1, $\left\lceil \log_2 \left( N_{RB}^{UL,BWP} \left( N_{RB}^{UL,BWP} + 1 \right)/2 \right) \right\rceil$ bits Time domain resource assignment - 1, 2, 3 or 4 bits
VRB-to-PRB mapping (virtual resource block-to-physical resource block) - 0 or 1 bit, only for resource allocation type 1.
  0 bit if only resource allocation type 0 is configured;
  1 bit otherwise.
Frequency hopping flag- 0 or 1 bit, only for resource allocation type 1.
  0 bit if only resource allocation type 0 is configured,
  1 bit otherwise.
Modulation and coding scheme - 5 bits
New data indicator - 1 bit
Redundancy version - 2 bits
HARQ process number - 4 bits
$1^{st}$ downlink assignment index - 1 or 2 bits
  1 bit for semi-static HARQ-ACK codebook
  2 bits for dynamic HARQ-ACK codebook with single HARQ-ACK codebook TABLE 4-continued $2^{nd}$ downlink assignment index - 0 or 2 bits
    2 bits for dynamic HARQ-ACK codebook with two HARQ-ACK sub
    codebooks;
    0 bits otherwise.
TPC command for scheduled PUSCH- 2 bits
SRS resource indicator -

$$\left\lceil \log_2\left(\sum_{k=1}^{L_{max}}\left(\binom{N_{SRS}}{k}\right)\right)\right\rceil \text{ or } \lceil \log_2 N_{SRS}\rceil \text{ bits}$$

$$\left\lceil \log_2\left(\sum_{k=1}^{L_{max}}\left(\binom{N_{SRS}}{k}\right)\right)\right\rceil$$

bits for non-codebook based PUSCH transmission.
    $\lceil \log_2 N_{SRS}\rceil$ bits for non-codebook based PUSCH transmission.
Precoding information and number of layers - up to 6 bits
Antenna ports - up to 5 bits
SRS request - 2 bits
CSI request - 0, 1, 2, 3, 4, 5 or 6 bits
CBG transmission information - 0, 2, 4, 6 or 8 bits
PTRS-DMRS association - 0 or 2 bits
beta_offset indicator - 0 or 2 bits
DMRS sequence initialization - 0 or 1 bit A DCI format 1_0 may be used as fallback DCI for scheduling a PDSCH, and a CRC in this case may be scrambled by a C-RNTI. In an embodiment, the DCI format 1_0 with the CRC scrambled by a C-RNTI may include information as shown in Table 5 below.

TABLE 5

Identifier for DCI formats (DCI format identifier) - [1] bit
Frequency domain resource assignment
$\left[\left\lceil \log_2\left(N_{RB}^{UL,BWP}\left(N_{RB}^{UL,BWP} + 1\right)/2\right)\right\rceil\right]$bits Time domain resource assignment - X bits
VRB-to-PRB mapping - 1 bit
Modulation and coding scheme - 5 bits
New data indicator - 1 bit
Redundancy version - 2 bits
HARQ process number - 4 bits
Downlink assignment index - 2bits
TPC command for scheduled PUSCH - 2bits
PUCCH resource indicator - 3bits
PDSCH-to-HARQ feedback timing indicator - [3] bits A DCI format 1_1 may be used as non-fallback DCI for scheduling a PDSCH, and a CRC in this case may be scrambled by a C-RNTI. In an embodiment, the DCI format 1_1 with the CRC scrambled by a C-RNTI may include information as shown in Table 6 below.

TABLE 6

Carrier indicator - 0 or 3 bits
Identifier for DCI formats - [1] bits
Bandwidth part indicator - 0 ,1 or 2
Frequency domain resource assignment For resource allocation type 0, $\left\lceil N_{RB}^{DL,BWP}/P\right\rceil$ bits For resource allocation type '1, $\left[\left\lceil \log_2\left(N_{RB}^{DL,BWP}\left(N_{RB}^{DL,BWP} + 1\right)/2\right)\right\rceil\right]$bits Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.

TABLE 6-continued

Figure 4:
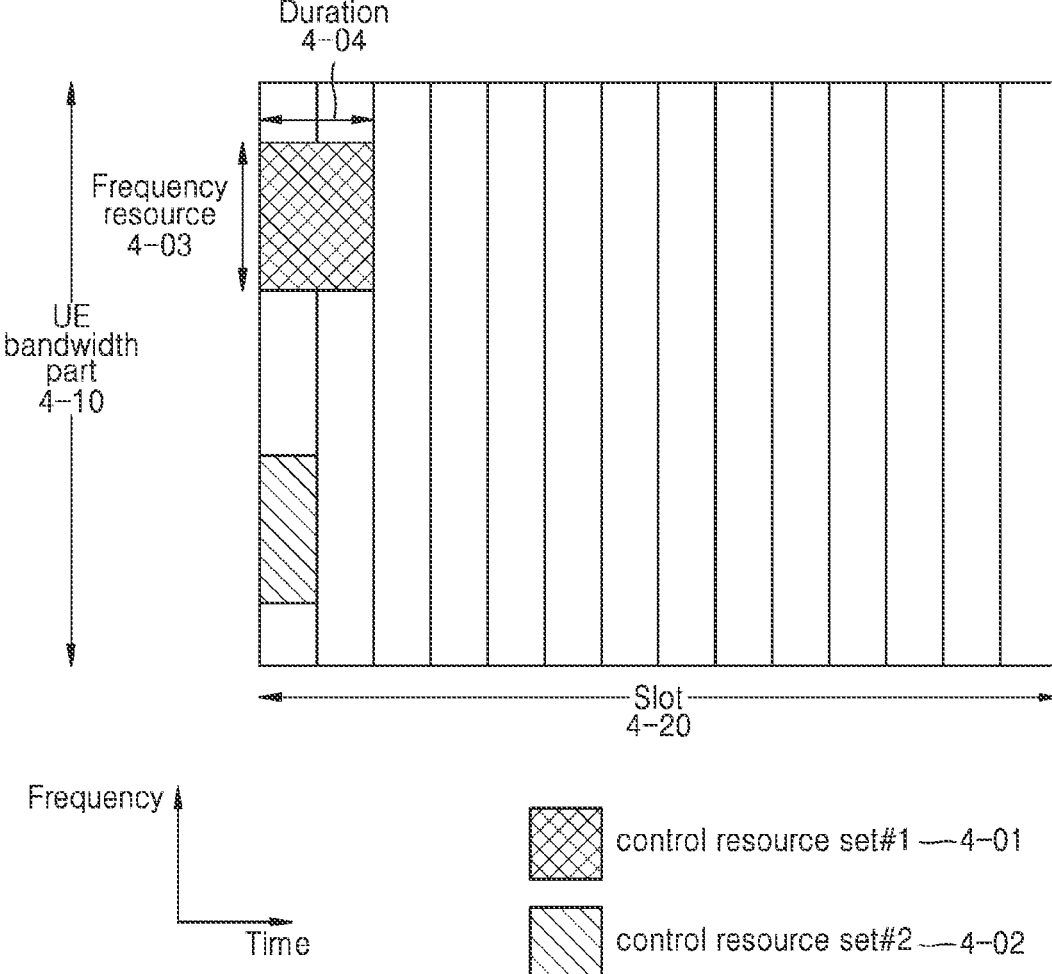
FIG. 4 is a diagram for describing configuration of a control resource set for a downlink control channel in a wireless communication system according to an embodiment of the disclosure.

PRB bundling size indicator - 0 or 1 bit
Rate matching indicator - 0, 1, or 2 bits
ZP CSI-RS trigger - 0, 1, or 2 bits
For transport block 1
    Modulation and coding scheme - 5 bits
    New data indicator - 1 bit
    Redundancy version - 2 bits
For transport block 2
    Modulation and coding scheme - 5 bits
    New data indicator - 1 bit
    Redundancy version - 2 bits
    HARQ process number - 4 bits
    Downlink assignment index - 0 or 2 or 4 bits
    TPC command for scheduled PUSCH - 2 bits
    PUCCH resource indicator - 3 bits
    PDSCH-to-HARQ feedback timing indicator - 3 bits
    SRS request - 2 bits
    CBG transmission information - 0, 2, 4, 6, or 8 bits
    CBG flushing out information - 0 or 1 bit
    DMRS sequence initialization - 1 bit FIG. 4 is a diagram for describing configuration of a CORESET for a downlink control channel in a wireless communication system according to an embodiment of the disclosure.

In detail, FIG. 4 is a diagram illustrating an embodiment of a control resource set (CORESET) in which a downlink control channel is transmitted in a 5G system, according to an embodiment of the disclosure.

Referring to FIG. 4, a UE bandwidth part 4-10 may be configured on a frequency axis, and two CORESETs (CORESET #1 4-01 and CORESET #2 4-02) may be configured in one slot 4-20 on a time domain. The CORE-SETs 4-01 and 4-0 may be configured in a particular frequency resource 5-03 in the entire UE BWP 4-10 on the frequency axis. The CORESETs 4-01 and 4-02 may be configured with one or more OFDM symbols along the time domain, and may be defined by a control resource set duration 4-04. Referring to FIG. 4, a duration of the CORE-SET #1 4-01 may be configured as a CORESET of two symbols, and a duration of the CORESET #2 4-02 may be configured as a CORESET of one symbol.

The CORESET in the 5G or NR system described above may be configured through higher layer signaling between a base station and a terminal (e.g., SI, MIB, or RRC signaling). Configuring the terminal with a CORESET refers to providing the terminal with information such as a CORE-SET identity, a frequency position of the CORESET, a symbol duration of the CORESET, and the like. For example, configuration of a CORESET may include information as shown in Table 7 below.

TABLE 7

```
ControlResourceSet : : =           SEQUENCE {
   -- Corresponds to L1 parameter 'CORESET-ID'
   controlResourceSetId            ControlResourceSetId,
   (control resource set identity)
   frequencyDomainResources        BIT STRING (SIZE (45)),
   (frequency domain resource
   allocation information)
   duration                        INTEGER (1. .maxCoReSetDuration) .
   (time domain resource
   allocation information)
   cce-to-REG mappingType          CHOICE {
   (CCE-to-REG mapping method)
      interleaved                  SEQUENCE {
         reg-BundleSize                ENUMERATED {n2, n3, n6}.
      (REG buudle size )
         precoderGranularity          ENUMERATED {sameAsREG-burdle,
allContiguousRBs},
         interleaverSize              ENUMERATED {n2, n3, n6}
         shiftIndex
   INTEGERC (0. .maxNrofPhysicalResourceBlocks-1)
   OPTIONAL
      ( interleaver shift )
   }.
   noninterleaved                  NULL
   } ,
   tci-StatesPDCCH                 SEQUENCE(SIZE (1..maxNrofTCI-StatesPDCCH))
OF TCI -StateId                    OPTIONAL,
   (QCLconfiguraton
   information)
   tci-PresentInDCI                ENUMERATED {enabled}
                                   OPTIONAL, -- Need S
```

In Table 7, tci-StatesPDCCH (hereinafter referred to as 'TCI state') configuration information may include information about one or more synchronization signal (SS)/physical broadcast channel (PBCH) block indexes or channel state information reference signal (CSI-RS) indexes, which have a quasi co-located (QCL) association with a demodulation reference signal (DMRS) transmitted in the corresponding CORESET. In addition, TCI state configuration information may include information about what association the QCL association indicates. For example, configuration information of a TCI state may include information as shown in Table 8 below.

TABLE 8

```
TCI-State ::=              SEQUENCE {
   tci-StateId            TCI-StateId,
   qcl-Type1              QCL-Info,
   qcl-Type2              QCL-Info                OPTIONAL,
   . . .
}
QCL-Info : : =            SEQUENCE {
   cell {cell index}      ServCellIndex           OPTIONAL,
   bwp-Id {BWP index }    BWP-Id                  OPTIONAL,
   referenceSibnal        •  CHOICE {
   (reference RS index)
      csi-rs                 NZP-CSI-RS-ResourceId,
      ssb                    SSB-Index
      },
   qcl-Type               ENUMERATED
   . . .                  {typeA, typeB, typeC, typeD},
}
```

Referring to the TCI state configuration, together with an index of a reference RS in a QCL association, that is, an SS/PBCH block index or a CSI-RS index, a cell index and/or a BWP index of the reference RS and a QCL type may be configured. A QCL type indicates a channel characteristic assumed to be shared between the reference RS and the CORESET DMRS, and examples of possible QCL types are as follows.

QCL typeA: Doppler shift, Doppler spread, average delay, delay spread.

QCL typeB: Doppler shift, Doppler spread.

QCL typeC: Doppler shift, average delay.

QCL typeD: Spatial Rx parameter.

The TCI state configuration may also be similarly configured, not only for the CORESET DMRS but also for other target RSs, such as PDSCH DMRS and CSI-RS.

However, a detailed description thereof will be omitted so as not to obscure the gist of the description.

Figure 5:
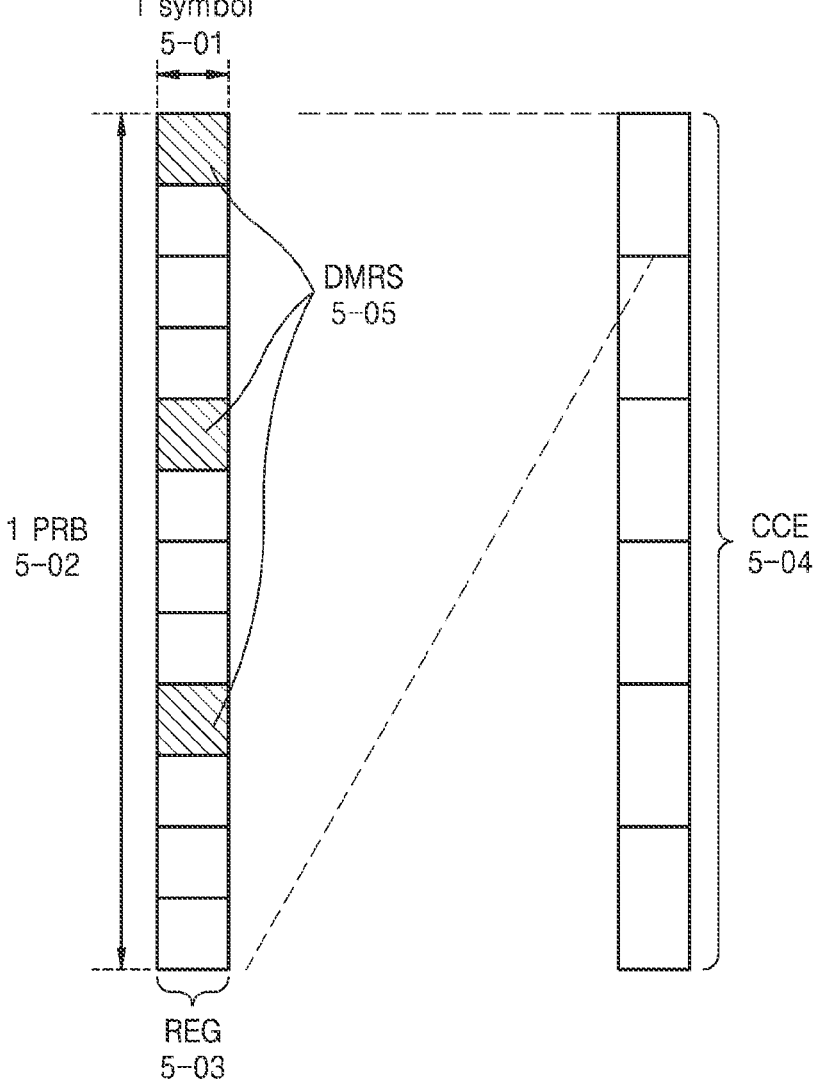
FIG. 5 is a diagram for describing a structure of a downlink control channel structure in a wireless communication system according to an embodiment of the disclosure.

FIG. 5 is a diagram for describing a structure of a downlink control channel structure in a wireless communication system according to an embodiment of the disclosure.

In detail, FIG. 5 is a diagram illustrating an example of a basic unit of time and frequency resources constituting a downlink control channel that is usable in a 5G system, according to an embodiment of the disclosure.

Referring to FIG. 5, a basic unit of time and frequency resources constituting a control channel may be defined as a resource element group (REG) 5-03. The REG 5-03 may be defined as 1 OFDM symbol 5-01 on the time domain and 1 physical resource block (PRB) 5-02 on the frequency axis, that is, 12 subcarriers. The base station may configure a downlink control channel allocation unit by concatenating the REG 5-03.

As illustrated in FIG. 5, when the basic unit to which the downlink control channel is allocated in a 5G system is a control channel element (CCE) 5-04, one CCE 5-04 may include a plurality of REGs 5-03. In the example illustrated in FIG. 5, when the REG 5-03 includes 12 REs and one CCE 5-04 includes 6 REGs 503, one CCE 5-04 may include 72 REs. When a downlink CORESET is configured, the downlink control resource set may include a plurality of CCEs 5-04. A specific downlink control channel may be transmitted by being mapped to one or more CCEs 5-04 according to an aggregation level (AL) in the CORESET. The CCEs 5-04 in the CORESET may be identified by numbers. In this case, the numbers may be allocated to the CCEs 5-04 according to a logical mapping scheme.

The basic unit of the downlink control channel illustrated in FIG. 5, that is, the REG 5-03, may include both of REs to which the DCI is mapped and regions to which a DMRS 5-05, which is a reference signal for decoding the same, is mapped. As illustrated in FIG. 5, three DMRSs 5-05 may be transmitted in one REG 5-03. The number of CCEs required to transmit a PDCCH may be 1, 2, 4, 8, or 16 depending on an aggregation level (AL), and the different numbers of CCEs may be used to implement link adaptation of a downlink control channel. For example, when AL=L, one downlink control channel may be transmitted through L CCEs.

A terminal should detect a signal without knowing information about the downlink control channel, and a search space indicating a set of CCEs for blind decoding may be defined. A search space is a set of downlink control channel candidates consisting of CCEs which a terminal has to try decoding on a given AL. As there are various kinds of ALs for creating one bundle from 1, 2, 4, 8, or 16 CCEs, the terminal may have multiple search spaces. A search space set may be defined as a set of search spaces at all the configured ALs.

The search spaces may be classified into common search spaces and UE-specific search spaces. According to an embodiment of the disclosure, a certain group of terminals or all terminals may search a common search space of a PDCCH in order to receive cell-common control information such as dynamic scheduling for system information or a paging message.

For example, the terminal may receive PDSCH scheduling allocation information for transmission of SIB including operator information of a cell by examining the common search space of the PDCCH. The common search space may be defined as a set of previously appointed CCEs because a certain group of terminals or all the terminals have to receive the PDCCH. The terminal may receive scheduling allocation information for a UE-specific PDSCH or PUSCH by investigating a UE-specific search space of a PDCCH. The UE-specific search space may be UE-specifically defined as a function of various system parameters and an identity of the terminal.

In a 5G system, parameters for a search space of a PDCCH may be configured by a base station in a terminal through higher layer signaling (e.g., SIB, MIB, or RRC signaling). For example, the base station may configure, for the terminal, the number of PDCCH candidates in each of the L ALs, a monitoring period for the search space, a monitoring occasion of a symbol unit within a slot for the search space, a search space type (common search space or UE-specific search space), a combination of a DCI format and RNTI to be monitored in the search space, and a CORESET index for monitoring the search space. For example, the above-described configuration may include information as shown in Table 9 below.

TABLE 9

```
SearchSpace ::=                          SEQUENCE {
    -- identity of the search space. SearchSpaceId = 0 identifies the SearchSpace
configured via PBCH (MIB) or ServingCellConfigCommon.
    searchSpaceId                        SearchSpaceId,
    (searchSpace   )
    identity
    controlResourceSetId                 ControlResourceSetId,
    (control resource set identity   )
    monitoringSlotPeriodicityAndOffset   CHOICE {
    (monitoring slot level periodicity   )
        sl1                                  NULL..
        sl2                                  INTEGER (0..1),
        sl4                                  INTEGER (0..3),
        sl5                                  INTEGER (0..4),
        sl8                                  INTEGER (0..7),
        sl10                                 INTEGER (0..9),
        sl16                                 INTEGER (0..15),
        sl20                                 INTEGER (0..19),
    }
                                         OPTIONAL,
    duration (monitoring duration   )        INTEGER (2..2559),
    monitoringSymbolsWithinSlot              BIT STRING (SIZE (14))
                                         OPTIONAL,
    (monitoring symbols in slot)
    nrofCandidates                       SEQUENCE {
    (numberofPDCCH candidates for
    each aggregation level)
        aggregationLevel1                        ENUMERATED {n0, n1, n2, n3, n4, n5,
                                             n6, n8},
        aggregationLevel2                        ENUMERATED {n0, n1, n2, n3, n4, n5,
                                             n6, n8},
        aggregationLevel4                        ENUMERATED {n0, n1, n2, n3, n4, n5,
                                             n6, n8},
        aggregationLevel8                        ENUMERATED {n0, n1, n2, n3, n4, n5,
                                             n6, n8},
        aggregationLevel16                       ENUMERATED {n0, n1, n2, n3, n4, n5,
                                             n6, n8},
    },
    searchSpaceType                      CHOICE {
    -- Configures this search space as common space (CSS) and DCI formats to
monitor.
        common                               SEQUENCE {
    ( common search space)
        }
```

TABLE 9-continued

```
    ue-Specific                    SEQUENCE {
    (UE-specific search space)
        -- Indicates whether the UE monitors in this USS for DCI formats 0-0 and 1-0
or for formats 0-1 and 1-1.
        formats                    ENUMERATED (formats0-0-And-1-0,
formats s0-1-And-1-1).
        ...
        }
```

The base station may configure for the terminal one or more search space sets based on configuration information. According to an embodiment of the disclosure, the base station may configure search space set 1 and search space set 2 for the terminal, may configure DCI format A scrambled by an X-RNTI in the search space set 1 to be monitored in the common search space, and may configure DCI format B scrambled by a Y-RNTI in the search space set 2 to be monitored in the UE-specific search space.

According to the configuration information, one or more search space sets may exist in the common search space or the UE-specific search space. For example, a search space set #1 and a search space set #2 may be configured in the common search space, and a search space set #3 and a search space set #4 may be configured in the UE-specific search space.

In the common search space, the following combinations of DCI formats and RNTIs may be monitored. However, the disclosure is not limited thereto.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored. However, the UCI is not limited thereto.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI Specified RNTIs may comply with the following definitions and uses.

C-RNTI (Cell RNTI): used for UE-specific PDSCH scheduling

TC-RNTI (Temporary Cell RNTI): used for UE-specific PDSCH scheduling

CS-RNTI (Configured Scheduling RNTI): used for semi-statically configured UE-specific PDSCH scheduling RA-RNTI (Random Access RNTI): used for PDSCH scheduling in a random access process P-RNTI (Paging RNTI): used for scheduling a PDSCH on which paging is transmitted SI-RNTI (System Information RNTI): used for scheduling a PDSCH on which system information is transmitted INT-RNTI (Interruption RNTI): used for indicating whether to puncture the PDSCH TPC-PUSCH-RNTI (Transmit Power Control for PUSCH RNTI): used for indicating power control command for a PUSCH TPC-PUCCH-RNTI (Transmit Power Control for PUCCH RNTI): used for indicating power control command for a PUCCH TPC-SRS-RNTI (Transmit Power Control for SRS RNTI): used for indicating power control command for an SRS In an embodiment, the DCI formats described above may be defined as in Table 10 below.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the U |
| 2_2 | Transmission of TPC commands for PUCCH and PUSCH |
| 2_3 | Transmission of a group of TPC commands for SRS transmissions by one or more UEs |

According to an embodiment of the disclosure, in a 5G system, a plurality of search space sets may be configured with different parameters (e.g., parameters of Table 8). Accordingly, a set of search space sets monitored by the terminal at every time point may be different. For example, when the search space set #1 is configured with an X-slot period, and the search space set #2 is configured with a Y-slot period, and X and Y are different from each other, the terminal may monitor both the sear h space set #1 and the search space set #2 in a certain slot, and may monitor one of the search space set #1 and the search space set #2 in a certain slot.

When a plurality of search space sets are configured for the terminal, in order to determine a search space set to be monitored by the terminal, following conditions may be considered.

[Condition 1: Limit the Maximum Number of PDCCH Candidates]

The number of PDCCH candidates that may be monitored per slot may not exceed Mu. Mu may be defined as the maximum number of PDC H candidates per slot in a cell configured with a subcarrier spacing of $15 \cdot 2^\mu$ kHz, and may be defined as shown in Table 11 below.

TABLE 11

| μ | Maximum number of PDCCH candidates per slot and per serving cell ($M^\mu$) |
|---|---|
| 0 | 44 |
| 1 | 36 |
| 2 | 22 |
| 3 | 20 |

[Condition 2: Limit the Maximum Number of CCEs]

The number of CCEs constituting the entire search space per slot (here, the entire search space may refer to an entire CCE set corresponding to a union region of a plurality of search space sets) may not exceed $C_\mu$. $C_\mu$ may be defined as the maximum number of CCEs per slot in a cell configured with a subcarrier spacing of $15 \cdot 2^\mu$ kHz, and may be defined as shown in Table 12 below.

TABLE 12

| μ | Maximum number of CCEs per slot and per serving cell ($C^\mu$) |
|---|---|
| 0 | 56 |
| 1 | 56 |
| 2 | 48 |
| 3 | 32 |

For convenience of description, a situation in which both Conditions 1 and 2 above are satisfied at a specific time point may be defined as "Condition A" as an example. Accordingly, when Condition A is not satisfied, it may mean that at least one of Conditions 1 and 2 above is satisfied.

According to the configuration of the search space sets of the base station, Condition A may not be satisfied at a specific time point. When Condition A is not satisfied at a specific time point, the terminal may select and monitor only some of the search space sets configured to satisfy Condition A at the corresponding time point, and the base station may transmit a PDCCH to the selected search space set.

According to an embodiment of the disclosure, a method as below may be used as a method of selecting some search spaces from among all of configured search space sets.

When Condition A for a PDCCH is not satisfied at a specific time point (slot), the terminal (or the base station) may preferentially select a search space set in which a search space type is configured as a common search space among search space sets existing at the corresponding time point, in preference to a search space set configured as a UE-specific search space.

When all search space sets configured as a common search space are selected (that is, Condition A is satisfied even after selecting all search spaces configured as the common search space), the terminal (or the base station) may select search space sets configured as UE-specific search spaces. Here, when there are a plurality of search space sets configured as the UE-specific search space, a search space set having a low search space set index may have a higher priority. Considering the priority, the terminal or the base station may select UE-specific search space sets within a range in which Condition A is satisfied.

Methods of allocating time and frequency resources for data transmission in an NR (or 5G) system are described below.

In an NR (or 5G) system, specific frequency domain resource allocation (FD-RA) methods as below may be provided in addition to frequency-axis resource candidate allocation through BWP indication.

Figure 6:
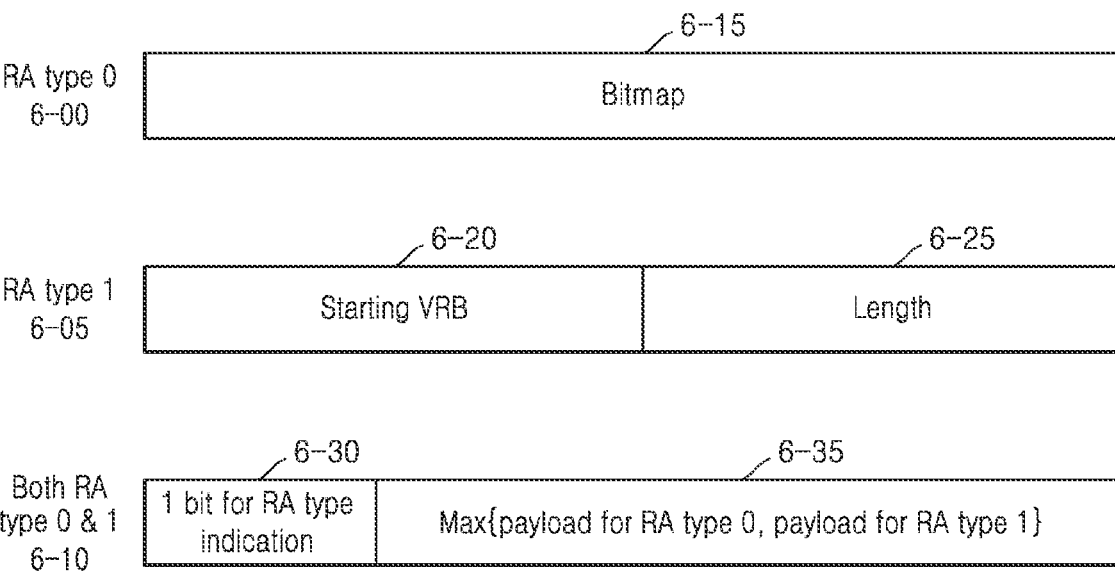
FIG. 6 is a diagram illustrating an example of frequency axis resource allocation of a physical downlink hared channel (PDSCH) in a wireless communication system according to an embodiment of the disclosure.

FIG. 6 is a diagram illustrating an example of frequency-axis resource allocation of a PDSCH in a wireless communication system according to an embodiment of the disclosure.

In detail, FIG. 6 illustrates type 0 (6-00) and type 1 (6-05), which are configurable through higher layer in an NR (5G) system, and three frequency-axis resource allocation methods of dynamic switch 6-10.

Referring to FIG. 6, when a terminal is configured to use only resource type 0, through higher layer signaling (6-00), some downlink control information (DCI) for allocating PDSCH to the terminal has a bitmap consisting of NRBG bits. The conditions for the above will be described again later. Here, NRBG refers to the number of resource block groups (RBGs) determined as shown in Table 13 below according to a BWP size allocated by a BWP indicator and a higher layer parameter rbg-Size, and data is transmitted on RBG indicated as 1 by the bitmap.

TABLE 13

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the terminal is configured to use only resource type 1, through higher layer signaling (6-05), some DCI for allocating PDSCH to the terminal has frequency-axis resource allocation information consisting of $$\lceil \log_2(N_{RB}^{DL,BWP}(N_{RB}^{DL,BWP} + 1)/2 \rceil \text{ bits.}$$

The conditions for the above will be described again later. The base station may accordingly configure a starting virtual resource block (VRB) 6-20 and a length 6-25 of a frequency-axis resource continuously allocated therefrom.

When the terminal is configured to use both resource type 0 and resource type 1, through higher layer signaling (6-10), some DCI for allocating PDSCH to the terminal has frequency-axis resource allocation information consisting of bits of a greater value 6-35 among a payload 6-15 for configuring resource type 0 and payloads 6-20 and 6-25 for configuring resource type 1. The conditions for the above will be described again later. Here, one bit may be added to a most significant byte (MSB) of frequency-axis resource allocation information in DCI, and when the corresponding bit is 0, it may be indicated that resource type 0 is used, and when the corresponding bit is 1, it may be indicated that resource type 1 is used.

A time-domain resource allocation method for a data channel in a next-generation mobile communication system (5G or NR system) is described below.

A base station may configure, for a terminal via higher layer signaling (for example, RRC signaling), a table about time domain resource allocation information for a PDSCH and a PUSCH. For the PDSCH, a table consisting of up to maxNrofDL–Allocations=16 entries may be configured, and for the PUSCH, a table consisting of up to maxNrofUL–Allocations=16 entries may be configured. In an embodiment, the time domain resource allocation information may include a PDCCH-to-PDSCH slot timing (corresponding to a time interval in a slot unit between a time point when the PDCCH is received and a time point when the PDSCH scheduled by the received PDCCH is transmitted, and marked as $K_0$), a PDCCH-to-PUSCH slot timing (corresponding to a time interval in a slot unit between a time point when the PDCCH is received and a time point when the PUSCH scheduled by the received PDCCH is transmitted, and marked as $K_2$), information about a location and length of a start symbol where the PDSCH or PUS CH is scheduled within a slot, and a mapping type of the PDCH or PUSCH. For example, a plurality of pieces of information as shown in Table 14 or Table 15 may be notified by the base station to the terminal.

TABLE 14

| PDSCH-TimeDomainResourceAllocationList information element |
| --- |

```
PDSCH-TimeDomainResourceAllocationList ::=   SEQUENCE (SIZE(1..maxNrofDL-Allocations))
OF PDSCH-TimeDomainResourceAllocation
PDSCH-TimeDomainResourceAllocation :=         SEQUENCE {
   k0                                            INTEGER(0..32)
OPTIONAL,   -- Need S
   (PDCCH-to-PDSCH timing, slot unit   )
mappingType                                    ENUMERATED {typeA, typeB},
   (PDSCH mapping
          type)
startSymbolAndLength                           INTEGER (0..127)
(start symbol and length of
   PDSCH)
}
```

TABLE 15

| PUSCH-TimeDomainResourceAllocation information element |
| --- |

```
PUSCH-TimeDomainResourceAllocationList ::=      SEQUENCE
(SIZE(1. .maxNrof(UL-Allocations)) OF PUSCH-TimeDomainResourceAllocation
PUSCH-TimeDomainResourceAllocation :: =   SEQUENCE {
   k2                                       INTEGER(0..32)         OPTIONAL,   --
Need S
   (PDCCH-to-PUSCH timing, slot unit)
   mappingType                              ENUMERATED {typeA, typeB},
   (PUSCH mapping type)
   startSymbolAndLength                     INTEGER (0..127)
   (start symbol and length of
      PUSCH)
}
```

The base station may notify the terminal of one of the entries in the table of the time domain resource allocation information, via L1 signaling (for example, DCI) (for example, indicated via a 'time domain resource allocation' field within DCI). The terminal may obtain the time domain resource allocation information for the PDSCH or PUSCH, based on the DCI received from the base station.

Figure 7:
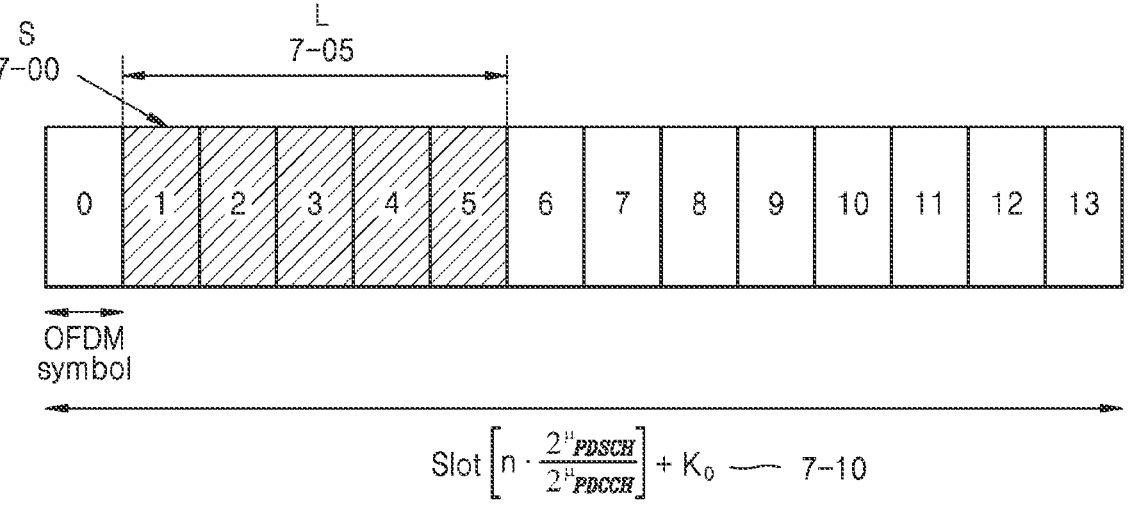
FIG. 7 is a diagram illustrating an example of time domain resource allocation of a PDSCH in a wireless communication system according to an embodiment of the disclosure.

FIG. 7 is a diagram illustrating an example of PDSCH time domain resource allocation in a wireless communication system according to an embodiment of the disclosure.

Referring to FIG. 7, the base station may indicate a time domain location of PDSCH resources, according to subcarrier spacings (SCS) ($\mu_{PDSCH}$, $\mu_{PDCCH}$) of a data channel and a control channel configured by using a higher layer, a scheduling offset $K_0$ value, and an OFDM symbol start position 7-00 and a length 7-05 in one slot dynamically indicated through DCI.

Figure 8:
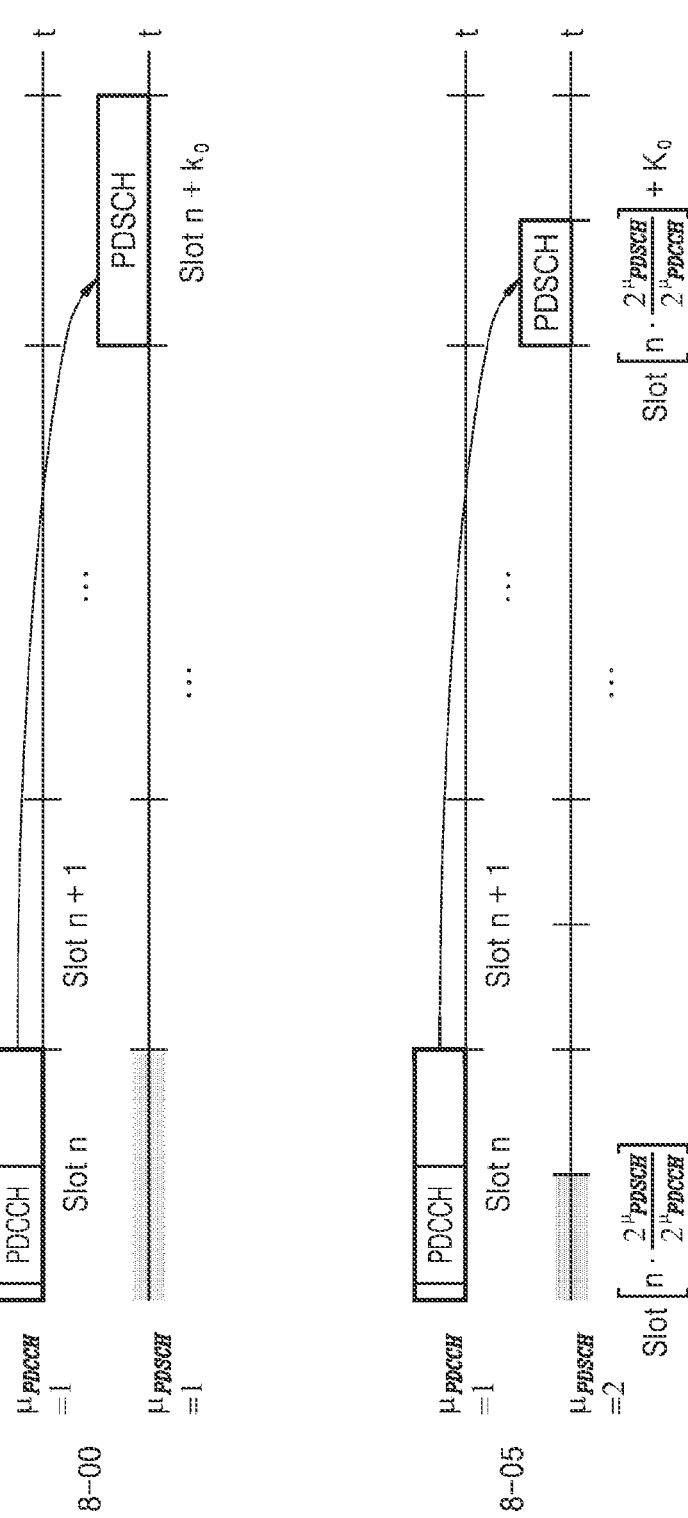
FIG. 8 is a diagram illustrating an example of time domain time domain resource allocation according to sub-carrier spacings of a data channel and a control channel in a wireless communication system according to an embodiment of the disclosure.

FIG. 8 is a diagram illustrating an example of time domain resource allocation according to subcarrier spacings of a data channel and a control channel in a wireless communication system according to an embodiment of the disclosure.

Referring to FIG. 8, when the subcarrier spacings of the data channel and the control channel are the same (8-00, $\mu_{PDSCH}=\mu_{PDCCH}$), the slot numbers for data and control are the same, and thus, the base station and the terminal may know that scheduling offset occurs in accordance with a predefined slot offset $K_0$. On the other hand, when the subcarrier spacings of the data channel and the control channel are different (8-05, $\mu_{PDSCH}\neq\mu_{PDCCH}$), the slot numbers for data and control are different, and thus, the base station and the terminal may know that scheduling offset occurs in accordance with the predefined slot offset $K_0$ based on a subcarrier spacing of a PDCCH.

In an LTE system or an NR system, the terminal may perform a procedure for reporting capability supported by the terminal, to the corresponding base station, while connected to a serving base station. In the description below, this is referred to as a UE capability (report).

The base station may transmit a UE capability enquiry message for requesting a capability report to the terminal in a connected state. The UE capability enquiry message may include a UE capability request for each Radio Access Technology (RAT) type of the base station. The request for each RAT type may include requested frequency band information. In addition, in the case of the UE capability enquiry message, one RRC message container may request UE capability for a plurality of RAT types, or the base station may include a UE capability enquiry message including a UE capability request for each RAT type, a plurality of times, and transmit the same to the terminal. That is, the UE capability enquiry may be repeated a plurality of times, and the terminal may configure a corresponding UE capability information message and report the same a plurality of times. In a wireless communication system, UE capability for multi-RAT dual connectivity (MR-DC) including NR, LTE, and E-UTRA-NR dual connectivity (EN-DC) may be requested. In addition, the UE capability enquiry message is gene ally transmitted initially after the terminal is connected to the base station, but when the base station requires, the message may be requested under any conditions.

Upon receiving a UE capability report request from the base station, the terminal may configure UE capability according to a RAT type and band information requested by the base station. A method for a terminal to configure UE capability in the NR system is as follows.

1. When the terminal receives a list of LTE and/or NR bands upon a UE capability request from the base station, the terminal configures a band combination (BC) for EN-DC and NR stand alone (SA). That is, the terminal configures a candidate list of BC for EN-DC and NR SA based on bands requested by the base station through FreqBandList. In addition, the bands have priorities in the order described in the FreqBandList.

2. When the base station has set a "eutra-nr-only" flag or an "eutra" flag and requested UE capability report, the terminal completely removes those related to NR SA BCs from the configured BC candidate list. The operation as above may occur only when an LTE base station (eNB) requests "eutra" capability.

3. Next, the terminal removes fallback BCs from the configured BC candidate list. The fallback BCs refer to BCs that may be obtained by removing a band corresponding to at least one SCell in an arbitrary BC, and a BC may cover already fallback BC before removing the band corresponding to at least one SCell, and thus the fallback BC may be omitted. The above operation is also applied to MR-DC, that is, may also be applied to LTE bands. BCs remaining after the above operation are a final "candidate BC list".

4. The terminal may select BCs that are suitable for a requested RAT type in the final "candidate BC list" and select BCs to be reported. In this operation, the terminal configures supportedBandCombinationList in a set order. That is, the terminal configures BC and UE capability to be reported according to a preset order of rat-Types. (nr→eutra-nr→eutra). In addition, the terminal configures a feature-SetCombination for the configured supportedBandCombinationList, and configures a list of "candidate feature set combination" in the candidate BC list from which the list for fall ack BC (including the capability of the same or lower level) is removed. "Candidate feature set combination" includes both feature set combinations for NR and EUTRA-NR BC, and may be obtained from a feature set combination of UE-NR-Capabilities and UE-MRDC-Capabilities containers.

5. Also, when a requested rat Type is eutra-nr and has an impact, featureSetCombinations is included in both containers of UE-MRDC-Capabilities and UE-NR-Capabilities. However, the feature set of NR includes only UE NR-Capabilities.

After the UE capability is configured, the terminal transmits a UE capability information message including the UE capability to the base station. The base station then performs scheduling and transmission/reception management appropriate for a corresponding terminal based on the UE capability received from the terminal.

In NR, the terminal transmits uplink control information (UCI) to the base station through a physical uplink control channel (PUCCH). The control it formation may include at least one of HARQ-ACK indicating whether demodulation/decoding for a transport block (TB) received by the terminal through a PDSCH is successful, a scheduling request (SR) by the terminal requesting resource allocation from a PUSCH base station for uplink data transmission, and channel state information (CSI), which is information for reporting a channel state of the terminal.

PUCCH resources may be largely divided into a long PUCCH and a short PUCCH according to a length of an allocated symbol. In NR, a long PUCCH has a length of 4 symbols or more in a slot, and a short PUCCH has a length of 2 symbols or less in a slot.

To describe the long PUCCH in more detail, the long PUCCH may be used for the purpose of improving uplink cell coverage, and thus may be transmitted in a DFT-S-OFDM scheme, which is a single carrier transmission rather than OFDM transmission. The long PUCCH supports transport formats such as PUCCH format 1, PUCCH format 3, and PUCCH format 4 according to the number of supportable control information bits and whether terminal multiplexing is supported through Pre-DFT OCC support at the front stage of IFFT.

First, PUCCH format 1 is a DFT-S-OFDM-based long PUCCH format capable of supporting up to 2 bits of control information, and uses frequency resources corresponding to 1RB. The control information may include each or a combination of HARQ-ACK and SR. In PUCCH format 1, an OFDM symbol including a DeModulation Reference Signal (DMRS), which is a demodulation reference signal (or reference signal), and an OFDM symbol including UCI are repeatedly configured.

For example, when the number of transmission symbols of PUCCH format 1 is 8 symbols, in sequence from the first start symbol of the 8 symbols, PUCCH format 1 may include a DMRS symbol, an Uplink Control Information (UCI) symbol, a DMRS symbol, a UCI symbol, a DMRS symbol, a UCI symbol, a DMRS symbol, and a UCI symbol. The DMRS symbol has a structure in which a sequence corresponding to a length of one RB on the frequency domain is spread by using an orthogonal code (or an orthogonal sequence or spreading code w_i(m)) on the time domain within one OFDM symbol and is transmitted after IFFT is performed thereon.

The UCI symbol may be generated as below. The terminal may generate d(0) by performing BPSK modulation on 1-bit control information and QPSK modulation on 2-bit control information, perform scrambling by multiplying the generated d(0) by a sequence corresponding to a length of 1 RB on the frequency domain, and spread the scrambled sequence by using an orthogonal code (or an orthogonal sequence or spreading code w_i(m)) on the time domain and transmit the sequence after IFFT is performed thereon.

The terminal generates a sequence based on the set ID and group hopping or sequence hopping configuration set by the higher layer signal from the base station, and generates a sequence corresponding to a length of 1 RB by cyclic-shifting the generated sequence with an initial cyclic shift (CS) value configured by a higher layer signal.

wi(m) is determined as $$w_i(m) = e^{\frac{j2\pi\varphi(m)}{N_{SF}}}$$

when a length NSF of a spreading code when a length NSF of a spreading code is given, and is given as Table 16 below in detail. i represents the index of the spreading code itself, and m represents the indices of elements of the spreading code. Here, the numbers in [ ] in Table 16 denote φ(m), and for example, when a length of a spreading code is 2, and an index i=0 of a configured spreading code, the spreading code wi(m) is $w_i(0)=e^{j2\pi\cdot 0/N_{SF}}=1$, $w_i(1)=e^{j2\pi\cdot 0/N_{SF}}=1$, and thus, wi(m)=[1 1].

TABLE 16

| $N_{SF}$ i = 0 | i = 1 | i = 2 | i = 3 | i = 4 | i = 5 | i = 6 |
|---|---|---|---|---|---|---|
| spreading code $w_i(m) = e^{j2\pi(m)/N_{SF}}$ for PUCCH format 1 | | | | | | |
| $\phi(m)$ | | | | | | |
| 1 [0] | — | — | — | — | — | — |
| 2 [0 0] | [0 1] | — | — | — | — | — |
| 3 [0 0 0] | [0 1 2] | [0 2 1] | — | — | — | — |
| 4 [0 0 0 0] | [0 2 0 2] | [0 0 2 2] | [0 2 2 0] | — | — | — |
| 5 [0 0 0 0 0] | [0 1 2 3 4] | [0 2 4 1 3] | [0 3 1 4 2] | [0 4 3 2 1] | — | — |
| 6 [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

Next, PUCCH format 3 is a long PUCCH format based on DFT-S-OFDM capable of supporting more than 2 bits of control information, and the number of RBs to be used may be configured by a higher layer. The control information may include each or a combination of HARQ-ACK, SR, and CSI. In PUCCH format 3, DMRS symbol positions are presented in Table 17 according to whether frequency hopping is performed in a slot and whether additional DMRS symbols are configured.

and an uplink centric slot, and transmitted, in general, from the last symbol of the slot or an OFDM symbol at the rear (e.g., the last OFDM symbol or a second-to-last OFDM symbol, or the last two OFDM symbols). Of course, the short PUCCH may be transmitted at any position within the slot. The short PUCCH may be transmitted by using one OFDM symbol, or two OFDM symbols. The short PUCCH may be used for delay time reduction compared to a long

TABLE 17

| PUCCH format | additional DMRS not configured | | additional DMRS configured | |
|---|---|---|---|---|
| 3/4 transmission length | frequency hopping not configured | frequency hopping configured | frequency hopping not configured | frequency hopping configured |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

DMRS location within PUCCH 3/4 transmission

For example, when the number of transmission symbols of PUCCH format 3 is eight, the DMRS is transmitted on the first symbol and the fifth symbol, while starting from the first start symbol of the eight symbols as 0. Table 17 is also applied to the DMRS symbol positions of PUCCH format 4 in the same manner.

Next, PUCCH format 4 is a long DFT-S-OFDM-based long PUCCH format capable of supporting up to 2 bits of control information, and uses frequency resources corresponding to 1 RB. The control information may include each or a combination of HARQ-ACK, SR, and CSI. PUCCH format 4 differs from PUCCH format 3 in that, in the case of PUCCH format 4, PUCCH format 4 of multiple terminals may be multiplexed within one RB. PUCCH format 4 of multiple terminals may be multiplexed by applying Pre-DFT OCC to control information at the front stage of the IFFT. However, the number of symbols of one terminal for transmitting control information is reduced according to the number of multiplexed terminals. The number of multiplexable terminals, that is, the number of different available orthogonal cover codes (OCCs) may be 2 or 4, and the number of OCCs and an OCC index to be applied may be set through a higher layer.

Next, the short PUCCH will be described. The short PUCCH may be transmitted on both a downlink centric slot PUCCH in a situation with good uplink cell coverage, and is transmitted using a CP-OFDM metho.

The short PUCCH supports transmission formats such as PUCCH format 0 and PUCCH format 2 according to the number of supportable bits of control information. First, PUCCH format 0 is a short PUCCH format capable of supporting up to 2 bits of control information, and uses frequency resources corresponding to 1 RB. The control information may include each or a combination of HARQ-ACK and SR. PUCCH format 0 has a structure in which DMRS is not transmitted and only a sequence mapped to 12 subcarriers on the frequency domain within one OFDM symbol is transmitted. The terminal generates a sequence based on the set ID and group hopping or sequence hopping configuration set by the higher layer signal from the base station, cyclic-shifts the generated sequence with a final CS obtained by adding a CS value according to ACK or NACK to an indicated initial CS value, maps the sequence to 12 subcarriers, and transmits the mapped sequence.

For example, when HARQ-ACK is 1 bit, when HARQ-ACK is ACK as shown in Table 18, the terminal may add 6 to the initial CS value to generate the final CS, and when HARQ-ACK is NACK, the terminal may add 0 to the initial CS to generate the final CS. 0 that is the CS value for NACK and 6 that is the CS value for CK are defined in the standard, and the terminal may always generate PUCCH format 0 according to the above value defined in the standard and transmit 1-bit HARQ-ACK.

TABLE 18

| 1 bit HARQ-ACK | NACK | ACK |
|---|---|---|
| final CS | (initial CS + 0) mod 12 = initial CS | (initial CS + 6) mod 12 |

For example, in the case in which HARQ-ACK is 2 bits, as shown in Table 19, the terminal may add 0 to the initial CS value when (NACK, NACK), add 3 to the initial CS value when (NACK, ACK), add 6 to the initial CS value when (ACK, ACK), and add 9 to the initial CS value when (ACK, NACK). 0 that is the CS value for (NACK, NACK), 3 that is the CS value for (NACK, ACK), 6 that is the CS value for (ACK, ACK), and 9 that is the CS value for (ACK, Next, PUCCH format 1 is a short PUCCH format capable of supporting up to 2 bits of control information, and the number of RBs to be used may be configured by a higher layer. The control information may include each or a combination of HARQ-ACK, SR, and CSI. In PUCCH format 2, when the position of the subcarrier on which the DMRS is transmitted within one OFDM symbol may be fixed to subcarriers having indices of #1, #4, #7, and #10 when the index of the first subcarrier is #0. Control information is mapped to the remaining subcarriers except for the subcarrier in which the DMRS is located through a modulation process after channel encoding.

In sum, a configurable value for each of PUCCH formats described above and ranges thereof may be as shown in Table 20. In the table below, a case in which a value does not need to be configured is indicated as N.A.

TABLE 20

| | | PUCCH Format 0 | PUCCH Format 1 | PUCCH Format 2 | PUCCH Format 3 | PUCCH Format 4 |
|---|---|---|---|---|---|---|
| Starting symbol | Configurability | √ | √ | √ | √ | √ |
| | Value range | 0-13 | 0-10 | 0-13 | 0-10 | 0-10 |
| Number of symbols in a slot | Configurability | √ | √ | √ | √ | √ |
| | Value range | 1, 2 | 4-14 | 1, 2 | 4-14 | 4-14 |
| Index for identifying starting PRB | Configurability | √ | √ | √ | √ | √ |
| | Value range | 0-274 | 0-274 | 0-274 | 0-274 | 0-274 |
| Number of PRBs | Configurability | N.A. | N.A. | √ | √ | N.A. |
| | Value range | N.A. (Default is 1) | N.A. (Default is 1) | 1-16 | 1-6, 8-10, 12, 15, 16 | N.A. (Default is 1) |
| Enabling frequency hopping (intra-slot) | Configurability | √ | √ | √ | √ | √ |
| | Value range | On/Off (only for 2 symbol) | On/Off | On/Off (only for 2 symbol) | On/Off | On/Off |
| Frequency resource of 2nd hop if intra-slot frequency hopping is enabled | Configurability | √ | √ | √ | √ | √ |
| | Value range | 0-274 | 0-274 | 0-274 | 0-274 | 0-274 |
| Index of initial cyclic shift | Configurability | √ | √ | N.A. | N.A. | N.A. |
| | Value range | 0-11 | 0-11 | N.A. | N.A. | N.A. |
| Index of time-domain OCC | Configurability | N.A. | √ | N.A. | N.A. | N.A. |
| | Value range | N.A. | 0-6 | N.A. | N.A. | N.A. |
| Length of Pre-DFT OCC | Configurability | N.A. | N.A. | N.A. | N.A. | √ |
| | Value range | N.A. | N.A. | N.A. | N.A. | 2, 4 |
| Index of Pre-DFT OCC | Configurability | N.A. | N.A. | N.A. | N.A. | √ |
| | Value range | N.A. | N.A. | N.A. | N.A. | 0, 1, 2, 3 |

NACK) are defined in the standard, and the terminal generates PUCCH format 0 according to the value defined in the standard and transmits 2-bit HARQ-ACK.

When the final CS value, which is the CS value added according to ACK or NACK, is greater than 12, the length of the sequence is 12. Therefore, modulo 12 is applied to the final CS value.

TABLE 19

| 2 bit HARQ-ACK | NACK, NACK | NACK, ACK | ACK, ACK | ACK, NACK |
|---|---|---|---|---|
| final CS | (initial CS + 0) mod 12 = initial CS | (initial CS + 3) mod 12 | (initial CS + 6) mod 12 | (initial CS + 9) mod 12 |

Meanwhile, in order to improve uplink coverage, multi-slot repetition may be supported for PUCCH formats 1, 3, and 4, and PUCCH repetition may be configured for each PUCCH format.

The terminal repeatedly transmits PUCCH including UCI as many as the number of slots configured through nrofSlots, which is higher layer signaling. For repeated PUCCH transmission, PUCCH transmission of each slot is performed using the same number of consecutive symbols, and the number of corresponding consecutive symbols may be configured by nrofSymbols in PUCCH-format1 or PUCCH-format3 or PUCCH-format4, which are higher layer signaling. For repeated PUCCH transmission, PUCCH transmission of each slot is performed using the same start symbol, and the corresponding start symbol may be configured by startingSymbolIndex in PUCCH-format1 or PUCCH-format3 or PUCCH-format4, which are higher layer signaling.

US 12,641,455 B2

31

For repeated PUCCH transmission, when the terminal is configured to perform frequency hopping in PUCCH transmission in different slots, the terminal performs frequency hopping in units of slots. In addition, when the terminal is configured to perform frequency hopping in PUCCH transmission in different slots, the terminal starts PUCCH transmission from the first PRB index configured through startingPRB, which is higher layer signaling, in even-numbered slots, and starts PUCCH transmission from the second PRB index configured through secondHopPRB, which is higher layer signaling, in odd-number slots.

Additionally, when the terminal is configured to perform frequency hopping in PUCCH transmission in different slots, the index of the slot in which the first PUCCH transmission is indicated to the terminal is 0, and during the configured total number of repeated PUCCH transmissions, in each slot, the value of the number of repeated PUCCH transmissions is increased regardless of PUCCH transmission performance. When the terminal is configured to perform frequency hopping in PUCCH transmission in different slots, the terminal does not expect that frequency hopping is configured in a slot during PUCCH transmission. When the terminal is not configured to perform frequency hopping in PUCCH transmission in different slots, and is configured to perform frequency hopping in a slot, the first and second PRB indexes are equally applied in a slot.

Next, PUCCH resource configuration of a base station or a terminal is described. The base station may configure PUCCH resources for each BW through higher layer for a certain terminal. The corresponding configuration may be as shown in Table 21.

32

According to the table above, one or a plurality of PUCCH resource sets in the PUCCH resource configuration for a specific BWP may be configured, and a maximum payload value for UCI transmission may be configured in some of the PUCCH resource sets. One or multiple PUCCH resources may belong to each PUCCH resource set, and each PUCCH resource may belong to one of the above-described PUCCH formats.

With respect to the PUCCH resource set, a maximum payload value of the first PUCCH resource set may be fixed to 2 bits, and accordingly, the corresponding value may not be separately configured through a higher layer or the like. When the remaining PUCCH resource sets are configured, the index of the corresponding PUCCH resource sets may be configured in an ascending order according to the maximum payload value, and the maximum payload value may not be configured in a last PUCCH resource set.

TABLE 21

```
PUCCH-Config ::=             SEQUENCE {
    resourceSetToAddModList             SEQUENCE (SIZE (1..maxNrofPUCCH-ResourceSets)) OF
PUCCH-ResourceSet   OPTIONAL, -- Need N
    resourceSetToReleaseList            SEQUENCE (SIZE (1..maxNrofPUCCH-ResourceSets)) OF
PUCCH-ResourceSetId OPTIONAL, -- Need N
    resourceToAddModList                SEQUENCE (SIZE (1..maxNrofPUCCH-Resources)) OF
PUCCH-Resource      OPTIONAL, -- Need N
    resourceToReleaseList               SEQUENCE (SIZE (1..maxNrofPUCCH-Resources)) OF
PUCCH-ResourceId     OPTIONAL, -- Need N
    format1                  SetupRelease { PUCCH-FormatConfig }
OPTIONAL, -- Need M
    format2                  SetupRelease { PUCCH-FormatConfig }
OPTIONAL, -- Need M
    format3                  SetupRelease { PUCCH-FormatConfig }
OPTIONAL, -- Need M
    format4                  SetupRelease { PUCCH-FormatConfig }
OPTIONAL, -- Need M
    schedulingRequestResourceToAddModList   SEQUENCE (SIZE (1.. maxNrofSR-Resources)) OF
SchedulingRequestResourceConfig
OPTIONAL, -- Need N
    schedulingRequestResourceToReleaseList   SEQUENCE (SIZE (1.. maxNrofSR-Resources)) OF
SchedulingRequestResourceId
OPTIONAL, -- Need N
    multi-CSI-PUCCH-ResourceList           SEQUENCE (SIZE (1..2)) OF PUCCH-ResourceId
OPTIONAL, -- Need M
    dl-DataToUL-ACK              SEQUENCE (SIZE (1..8)) OF INTEGER (0..15)
OPTIONAL, -- Need M
    spatialRelationInfoToAddModList        SEQUENCE (SIZE (1..maxNrofSpatialRelationInfos)) OF
PUCCH-SpatialRelationInfo
OPTIONAL, -- Need N
    spatialRelationInfoReleaseList         SEQUENCE (SIZE (1..maxNrofSpatialRelationInfos)) OF
PUCCH-SpatialRelationInfoId
OPTIONAL, -- Need N
    pucch-PowerControl           PUCCH-PowerControl
OPTIONAL, -- Need M

...
}
```

TABLE 22

```
-- A set with one or more PUCCH resources
PUCCH-ResourceSet ::=        SEQUENCE {
    pucch-ResourceSetId           PUCCH-ResourceSetId,
    resourceList                  SEQUENCE (SIZE (1..maxNrofPUCCH-ResourcesPerSet)) OF
PUCCH-ResourceId,
    maxPayloadMinus1              INTEGER (4..256)
OPTIONAL    -- Need R
}
```

A resourceList parameter of the table above may include IDs of PUCCH resources belonging to the PUCCH resource set.

During an initial access or when the PUCCH resource set is not configured, the PUCCH resource set as shown in the following Table 23, which is composed of a plurality of cell-specific PUCCH resources in the initial BWP, may be used. The PUCCH resources to be used for initial access in this PUCCH resource set may be indicated through SIB1.

TABLE 23

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

The maximum payload of each PUCCH resource included in the PUCCH resource set may be 2 bits in the case of PUCCH format 0 or 1, and in the case of the other formats, the maximum payload may be determined by a symbol length, the number of PRBs, and a maximum code rate. The symbol length and number of PRBs described above may be configured for each PUCCH resource, and the maximum code rate may be configured for each PUCCH format.

Next, PUCCH resource selection for UCI transmission will be described. In the case of SR transmission, the PUCCH resource for the SR corresponding to schedulingRequestID may be configured through a higher layer as shown in the following Table 24. The PUCCH resource may be a resource belonging to PUCCH format 0 or PUCCH format 1.

TABLE 24

```
SchedulingRequestResourceConfig ::=   SEQUENCE {
    schedulingRequestResourceId           SchedulingRequestResourceId,
    schedulingRequestID                   SchedulingRequestId,
    periodicityAndOffset                  CHOICE {
        sym2                                  NULL,
        sym6or7                               NULL,
        sl1                                   NULL,          -- Recurs in every slot
        sl2                                   INTEGER (0..1),
        sl4                                   INTEGER (0..3),
        sl5                                   INTEGER (0..4),
        sl8                                   INTEGER (0..7),
        sl10                                  INTEGER (0..9),
        sl16                                  INTEGER (0..15),
        sl20                                  INTEGER (0..19),
        sl40                                  INTEGER (0..39),
        sl80                                  INTEGER (0..79),
```

TABLE 24-continued

```
    sl160                    INTEGER (0..159),
    sl320                    INTEGER (0..319),
    sl640                    INTEGER (0..639),
    }
OPTIONAL,  -- Need M         PCCH-ResourceId
  resource
OPTIONAL   -- Need M
}
```

For the configured PUCCH resource, the period and offset are configured through periodicityAndOffset parameter of Table 24. When there is uplink data to be transmitted by the terminal, at a time point corresponding to the configured period and offset, the corresponding PUCCH resource is transmitted, and otherwise, the corresponding PUCCH resource may not be transmitted.

In the case of CSI transmission, a PUCCH resource for transmitting a periodic CSI report or a semi-persistent CSI report through PUCCH may be configured in the pucch-CSI-ResourceList parameter as shown in the following Table 25 via higher layer signaling. The parameter includes a list of PUCCH resources for each BWP for a cell or CC to transmit the corresponding CSI report. The PUCCH resource may be a resource belonging to PUCCH format 2 or PUCCH format 3 or PUCCH format 4.

TABLE 25

```
CSI-ReportConfig ::=     SEQUENCE {
  reportConfigId             CSI-ReportConfigId,
  carrier                    ServCellIndex          OPTIONAL,  -- Need S
  ...
  reportConfigType           CHOICE {
    periodic                   SEQUENCE {
      reportSlotConfig           CSI-ReportPeriodicityAndOffset,
      pucch-CSI-ResourceList       SEQUENCE (SIZE (1..maxNrofBWPs)) OF
PUCCH-CSI-Resource
    },
    semiPersistentOnPUCCH
      reportSlotConfig         SEQUENCE {
      pucch-CSI-ResourceList     CSI-ReportPeriodicityAndOffset,
                                   SEQUENCE (SIZE (1..maxNrofBWPs)) OF
PUCCH-CSI-Resource
    },
    ...
}
```

A transmission period and an offset of the PUCCH resource are configured through reportSlotConfig of Table 23.

In the case of HARQ-ACK transmission, a resource set of a PUCCH resource to be transmitted is first selected according to a payload of UCI including the corresponding HARQ-ACK. That is, a PUCCH resource set having a minimum payload which is not smaller than the UCI payload is selected. Next, a PUCCH resource in the PUCCH resource set may be selected through a PUCCH resource indicator (PRI) in DCI scheduling a TB corresponding to the HARQ-ACK, and the PRI may be a PUCCH resource indicator specified in Table 5 or Table 6. The relationship between the PRI configured via higher layer signaling and the PUCCH resource selected from the PUCCH resource set may be as shown in Table 26 below.

TABLE 26

| PUCCH resource indicator | PUCCH resource |
|---|---|
| '000' | $1^{st}$ PUCCH resource provided by pucch-ResourceId obtained from the $1^{st}$ value of resourceList |
| '001' | $2^{nd}$ PUCCH resource provided by pucch-ResourceId obtained from the $2^{nd}$ value of resourceList |
| '010' | $3^{rd}$ PUCCH resource provided by pucch-ResourceId obtained from the $3^{rd}$ value of resourceList |
| '011' | $4^{th}$ PUCCH resource provided by pucch-ResourceId obtained from the $4^{th}$ value of resourceList |
| '100' | $5^{th}$ PUCCH resource provided by pucch-ResourceId obtained from the $5^{th}$ value of resourceList |
| '101' | $6^{th}$ PUCCH resource provided by pucch-ResourceId obtained from the $6^{th}$ value of resourceList |
| '110' | $7^{th}$ PUCCH resource provided by pucch-ResourceId obtained from the $7^{th}$ value of resourceList |
| '111' | $8^{th}$ PUCCH resource provided by pucch-ResourceId obtained from the $8^{th}$ value of resourceList |

When the number of PUCCH resources in the selected PUCCH is more than 8, a PUCCH resource may be selected according to the equation below.

$$r_{PUCCH} = \qquad \text{[Equation 1]}$$

$$\begin{cases} \left\lfloor \dfrac{\left(n_{CCE,p} \cdot \lfloor R_{PUCCH}/8 \rfloor\right)}{(N_{CCE,p})} \right\rfloor + \Delta_{PRI} \cdot \left\lfloor \dfrac{R_{PUCCH}}{8} \right\rfloor & \text{if } \Delta_{PRI} < R_{PUCCH} \bmod 8 \\[2em] \left\lfloor \dfrac{\left(n_{CCE,p} \cdot \lfloor R_{PUCCH}/8 \rfloor\right)}{(N_{CCE,p})} \right\rfloor + & \text{if } \Delta_{PRI} \geq R_{PUCCH} \bmod 8 \\[1em] \Delta_{PRI} \cdot \left\lfloor \dfrac{R_{PUCCH}}{8} \right\rfloor + R_{PUCCH} \bmod 8 \end{cases}$$

In Equation 1, $r_{PUCCH}$ is an index of the PUCCH resource selected in the PUCCH resource set, $R_{PUCCH}$ is the number of PUCCH resources belonging to the PUCCH resource set, $\Delta_{PRI}$ is a PRI value, $N_{CCE,p}$ is the total number of CCEs of CORESET p to which the received DCI belongs, $n_{CCE,p}$ indicates the first CCE index for the received DCI. A time point at which the corresponding PUCCH resource is transmitted is after $K_1$ slot from the TB transmission corresponding to the corresponding HARQ-ACK. The candidate for the $K_1$ value is configured by a higher layer, and in detail, the value is configured in the dl-DataToUL-ACK parameter in PUCCH-Config specified in Table 21. One $K_1$ value of these candidates may be selected by a PDSCH-to-HARQ feedback timing indicator in the DCI for scheduling the TB, and this value may be a value specified in Table 5 or Table 6. Meanwhile, the unit of the $K_1$ value may be a slot unit or a subslot unit. Here, a subslot refers to a unit having a length less than that of a slot, and one or a plurality of symbols may constitute one subslot.

Next, a case in which two or more PUCCH resources are located in one slot will be described. The terminal may transmit UCI through one or two PUCCH resources in one slot or subslot, and when UCI is transmitted through two PUCCH resources in one slot/subslot, i) each PUCCH resource does not overlap in units of symbols, and ii) at least one PUCCH resource may be a short PUCCH. Meanwhile, the terminal may not expect to transmit a plurality of PUCCH resources for HARQ-ACK transmission within one slot.

Next, a PUCCH transmission procedure when two or more PUCCH resources overlap will be described. When two or more PUCCH resources overlap, one of the overlapping PUCCH resources may be selected or a new PU CH resource may be selected according to the above-described conditions, that is, a condition that the transmitted PUCCH resource should not overlap in units of symbols. In addition, a UCI payload transmitted through the overlapping PUCCH resource may be all multiplexed and transmitted, or some UCI payloads may be dropped. First, a case in which multi-slot repetition is not configured in a PUCCH resource (case 1) and a case in which multi-slot repetition is configured (case 2) will be described.

In regard to Case 1, the case in which PUCCH resource overlap is divided into Case 1-1) where two or more PUCCH resources for HARQ-AC transmission overlap and Case 1-2) the remaining cases.

Figure 9:
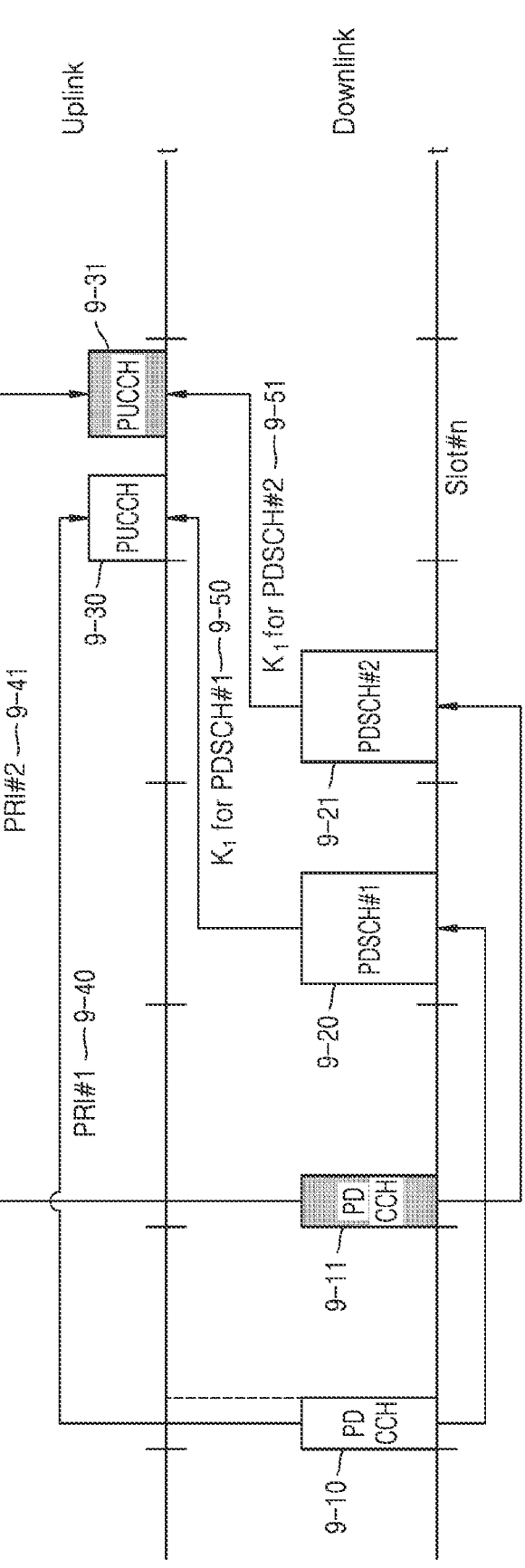
FIG. 9 is a diagram illustrating a case in which, when multi-slot repetition is not configured, a plurality of PUCCH resources for HARQ-ACK transmission for a PDSCH overlap, according to an embodiment of the disclosure.

A case corresponding to Case 1-1) is shown in FIG. 9.

FIG. 9 is a diagram illustrating a case in which, when multi-slot repetition is not configured, a plurality of PUCCH resources for HARQ-ACK transmission for a PDSCH overlap, according to an embodiment of the disclosure.

Referring to FIG. 9, with respect to two or more different PDCCHs 9-10 and 9-11 for scheduling PDSCH, when a transmission slot of the PUCCH resources respectively corresponding to PDCCHs is the same, it may be considered that the corresponding PUCCH resources overlap each other. That is, when uplink slots corresponding to the $K_1$ values 9-50 and 9-51 indicated by a plurality of PDCCHs are the same, PUCCH resources corresponding to the corresponding PDCCHs may be considered as overlapping each other.

Here, among the PUCCH resources indicated by PRIs 9-40 and 9-41 a PDCCH, only a PUCCH resource 9-31 is selected based on the PRI 9-41 corresponding to the PDCCH 9-11 transmitted at a latest time point, and HARQ-ACK information is transmitted on the PUCCH resource. Thus, HARQ-ACK information for PDSCH 9-17 through the selected PUCCH resource 9-31, HARQ-ACK information for other PUCCH 9-30 overlapping the PUCCH resource 9-31 may be both encoded by predefined HARQ-ACK codebook and then transmitted.

Next, a case which corresponds to Case 1-2 and in which a PUCCH resource for HARQ-ACK transmission and a PUCCH resource for SR and/or CSI transmission overlap or a plurality of PUCCH resources for SR and/or CSI transmission overlap is described. In this case, when a plurality of PUCCH resources transmitted on the same slot overlap in more than one symbols on the time domain, the corresponding PUCCH resources are defined as overlapping, and whether UCIs in these resources re multiplexed may be summarized as shown in Table 27.

TABLE 27

| PUCCH 1 | PUCCH 2 | SR | HARQ-ACK | CSI |
|---|---|---|---|---|
| SR | | — | Case 1-2-1 (Multiplex or not depending on PUCCH format) | Always multiplex |
| HARQ-ACK | | | Always multiplex (HARQ-ACK codebook) | Case 1-2-2 (Multiplex or not by higher layer) |
| CSI | | Always multiplex | Case 1-2-2 | Case 1-2-2 |

According to Table 27, when the PUCCH resources on which the HARQ-ACK is transmitted overlap each other or when the PUCCHs on which the SR and CSI are transmitted overlap each other, UCIs thereof are always multiplexed.

On the other hand, when PUCCH resources on which the SR and HARQ-ACK are transmitted overlap each other, that is, in Case 1-2-1), whether UCI is multiplexed is divided according to the format of the PUCCH resource as follows.

SR on PUCCH format 0+HARQ-ACK on PUCCH format 1: SR is dropped and only HARQ-ACK is transmitted.

Other cases: Both SR and HARQ-ACK are multiplexed.

In addition, in the other cases corresponding to Case 1-2-2), that is, a case in which PUCCH resources on which HARQ-ACK and CSI are transmitted overlap each other or a case in which when a plurality of PUCCH resources on which CSI is transmitted overlap each other, whether UCIs thereof are multiplexed may follow the higher layer configuration. In addition, configuring whether to multiplex HAVQ-ACK and CSI and configuring whether to multiplex between a plurality of CSIs may be independently performed.

For example, whether HARQ-ACK and CSI are multiplexed may be configured through simultaneous HARQ-ACK-CSI parameters for each of PUCCH format 2, 3, and 4, and the parameters may all be configured to the same value for the PUCCH format. When it is configured not to perform multiplexing, through the corresponding parameter, only HARQ-ACK may be transmitted and overlapping CSI may be dropped. In addition, whether multiple CSIs are multiplexed may be configured through a multi-CSI-PUCCH-ResourceList parameter in PUCCH-Config. That is, when the multi-CSI-PUCCH-ResourceList parameter is configured, inter-CSI multiplexing may be performed. Otherwise, only the PUCCH corresponding to the CSI having a high priority according to the inter-CSI priority may be transmitted.

When UCI multiplexing is performed as described above, a method of selecting a PUCCH resource for transmitting a corresponding UCI resource and a multiplexing method thereof may vary depending on the overlapped UCI information and the format of the PUCCH resource, which can be summarized as shown in Table 28.

TABLE 28

| PUCCH 1 | PUCCH 2 | SR (format 0/1) | HARQ-ACK | | CSI (format 2/3/4) |
|---|---|---|---|---|---|
| | | | Format 1 | Format 0/2/3/4 | |
| SR (format 0/1) | | — | Option 1 | Option 2 | Option 3 |
| HARQ-ACK | Format 1 | Option 1 | Option 4 | Option 4 | Option 5 (grant-based) Option 6 (SPS) |
| | Format 0/2/3/4 | Option 2 | Option 4 | Option 4 | Option 5 (grant-based) Option 6 (SPS) |
| CSI (format 2/3/4) | | Option 3 | Option 5 (grant-based) Option 6 (SPS) | Option 5 (grant-based) Option 6 (SPS) | Option 7 |

Options of Table 28 are as below.

Option 1: The terminal may differently select PUCCH resources according to an SR value of an SR PUCCH resource overlapped with HARQ-ACK PUCCH resource. That is, when an SR value is positive, a PUCCH resource for SR may be selected, and when an SR value is negative, a PUCCH resource for HARQ-ACK may be selected. HARQ-ACK information may be transmitted on the selected PUCCH resource.

Option 2: The terminal may multiplex HARQ-ACK information and SR information about a PUCCH resource for HARQ-ACK transmission and transmit the same.

Option 3: The terminal may multiplex SR information and CSI on a PUCCH resource for CSI transmission and transmit the same.

Option 4: PUCCH resource transmission for overlapping between hARQ-ACKs—a detailed operation thereof is described in case 1-1) above.

Option 5: When a PUCCH resource for HARQ-ACK corresponding to PDSCH scheduled by PDCCH and a PUCCH resource for CSI transmission overlap each other, and multiplexing between HARQ-ACK and CSI is configured by a higher layer, the terminal may multiplex HARQ-ACK information and CSI information about the PUCCH resource for HARQ-ACK and transmit the same.

Option 6: When a PUCCH resource for HARQ-ACK corresponding to semi-persistent scheduling (SPS) PDSCH and a PUCCH resource for CSI transmission overlap each other, and multiplexing between HARQ-ACK and CSI is configured by higher layer, the terminal may multiplex HARQ-ACK information and CSI information about the PUCCH resource for CSI transmission and transmit the same.

When a PUCCH resource list for multiplexing, that is, a multi-CSI-PUCCH-ResourceList is configured by a higher layer, the terminal may select one resource having a lowest index that can transmit all the multiplexed UCI payloads among the resources in the list, and transmit the UCI payload. When there is no resource capable of transmitting all of the multiplexed UCI payloads in the list, the terminal may select a resource having a largest index and then transmit HARQ-ACK and CSI reports as many as possible to the corresponding resource.

Option 7: When a plurality of PUCCH resources for CSI transmission overlap each other and multiplexing between a plurality of CSIs is configured by a higher layer, the terminal selects one resource having a lowest index whereby all of multiplexed UCI payloads may be transmitted, in a PUCCH resource list for CSI multiplexing configured by a higher layer, that is, the multi-CSI-PUCCH-ResourceList and transmits a UCI payload. When there is no resource capable of transmitting all of the multiplexed UCI payloads in the list, the terminal may select a resource having a largest index and then transmit CSI reports as many as possible to the corresponding resource.

For convenience of explanation, the case in which two PUCCH resources overlap is mainly described, but the above-described method may be similarly applied to a case in which three or more PUCCH resources overlap. For example, when a PUCCH resource in which SR+HARQ-ACK is multiplexed and a CSI PUCCH resource overlap, a HARQ-ACK and CSI multiplexing method may be used.

When it is configured not to perform multiplexing between certain UCIs, UCIs with high priorities are transmitted according to the priority in the order of HARQ-ACK>SR>CSI, and UCIs with low priorities may be dropped. When a plurality of CSI PUCCH resources are configured not to perform multiplexing when they overlap, a PUCCH corresponding to CSI having a high priority is transmitted, and PUCCH corresponding to other CSI may be dropped.

Next, a case in which multi-slot repetition is configured (Case 2) is divided into a case in which two or more PUCCH resources for HARQ-ACK transmission are located in the same starting slot (Case 2-1) and the other cases (Case 2-2). Each case is illustrated in FIG. 10.

Figure 10:
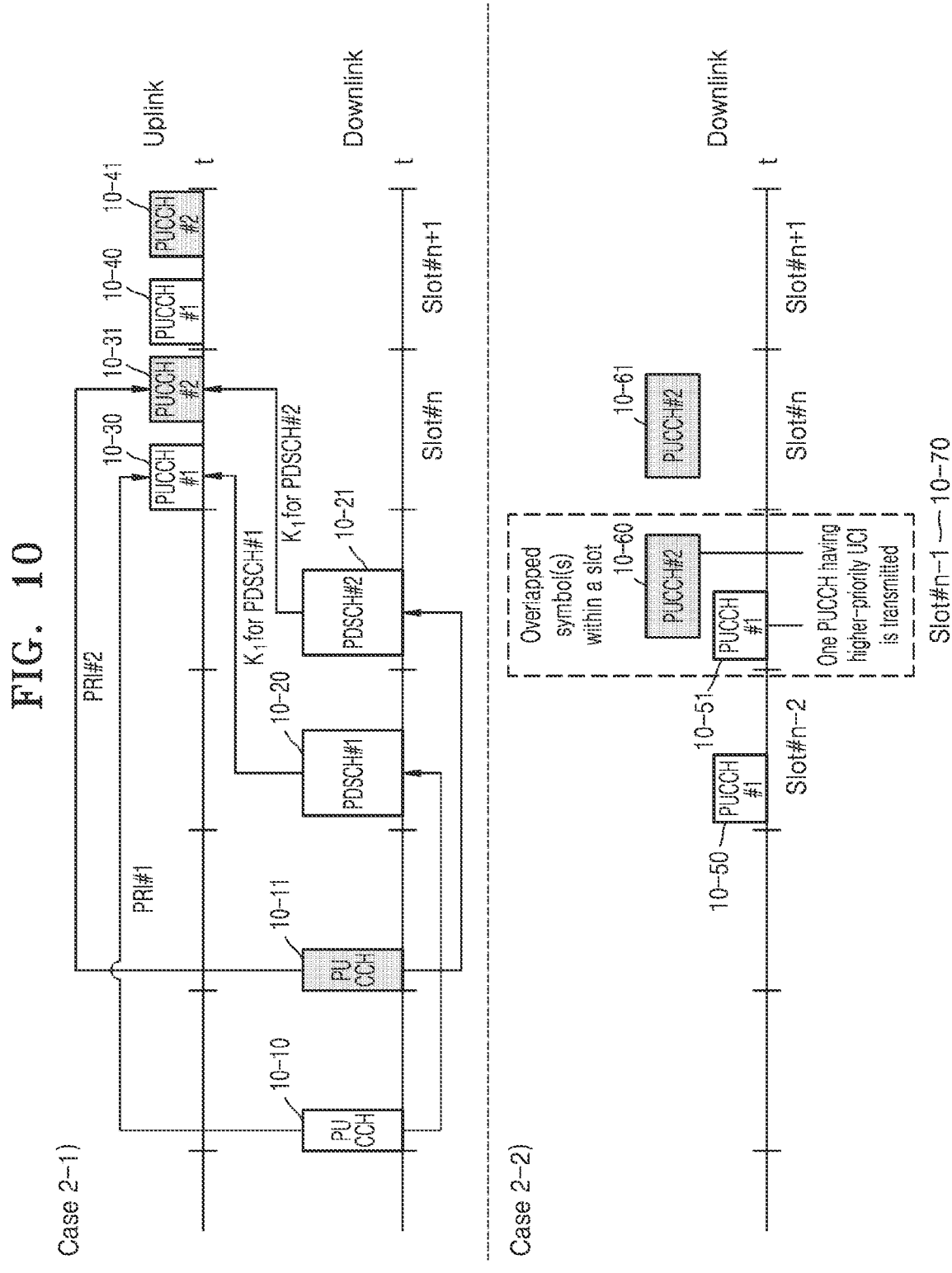
FIG. 10 is a diagram illustrating a case in which PUCCH resources overlap when multi-slot repetition is configured, according to an embodiment of the disclosure.

FIG. 10 is a diagram illustrating a case in which PUCCH resources overlap when multi-slot repetition is configured, according to an embodiment of the disclosure.

Referring to Case 2-1) of FIG. 10, when multi-slot repetition is configured in a PUCCH resource for HARQ-ACK, that is, when PUCCH #1 is repeatedly transmitted over multiple slots 10-30 and 10-40 and PUCCH #2 is also repeatedly transmitted over multiple slots 10-31 and 10-41, and when the start slots of the two PUCCHs indicated by K₁ are the same, then, like Case 1-1), a single PUCCH resource (a PU CH that is transmitted at a latest time point within one slot), that is, PUCCH #2 may be selected. Accordingly, HARQ-ACK information corresponding to PDSCH #1 and PDSCH #2 is all multiplexed through the HARQ-ACK codebook and transmitted on the corresponding PUCCH.

For convenience of explanation, a case in which a plurality of PUCCHs that are multi-slot-repeated overlap each other is taken as an example, but the same method may also be applied when a multi-slot repeated PUCCH and PUCCHs transmitted on a single slot overlap each other.

Case 2-2) corresponds to a case where an overlap in units of symbols occurs between a PUCCH for HARQ-ACK transmission and PUCCH for SR or CSI transmission, or between multiple PUCCHs for SR or CSI transmission. That is, when PUCCH #1 is repeatedly transmitted over multiple slots 10-50 and 10-51 and PUCCH #2 is also repeatedly transmitted over multiple slots 10-60 and 10-61, this corresponds to a case in which PUCCH #1 and PUCCH #2 overlap each other by one or more symbols in one slot 10-70.

Between PUCCHs where one or more symbols overlap in the corresponding slot 10-70, the priorities between UCIs in the PUCCHs are compared, and UCI with a high priory is transmitted, and other UCIs are dropped in the corresponding slot. In this case, the priority between the UCIs follow HARQ-ACK>SR>CSI in the highest order.

In addition, when a plurality of CSI PUCCH resources overlap, a PUCCH corresponding to the high priority CSI is transmitted, and PUCCHs corresponding to other CSI may be dropped in the corresponding slot. PUCCH transmission or drop according to the above-mentioned priority is performed only in a slot in which the overlap in units of symbols has occurred, and is not performed in other slots. That is, the PUCCH in which multi-slot repetition is configured may be dropped in the slot in which the overlap in units of symbols occurs, but may be transmitted as configured in the remaining slots.

For convenience of explanation, a case in which a plurality of PUCCHs subjected to multi-slot repetition are overlapped is exemplified, but the same method may also be applied when overlapping between the multi-slot repetition PUCCH and the PUCCH transmitted on a single slot.

In addition, overlap between PUCCH and PUSCH transmission is described below. When the terminal transmits PUCCH in a first slot of the repeated transmissions of $$N_{PUCCH}^{repeat} > 1,$$

and transmits the PUSCH in a second slot, and PUCCH transmission is overlapped with PUSCH transmission in one or a plurality of slots, and when UCIs are multiplexed in PUSCH in overlapped slots, the terminal transmits PUCCH and does not transmit PUSCH in slots in which PUCCH and PUSCH overlap.

Next, beam configuration to be applied to PUCCH transmission is described. When the terminal does not have a UE-specific configuration for PUCCH resource configuration (dedicated PUCCH resource configuration), the PUCCH resource set is provided through higher layer signaling, pucch-ResourceCommon, and in this case, a beam configuration for PUCCH transmission follows a beam configuration used in PUSCH transmission scheduled through the random access response (RAR) UL grant. When the terminal has a UE-specific configuration for PUCCH resource configuration (dedicated PUCCH resource configuration), the beam configuration for PUCCH transmission is provided through pucch-spatialRelationInfoId, which is higher layer signaling shown in Table 21 above. When the terminal has been configured with one pucch-spatialRelationInfoId, the beam configuration for PUCCH transmission of the terminal is provided through one pucch-spatialRelationInfoId. When the terminal has been configured with a plurality of pucch-spatialRelationInfoIDs, the terminal is indicated to activate one of the plurality of pucch-spatialRelationInfoIDs t rough a MAC control element (CE). The terminal may be configured with up to 8 pucch-spatialRelationInfoIDs through higher layer signaling, and may be indicated to activate one of the pucch-spatialRelationInfoIDs.

When the terminal is indicated to activate any pucch-spatialRelationInfoID through the MAC CE, the terminal applies pucch-spatialRelationInfoID activation through MAC CE, starting from a slot that first appears after $$3N_{slot}^{subframe,\mu}$$

slots from a slot in which HARQ-ACK transmission for a PDSCH that transmits MAC CE including activation information about pucch-spatialRelationInfoID is made. In the above, μ denotes a numerology applied to PUCCH transmission, and $$N_{slot}^{subframe,\mu}$$

denotes the number of slots per subframe in a given numerology. The higher layer configuration for pucch-spatialRelationInfo may be as shown in Table 29. pucch-spatialRelationInfo may be interchangeably used with PUCCH beam information.

TABLE 29

| PUCCH-SpatialRelationInfo ::= | SEQUENCE { | |
|---|---|---|
| pucch-SpatialRelationInfoId | PUCCH-SpatialRelationInfoId, | |
| servingCellId | ServCellIndex | OPTIONAL, -- |
| Need S | | |
| referenceSignal | CHOICE { | |
| ssb-Index | SSB-Index, | |
| csi-RS-Index | NZP-CSI-RS-Rescurceld, | |
| srs | SEQUENCE { | |
| | resource | SRS-ResourceId, |
| | uplinkBWP | BMP-id |
| | } | |
| }, | | |

TABLE 29-continued

| | |
|---|---|
| pucch-PathlossReferenceRS-Id | PUCCH-PathlossReferenceRS-Id, |
| p0-PUCCH-Id | P0-PUCCH-Id, |
| closedLoopIndex | ENUMERATED { i0, i1 } |
| } | |
| PUCCH-SpatialRelationInfoId ::= | INTEGER (1..maxNrofSpatialRelationInfos) |

According to Table 29, one referenceSignal configuration may exist in a specific pucch-spatialRelationInfo configuration, and the referenceSignal may be an ssb-Index indicating a specific SS/PBCH, or a csi-RS-Index indicating a specific CSI-RS, or srs indicating a specific SRS. When a referenceSignal is configured as ssb-Index, the terminal may configure a beam used when receiving the SS/PBCH corresponding to the ssb-Index among the SS/PBCHs in the same serving cell, as a beam for PUCCH transmission, or when a servingCellId is provided, the terminal may configure, as a beam for pucch transmission, a beam that is used when One pucch-PathlossReferenceRS-Id configuration may exist within a specific pucch-spatialRelationInfo configuration. PUCCH-PathlossReferernceRS of Table 30 may be mapped with pucch-PathlossReferenceRS-Id of Table 29, and up to four may be configured through pathlossReferenceRSs in higher layer signaling PUCCH-PowerControl of Table 30. When PUCCH-PathlossReferenceRS is connected to SS/PBCH through referenceSignal of Table 30, ssb-Index is configured, and when PUCCH-PathlossReferenceRS is connected to CSI-RS, csi-RS-Index is configured.

TABLE 30

| | |
|---|---|
| PUCCH-PowerControl ::= | SEQUENCE { |
|    deltaF-PUCCH-f0 | INTEGER (−16..15)   OPTIONAL, -- Need R |
|    deltaF-PUCCH-f1 | INTEGER (−16..15)   OPTIONAL, -- Need R |
|    deltaF-PUCCH-f2 | INTEGER (−16..15)   OPTIONAL, -- Need R |
|    deltaF-PUCCH-f3 | INTEGER (−16..15)   OPTIONAL, -- Need R |
|    deltaF-PUCCH-f4 | INTEGER (−16..15)   OPTIONAL, -- Need R |
|    p0-Set | SEQUENCE (SIZE (1..maxNrofPUCCH-P0-PerSet)) OF |
| P0-PUCCH OPTIONAL, -- Need M | |
|    pathlossReferenceRSs | SEQUENCE (Size |
| (1..maxNrofPUCCH-PathlossReferenceRSs)) OF PUCCH-PathlossReferenceRS   OPTIONAL, -- | |
| Need M | |
|    twoPUCCH-PC-AdjustmentStates | ENUMERATED {twoStates}   OPTIONAL, -- Need |
| S | |
|    ... | |
| } | |
| P0-PUCCH ::= | SEQUENCE { |
|    p0-PUCCH-Id | P0-PUCCH-Id, |
|    p0-PUCCH-Value | INTEGER (−16..15) |
| } | |
| P0-PUCCH-Id ::= | INTEGER (1..8) |
| PUCCH-PathlossReferenceRS ::= | SEQUENCE { |
|    pucch-PathlossReferenceRS-Id | PUCCH-PathlossReferenceRS-Id, |
|    referenceSignal | CHOICE { |
|       ssb-Index | SSB-Index, |
|       csi-RS-Index | NZP-CSI-RS-ResourceId |
|    } | |
| } | |

45 receiving an SS/PBCH corresponding to ssb-Index among SS/PBCHs in a cell indicated by the servingCellId. When the referenceSignal is configured as csi-RS-Index, the terminal may configure a beam used when receiving a CSI-RS corresponding to the csi-RS-Index among the CSI-RSs in the same serving cell, as a beam for PUCCH transmission, or when a servingCellId is provided, the terminal may configure, as a beam for pucch transmission, a beam used when receiving a CSI-RS corresponding to csi-RS-Index among CSI-RSs in a cell indicated by the servingCellId. When the referenceSignal is configured as srs, the terminal may configure, as a beam for PUCCH transmission, a transmission beam used to transmit an SRS corresponding to a resource index provided as a higher layer signaling resource in the same serving cell and/or an activated uplink BWP, or when servingCellID and/or uplinkBWP is provided, the terminal may configure, as a beam for PUCCH transmission, a transmission beam used when transmitting an SRS corresponding to a resource index provided through higher layer signaling resource in a cell and/or uplink BWP indicated by the servingcellID and/or the uplinkBWP.

Next, an uplink channel estimation method by using sounding reference signal (SRS) transmission of a terminal is described. A base station may configure at least one SRS configuration for each uplink BWP to transmit configuration information for SRS transmission to the terminal, and may also configure at least one SRS resource set for each SRS configuration. For example, the base station and the terminal may transmit and receive higher layer signaling information as below to transmit information about an SRS resource set.

srs-ResourceSetId: SRS resource set index srs-ResourceIdList: a set of SRS resource indexes referenced by a SRS resource set resourceType: time domain transmission configuration of an SRS resource referenced by an SRS resource set, which may be configured as one of 'periodic', 'semi-persistent', and 'aperiodic'. When the time domain transmission configuration is configured as 'periodic' or 'semi-persistent', associated CSI-RS information may be provided according to a usage of the SRS resource set. When the time domain transmission configuration is configured as 'aperiodic', an aperiodic SRS resource trigger list and slot offset information may be provided, and associated CSI-RS information may be provided according to a usage of the SRS resource set.

usage: configuration for a usage of an SRS resource referenced by an SRS resource set, which may be configured as one of 'beamManagement', 'codebook', 'nonCodebook', and 'antennaSwitching'.

alpha, p0, pathlossReferenceRS, srs-PowerControlAdjustmentStates: parameter configuration for transmission power control of an SRS resource referenced by an SRS resource set is provided.

A terminal may identify that an SRS resource included in a set of SRS resource indexes referenced by an SRS resource set follows information configured in the SRS resource set.

Also, the base station and the terminal may transmit and receive higher layer signaling information to transmit individual configuration information of the SRS resource. For example, the individual configuration information of the SRS resource may include time-frequency domain mapping information in a slot of the SRS resource, and the time-frequency domain mapping information may include information about intra-slot or inter-slot frequency hopping of the SRS resource. Also, the individual configuration information of the SRS resource may include a time domain transmission configuration of the SRS resource, and may be configured as one of 'periodic', 'semi-persistent', and 'aperiodic'. Accordingly, it may be possible to limit to have a time domain transmission configuration such as an SRS resource set including the SRS resource. When the time domain transmission configuration of the SRS resource is configured as 'periodic' or 'semi-persistent', an SRS resource transmission period and a slot offset (e.g., periodicityAndOffset) may be additionally included in the time domain transmission configuration.

The base station may activate, deactivate, or trigger SRS transmission to the terminal through higher layer signaling including RRC signaling or MAC CE signaling, or L1 signaling (e.g., DCI). For example, the base station may activate or deactivate periodic SRS transmission through higher layer signaling to the terminal. The base station may indicate to activate an SRS resource set in which the resourceType is configured as periodic, through higher layer signaling, and the terminal may transmit an SRS resource referenced by the activated SRS resource set. Time-frequency a is resource mapping in a slot of the transmitted SRS resource follows resource mapping information configured in the SRS resource, and the slot mapping including the transmission period and the slot offset follows the periodicityAndOffset configured in the SRS resource. In addition, a spatial domain transmission filter applied to the SRS resource to be transmitted may refer to spatial relation info configured in the SRS resource, or may refer to associated CSI-RS information configured in the SRS resource set including the SRS resource. The terminal may transmit the SRS resource in the uplink BWP activated for the periodic SRS resource activated through higher layer signaling.

For example, the base station may activate or deactivate semi-persistent SRS transmission through higher layer signaling, to the terminal. The base station may indicate to activate the SRS resource set through MAC CE signaling, and the terminal may transmit the SRS resource referenced by the activated SRS resource set. The SRS resource set activated through MAC CE signaling may be limited to the SRS resource set in which the resourceType is configured as semi-persistent. Time-frequency axis resource mapping in a slot of the transmitted SRS resource follow the resource mapping information configured in the SRS resource, and the slot mapping including the transmission period and the slot offset follows the periodicityAndOffset configured in the SRS resource. In addition, a spatial domain transmission filter applied to the SRS resource to be transmitted may refer to spatial relation info configured in the SRS resource, or may refer to associated CSI-RS information configured in the SRS resource set including the SRS resource. When spatial relation info is configured in the SRS resource, the spatial relation info may not be followed, but the spat al domain transmission filter may be determined by referring to configuration information for spatial relation info transmitted through MAC CE signaling that activates semi-persistent SRS transmission. The terminal may transmit the SRS resource in the uplink BWP activated for the semi-persistent SRS resource activated through higher layer signaling.

For example, the base station may trigger aperiodic SRS transmission to the terminal through DCI. The base station may indicate one of aperiodic SRS resource triggers (aperiodicSRS-ResourceTrigger) through an SRS request field of DCI. The terminal may understand that an SRS resource set including an aperiodic SRS resource trigger indicated through DCI in the aperiodic SRS resource trigger list is triggered among the configuration information of the SRS resource set. The terminal may transmit the SRS resource referenced by the triggered SRS resource set. The time-frequency axis resource mapping in the slot of the SRS resource to be transmitted follows the resource mapping information set in the SRS resource. In addition, slot mapping of the SRS resource to be transmitted may be determined through the slot offset between the PDCCH including DCI and the SRS resource, which may refer to value(s) included in the slot offset set configured in the SRS resource set. In detail, as a slot offset between the PDCCH including DCI and the SRS resource, a value indicated in a time domain resource allocation field of DCI among the offset value(s) included in the slot offset set configured in the SRS resource set may be applied. In addition, a spatial domain transmission filter applied to the SRS resource to be transmitted may refer to spatial relation info configured in the SRS resource, or may refer to associated CSI-RS inform tion configured in the SRS resource set including the SRS resource. The terminal may transmit the SRS resource in the uplink BWP activated for the aperiodic SRS resource triggered through DCI.

When the base station triggers aperiodic SRS transmission to the terminal through DCI, in order for the terminal to transmit SRS by applying the configuration information for the SRS resource, a minimum time interval between the PD CH including the DCI triggering the aperiodic SRS transmission and the transmitted SRS may be required. A time interval for SRS transmission of the terminal may be defined as the number of symbols between a last symbol of the PDCCH including DCI triggering aperiodic SRS transmission and a first symbol, with which a first transmitted SRS resource among SRS resource(s) is mapped. The minimum time interval may be determined with reference to PUSCH preparation procedure time required for the terminal to prepare for PUSCH transmission. In addition, the minimum time interval may have different values depending on the usage of the SRS resource set including the transmitted SRS resource. For example, the minimum time interval may be determined as an N2 symbol defined in consideration of the terminal processing capability according to the capability of the terminal with reference to the PUSCH preparation procedure time of the terminal. In addition, in consideration of the usage of the SRS resource set including the transmitted SRS resource, when the usage of the SRS resource set is configured to 'codebook' or 'antennaSwitching', the minimum time interval is configured to N2 symbols, and when the usage of the SRS resource set is configured to 'nonCodebook' or 'beamManagement', the minimum time interval may be configured to N2+14 symbols. The terminal may transmit an aperiodic SRS when the time interval for aperiodic SRS transmission is greater than or equal to the minimum time interval, and when the time interval for aperiodic SRS transmission is less than the minimum time interval, the terminal may ignore DCI triggering aperiodic SRS.

Referring to spatialRelationInfo configuration, an SS/PBCH block index, CSI-RS index, or SRS index may be configured as an index of a reference signal to be referenced in order to use beam information of a specific reference

TABLE 31

```
SMS-Resource ::=            SEQUENCE {
  scs-ResourceId              SRS-ResourceId,
  nrofSRS-Parts               ENUMERATED (port1, ports2, ports4),
  ptrs-PortIndex              ENUMERATED {n0, n1}
OPTIONAL,  -- Need R
  transmissionComb            CHOICE {
    n2                          SEQUENCE {
      combOffset-n2               INTEGER (0..1),
      cyclicShift-n2              INTEGER (0..7)
    },
    n4                          SEQUENCE {
      combOffset-n4               INTEGER (0..3),
      cyclicShift-n4              INTEGER (0..11)
    }
  },
  resourceMapping             SEQUENCE {
    startPosition               INTEGER (0..5),
    nrofSymbols                 ENUMERATED (n1, n2, n4),
    repetitionFactor            ENUMERATED (n1, n2, n4),
  },
  freqDomainPosition          INTEGER (0..67),
  freqDomainShift             INTEGER (0..268),
  freqHopping                 SEQUENCE {
    c-SBS                       INTEGER (0..63),
    b-SBS                       INTEGER (0..3),
    b-hop                       INTEGER (0..3)
  },
  groupOrSequenceHopping      ENUMERATED { neither, groupHopping,
sequenceHopping },
  resourceType                CHOICE {
    aperiodic                   SEQUENCE {
      ...
    },
    semi-persistent             SEQUENCE {
      periodicityAndOffset-sp       SRS-PeriodicityAndOffset,
      ...
    },
    periodic                    SEQUENCE {
      periodicityAndOffset-p        SRS-PeriodicityAndOffset,
      ...
    }
  },
  sequenceId                  INTEGER (0..1023),
  spatialRelationInfo         SRS-SpatialRelationInfo
OPTIONAL,  -- Need R
  ...
}
``` spatialRelationInfo configuration information of Table 31 is designed to refer to one reference signal and apply beam information of the reference signal to a beam used in the corresponding SRS transmission. For example, configuration of spatialRelationInfo may include information as shown in Table 32.

TABLE 32

```
SRS-SpatialRelationInfo ::=   SEQUENCE {
  servingCellId                 ServCellIndex    OPTIONAL,  --
                              Need
S
  referenceSignal               CHOICE {
    ssb-Index                     SSB-Index,
    csi-RS-Index                  NZP-CSI-RS-ResourceId,
    srs                           SEQUENCE {
      resourceId                    SBS-ResourceId,
      uplinkBWP                     BWP-Id
    }
  }
}
``` signal. A higher layer signaling referenceSignal is configuration information indicating beam information of which reference signal is to be referenced for the corresponding SRS transmission, ssb-Index is an index of an SS/PBCH block, csi-RS-Index is an index of the CSI-RS, and srs is an index of the SRS. When a value of the higher layer signaling referenceSignal is configured to 'ssb-Index', the terminal may apply a reception beam used when receiving an SS/PBCH block corresponding to an ssb-Index as a transmission beam of the corresponding SRS transmission. When a value of the higher layer signaling referenceSignal is configured to 'csi-RS-Index', the terminal may apply a reception beam used when receiving a CSI-RS corresponding to a csi-RS-Index as a transmission beam of the corresponding SRS transmission. When a value of the higher layer signaling referenceSignal is configured to 'srs', the terminal may apply a transmission beam used when transmitting an SRS corresponding to srs as a transmission beam of the corresponding SRS transmission.

Next, a scheduling scheme of PUSCH transmission is described. PUSCH transmission may be dynamically scheduled by a UL grant in DCI or may be operated by configured grant Type 1 or Type 2. Dynamic scheduling indication for PUSCH transmission is possible in DCI format 00 or 0_1.

Configured grant Type 1 PUSCH transmission may not involve reception of UL grant in DCI, but may be semi-statically configured through reception of configuredGrant-Config including the rrc-ConfiguredUplinkGrant of Table 33 through higher layer signaling. Configured grant Type 2 PUSCH transmission may be semi-persistently scheduled by the UL grant in DCI after receiving configuredGrantConfig that does not include the rrc-ConfiguredUplinkGrant of Table 33 through higher layer signaling. When PUSCH transmission is operated by a configured grant, parameters applied to PUSCH transmission are applied through configuredGrantConfig, which is higher layer signaling of Table 33, except for dataScramblingIdentityPUSCH, txConfig, codebookSubset, maxRank, scaling of UCI-OnPUSCH provided by pusch-Config of Table 34. When the terminal is provided with transformPrecoder in configuredGrantConfig, which is higher layer signaling of Table 33, the terminal applies tp-pi2BPSK in pusch-Config of Table 34 for PUSCH transmission operated by the configured grant.

TABLE 33

```
ConfiguredGrantConfig ::=            SEQUENCE {
     frequencyHopping                    ENUMERATED {intraSlot, interSlot}
OPTIONAL,    -- Need S,
     cg-DMRS-Configuration               DMRS-UplinkConfig,
     mcs-Table                           ENUMERATED {qam256, qam64LowSE}
OPTIONAL,    -- Need S
     mcs-TableTransformPrecoder          ENUMERATED {qam256, qam64LowSE}
OPTIONAL,    -- Need S
     uci-OnPUSCH                           SetupRelease { CG-UCI-OnPUSCH }
OPTIONAL,    -- Need M
     resourceAllocation                  ENUMERATED { resourceAllocationType0,
resourceAllocationType1, dynamicSwitch },
     rbg-Size                            ENUMERATED {config2}
OPTIONAL,    -- Need S
     powerControlLoopToUse                ENUMERATED {n0, n1},
     p0-PUSCH-Alpha                       P0-PUSCH-AlphaSetId,
     transformPrecoder                   ENUMERATED {enabled, disabled}
OPTIONAL,    -- Need S
     nrofHARQ-Processes                   INTEGER(1..16),
     repK ENUMERATED                     {n1, n2, n4, n8},
     repK-RV                             ENUMERATED {s1-0231, s2-0303, s3-0000}
OPTIONAL,    -- Need R
     periodicity                         ENUMERATED {
                                              sym2, sym7, sym1x14, sym2x14, sym4x14,
sym5x14, sym8x14, sym10x14, sym16x14, sym20x14,
                                              sym32x14, sym40x14, sym64x14, sym80x14,
sym128x14, sym160x14, sym256x14, sym320x14, sym512x14,
                                              sym640x14, sym1024x14, sym1280x14,
sym2560x14, sym5120x14,
                                              sym6, sym1x12, sym2x12, sym4x12, sym5x12,
sym8x12, sym10x12, sym16x12, sym20x12, sym32x12,
                                              sym40x12, sym64x12, sym80x12, sym128x12,
sym160x12, sym256x12, sym320x12, sym512×12, sym640x12,
                                              sym1280x12, sym2560x12
     },
     configuredGrantTimer                INTEGER (1..64)
OPTIONAL,    -- Need R
     rrc-ConfiguredUplinkGrant           SEQUENCE {
          timeDomainOffset                   INTEGER (0..5119),
          timeDomainAllocation               INTEGER (0..15),
          frequencyDomainAllocation          BIT STRING (SIZE(18)),
          antennaPort                        INTEGER (0..31),
          dmrs-SeqInitialization         INTEGER (0..1)
OPTIONAL,    -- Need R
          precodingAndNumberOfLayers          INTEGER (0..63),
          srs-ResourceIndicator          INTEGER (0..15)
OPTIONAL,    -- Need R
          mcsAndTBS                          INTEGER (0..31),
          frequencyHoppingOffset         INTEGER (1..maxNrofPhysicalResourceBlocks-
1)                    OPTIONAL,    -- Need R
          pathlossReferenceIndex             INTEGER (0..maxNrofPUSCH-
PathlossReferenceRSs-1),
          ...
     }
OPTIONAL,    -- Need R
     ...
}
```

Next, a PUSCH transmission method is described. A DRMS antenna port for PUSCH transmission is the same as an antenna port for SRS transmission. PUSCH transmission may use a codebook-based transmission method and a non-codebook-based transmission method, respectively, depending on whether a value of txConfig in pusch-Config of Table 34, which is higher layer signaling, is 'codebook' or 'nonCodebook'.

As described above, PUSCH transmission may be dynamically scheduled through DCI format 0_0 or 0_1, and may be semi-statically configured by a configured grant. When the terminal is indicated to schedule PUSCH transmission through DCI format 0_0, the terminal may perform beam configuration for PUSCH transmission, by using pucch-spatialRelationInfoID corresponding to a UE-specific PUCCH resource corresponding to the minimum ID in the uplink BWP activated in the serving cell, and the PUSCH transmission here is based on a single antenna port. The terminal does not expect scheduling of PUSCH transmission through DCI format 00 within the BWP in which the PUCCH resource including the pucch-spatialRelationInfo is not configured. When the terminal has not configured txConfig in pusch-Config of Table 34, the terminal does not expect to be scheduled in DCI format 0_1.

nal is configured with at least one SRS resource when transmitting a codebook-based PUSCH, and may be configured with up to two. When the terminal is provided with an SRI through DCI, the SRS resource indicated by the corresponding SRI refers to an SRS resource corresponding to the SRI among SRS resources transmitted before the PDCCH including the corresponding SRI. In addition, TPMI and a transmission rank may be given through a field 'precoding information and number of layers' in DCI or may be configured through precodingAndNumberOfLayers, which is higher layer signaling. TPMI is used to indicate a precoder applied to PUSCH transmission. When the terminal is configured with one SRS resource, the TPMI is used to indicate a precoder to be applied in the configured one SRS resource. When the terminal is configured with a

TABLE 34

| PUSCH-Config ::= | SEQUENCE { |
| --- | --- |
| dataScramblingIdentityPUSCH | INTEGER (0..1023) |
| OPTIONAL, -- Need S | |
| txConfig | ENUMERATED (codebook, nonCodebook) |
| OPTIONAL, -- Need S | |
| dmrs-UplinkForPUSCH-MappingTypeA | SetupRelease ( DMRS-UplinkConfig ) |
| OPTIONAL, -- Need M | |
| dmrs-UplinkForPUSCH-MappingTypeB | SetupRelease ( DMRS-UplinkConfig ) |
| OPTIONAL, -- Need M | |
| pusch-PowerControl | PUSCH-PowerControl |
| OPTIONAL, -- Need M | |
| frequencyHopping | ENUMERATED (IntraSlot, InterSlot) |
| OPTIONAL, -- Need S | |
| frequencyHoppingOffsetLists | SEQUENCE (SIZE (1..4)) OF INTEGER (1.. |
| maxNrofPhysicalResourceBlocks-1) | |
| OPTIONAL, -- Need M | |
| resourceAllocation | ENUMERATED ( resourceAllocationType0, |
| resourceAllocationType1, dynamicSwitch}, | |
| pusch-TimeDomainAllocationList | SetupRelease |
| { PUSCH-TimeDomainResourceAllocationList } | OPTIONAL, -- Need M |
| pusch-AggregationFactor | ENUMERATED { n2, n4, n8 } |
| OPTIONAL, -- Need S | |
| mcs-Table | ENUMERATED {qam256, qam64LowSE} |
| OPTIONAL, -- Need S | |
| mcs-TableTransformPrecoder | ENUMERATED {qam256, qam64LowSE} |
| OPTIONAL, -- Need S | |
| transformPrecoder | ENUMERATED {enabled, disabled} |
| OPTIONAL, -- Need S | |
| codebookSubset | ENUMERATED |
| {fullyAndPartialAndNonCoherent, partialAndNonCoherent, nonCoherent} | |
| OPTIONAL, -- Cond codebookBased | |
| maxRank | INTEGER (1..4) |
| OPTIONAL, -- Cond codebookBased | |
| rbg-Size | ENUMERATED { config2} |
| OPTIONAL, -- Need S | |
| uci-OnPUSCH | SetupRelease { UCI-OnPUSCH} |
| OPTIONAL, -- Need M | |
| tp-pi2BPSK | ENUMERATED {enabled} |
| OPTIONAL, -- Need S | |
| ... | |
| } | |

Next, codebook-based PUSCH transmission is described. Codebook-based PUSCH transmission may be dynamically scheduled through DCI format 0_0 or 0_1, and may operate semi-statically by a configured grant. When the codebook-based PUSCH is dynamically scheduled by DCI format 0_1 or is configured semi-statically by a configured grant, the terminal determines a precoder for PUSCH transmission based on an SRS Resource Indicator (SRI), a Transmission Precoding Matrix Indicator (TPMI), and a transmission rank (number of PUSCH transmission layers).

Here, the SRI may be given through a field 'SRS resource indicator' in DCI or may be configured through srs-ResourceIndicator, which is higher layer signaling. The termiplurality of SRS resources, the TPMI is used to indicate a precoder to be applied in an SRS resource indicated through the SRI.

A precoder to be used for PUSCH transmission is selected from an uplink codebook having the same number of antenna ports as a value of nrofSRS-Ports in SRS-Config, which is higher layer signaling. In the codebook-based PUSCH transmission, the terminal determines a codebook subset based on the TPMI and codebookSubset in pusch-Config, which is higher layer signaling. CodebookSubset in pusch-Config, which is higher layer signaling, may be configured to one of 'fullyAndPartialAndNonCoherent', 'partialAndNonCoherent', or 'nonCoherent' based on the UE capability reported by the terminal to the base station. When the terminal reports 'partialAndNonCoherent' as UE capability, the terminal does not expect that a value of codebookSubset, which is higher level signaling, is configured to 'fullyAndPartialAndNonCoherent'. In addition, when the terminal reports 'nonCoherent' as UE capability, the terminal does not expect that the value of codebookSubset, which is higher layer signaling, is configured to 'fullyAndPartialAndNonCoherent' or 'partialAndNonCoherent'. When nrofSRS-Ports in SRS-ResourceSet, which is higher layer signaling, points to two SRS antenna ports, the terminal does not expect that the value of codebookSubset, which is higher layer signaling, is configured to 'partialAndNonCoherent'.

The terminal may be configured with one SRS resource set in which a value of usage in SRS-ResourceSet, which higher layer signaling, is configured to 'codebook', and one SRS resource in the corresponding SRS resource set may be indicated through SRI. When several SRS resources are configured in the SRS resource set in which the value of usage in SRS-ResourceSet, which is higher layer signaling, is configured to 'codebook', the terminal expects the same value of nrofSRS-Ports in the SRS-Resource, which is higher layer signaling, to be configured for all SRS resources.

The terminal transmits to the base station one or a plurality of SRS resources included in the SRS resource set in which the value of usage is configured to 'codebook' according to higher level signaling, and the base station selects one of the SRS resources transmitted by the terminal and indicates such that the terminal may perform PUSCH transmission by using the transmission beam information of t e corresponding SRS resource. Here, in the codebook-based PUSCH transmission, SRI is used as information for selecting an index of one SRS resource and is included in DCI. Additionally, the base station includes, in the DCI, information indicating the TPMI and rank to be used by the terminal for PUSCH transmission. By using the SRS resource indicated by the SRI, the terminal performs PUSCH transmission by applying the rank indicated based on the transmission beam of the SRS resource and the precoder indicated by the TPMI.

Next, non-codebook-based PUSCH transmission is described. Non-codebook-based PUSCH transmission may be dynamically scheduled through DCI format 0_0 or 0_1, and may operate semi-statically by a configured grant. When at least one SRS resource is configured in the SRS resource set in which the value of usage in the SRS-ResourceSet, which is higher layer signaling, is configured to 'nonCodebook', the terminal may be scheduled with a non-codebook-based PUSCH transmission through DCI format 0_1.

For the SRS resource set in which the value of usage in the SRS-ResourceSet, which is higher layer signaling, is configured to 'nonCodebook', the terminal may be configured with one connected NZP CSI-RS resource (non-zero power CSI-RS). The terminal may perform calculation of a precoder for SRS transmission by measuring the NZP CSI-RS resource connected to the SRS resource set. When a difference between a last received symbol of an aperiodic NZP CSI-RS resource connected to the SRS resource set and a first symbol of an aperiodic SRS transmission in the terminal is less than 42 symbols, the terminal does not expect that information about the precoder for SRS transmission is updated.

When a value of resourceType in the SRS-Resource which is higher layer signaling, is configured as 'aperiodic', the connected NZP CSI-RS is indicated by an SRS request, which is a field in DCI format 0_1 or 1_1. Here, when the connected NZP CSI-RS resource is an aperiodic NZP CSI-RS resource, it may indicate that there is a connected NZP CSI-RS for a case in which a value of a field 'SRS request' in DCI format 01 or 1_1 is not '00'. Here, the DCI should not indicate cross carrier or cross BWP scheduling. In addition, when a value of the SRS request indicates the existence of an NZP CSI-RS, the corresponding NZP CSI-RS is located in a slot in which a PDCCH including the SRS request field is transmitted. In this case, TCI states configured in a scheduled subcarrier are not configured to QCL-TypeD.

When a periodic or semi-persistent SRS resource set is configured, the connected NZP CSI-RS may be indicated through associatedCSI-RS in the SRS-ResourceSet, which is higher layer signaling. For non-codebook-based transmission, the terminal does not expect that spatialRelationInfo, which is higher layer signaling for SRS resource, and associatedCSI-RS in SRS-ResourceSet, which is higher layer signaling, are configured together.

When the terminal is configured with a plurality of SRS resources, the terminal may determine a precoder to be applied to PUSCH transmission and a transmission rank, based on the SRI indicated by the base station. Here, the SRI may be indicated through a field 'SRS resource indicator' in DCI or may be configured through srs-ResourceIndicator, which is higher layer signaling. Like in the above-described codebook-based PUSCH transmission, when the terminal is provided with SRI through DCI, the SRS resource indicated by the SRI refers to an SRS resource corresponding to the SRI among the SRS resource transmitted before the PDCCH including the SRI. The terminal may use one or a plurality of SRS resources for SRS transmission, and the maximum number of SRS resources and the minimum number of SRS resources that may be simultaneously transmitted on the same symbol in one SRS resource set are determined by the UE capability reported by the terminal to the base station. H re, the SRS resources simultaneously transmitted by the terminal occupy the same RB. The terminal configures one SRS port for each SRS resource. Only one SRS resource set in which a value of usage in the SRS-ResourceSet, which is higher layer sign ling, is configured to 'nonCodebook' may be configured, and up to four SRS resources for non-codebook-based PUSCH transmission may be configured.

The base station transmits one NZP-CSI-RS connected to the SRS resource set to the terminal, and the terminal calculates, based on a measurement result obtained when receiving the NZP-CSI-RS, a precoder to be used when transmitting one or a plurality of SRS resources in the corresponding SRS resource set. The terminal applies the calculated precoder when transmitting, to the base station, one or a plurality of SRS resources in the SRS resource set in which the usage is configured to 'nonCodebook', and the base station selects one or a plurality of SRS resources among the received one or a plurality of SRS resources. Here, in the non-codebook-based PUSCH transmission, the SRI indicates an index capable of expressing one or a combination of a plurality of SRS resources, and the SRI is included in the DCI. Here, the number of SRS resources indicated by the SRI transmitted by the base station may be the umber of transmission layers of the PUSCH, and the terminal transmits a PUSCH by applying a precoder applied to the SRS resource transmission to each layer.

Next, a PUSCH preparation procedure time is described. When the base station schedules the terminal to transmit the PUSCH using DCI format 0_0 or DCI format 0_1, the terminal may require a PUSCH preparation procedure time for transmitting a PUSCH by applying a transmission method indicated through DCI (a transmission precoding method of an SRS resource, the number of transmission layers, a spatial domain transmission filter). In an NR system, the PUSCH preparation procedure time is defined in consideration of the above. The PUSCH preparation procedure time of the terminal may be according to Equation 2 below.

$$T_{proc,2} = \max((N_2 + d_{2,1})(2048 + 144) \cdot \kappa 2^{-\mu} \cdot T_c, d_{2,2}) \qquad \text{[Equation 2]}$$

In $T_{proc,2}$ described above, each variable may have the following meaning.

$N_2$: the number of symbols determined according to the UE processing capability 1 or 2 and the numerology p according to the capability of the terminal. When reported as UE processing capability 1 according to the capability report of the terminal, $N_2$ may have the values of [Table 35], and when reported as UE processing capability 2, and it is configured through higher layer signaling that UE processing capability 2 may be used, $N_2$ may have the values of [Table 36].

TABLE 35

| μ | PUSCH preparation time $N_2$ [symbols] |
|---|---|
| 0 | 10 |
| 1 | 12 |
| 2 | 23 |
| 3 | 36 |

TABLE 36

| μ | PUSCH preparation time $N_2$ [symbols] |
|---|---|
| 0 | 5 |
| 1 | 5.5 |
| 2 | 11 for frequency range 1 |

$d_{2,1}$: the number of symbols set as 0 when a first symbol of PUSCH is configured with only DM-RSs, and when not, the numbers of symbols set as 1.

$\kappa$: 64

μ: among $\mu_{DL}$ or $\mu_{UL}$, a value at which $T_{proc,2}$ is greater is followed. $\mu_{DL}$ denotes numerology of downlink at which a PDCCH including DCI for scheduling a PUSCH is transmitted, and $\mu_{UL}$ denotes numerology of uplink at which a PUSCH is transmitted.

$T_c$ denotes a value below:

$$T_C : \frac{1}{\Delta f_{max} \cdot N_f}, \Delta f_{max} = 480 \cdot 10^3 \text{ Hz}, N_f = 4096$$

$d_{2,2}$: When the DCI scheduling PUSCH indicates BWP switching, d2,2 follows the BWP switching time, and otherwise, d2,2 has a value of 0.

Considering the time domain resource mapping information of the PUSCH scheduled through DCI and the timing advance (TA) effect between uplink and downlink, when, from the last symbol of the PDCCH including the DCI scheduled for the PUSCH and after $T_{proc,2}$, the first symbol of the PUSCH starts earlier than the first uplink symbol where the CP starts, the base station and the terminal determine that the PUSCH preparation procedure time is not sufficient. When not, the base station and the terminal determine that the PUSCH preparation procedure time is sufficient. The terminal transmits a PUSCH only when the PUSCH preparation procedure time is sufficient, and when the PUSCH preparation procedure time is insufficient, the terminal may ignore the DCI for scheduling the PUSCH.

Next, repeated PUSCH transmission is described. When the terminal is scheduled for PUSCH transmission in DCI format 0_1 in the PDCCH including the CRC scrambled by C-RNTI, MCS-C-RNTI, or CS-RNTI, and the terminal is configured with higher layer signaling pusch-Agreegation-Factor, the same symbol allocation is applied in consecutive slots as many as pusch-AgreegationFactor, and PUSCH transmission is limited to single rank transmission. For example, the terminal should repeat the same TB in consecutive slots as many as pusch-AgreegationFactor, and apply the same symbol allocation to each slot. Table 37 shows the redundancy version applied to repeated PUSCH transmissions for each slot. When the terminal is scheduled for repeated PUSCH transmission in DCI format 0_1 in a plurality of slots, and at least one symbol among slots, in which PUSCH repeated transmission is performed according to information of higher layer signaling tdd-UL-DL-ConfigurationCommon or tdd-UL-DL-ConfigurationDedicated, is indicated as a downlink symbol, the terminal does not perform PUSCH transmission in a slot in which the corresponding symbol is located.

TABLE 37

| $rv_{id}$ indicated by the DCI scheduling the PUSCH | $rv_{id}$ to be applied to nth transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In addition, with respect to repeated PUSCH transmission, in NR Release 16, additional methods as below may be defined for UL grant-based PUSCH transmission and configured grant-based PUSCH transmission beyond the slot boundary.

Scheme 1 (mini-slot level repetition): Through one UL grant, two or more PUSCH repeated transmissions are scheduled within one slot or beyond the boundary of consecutive slots. Also, for Scheme 1, time domain resource allocation information in DCI indicates a resource of a first repeated transmission. In addition, time domain resource information of the first repeated transmission and time domain resource information of the remaining repeated transmissions may be determined according to an uplink or downlink direction determined for each symbol of each slot. Each repeated transmission occupies consecutive symbols.

Scheme 2 (multi-segment transmission): Two or more repeated PUSCH transmissions are scheduled in consecutive slots through one UL grant. Here, one transmission is designated for each slot, and different start points or repetition lengths may be different for each transmission. Also, in Scheme 2, time domain resource allocation information in DCI indicates a start point and a repetition length of all repeated transmissions. In addition, in the case of performing repeated transmission in a single slot through Scheme 2, when multiple bundles of consecutive uplink symbols exist in the corresponding slot, each repeated transmission is performed for each bundle of uplink symbols. When a bundle of consecutive uplink symbols is uniquely present in the corresponding slot, one PUSCH repeated transmission is performed according to the scheme of NR Release 15.

Scheme 3: Two or more repeated PUSCH transmissions are scheduled in consecutive slots through two or more UL grants. Here, one transmission is designated for each slot, and the n-th UL grant may be received before PUSCH transmission scheduled with the n−1th UL grant ends.

Scheme 4: Through one UL grant or one configured grant, one or several repeated PUSCH transmissions may be supported in a single slot, or two or more repeated PUSCH transmissions may be supported across the boundary of consecutive slots. The number of repetitions indicated by the base station to the terminal is only a nominal value, and the number of repeated PUSCH transmissions actually performed by the terminal may be more than or less than a nominal number of repetitions. The time domain resource allocation information in DCI or in the config red grant refers to a resource of the first repeated transmission indicated by the base station. Time domain resource information of the remaining repeated transmissions may be determined by referring to resource information of at least the first repeated transmission and the uplink or downlink direction of the symbols. When the time domain resource information of the repeated transmission indicated by the base station spans the slot boundary or includes an uplink/downlink switching point, the repeated transmission may be divided into a plurality of repeated transmissions. Here, one repeated transmission may be included for each uplink period in one slot.

Figure 11:
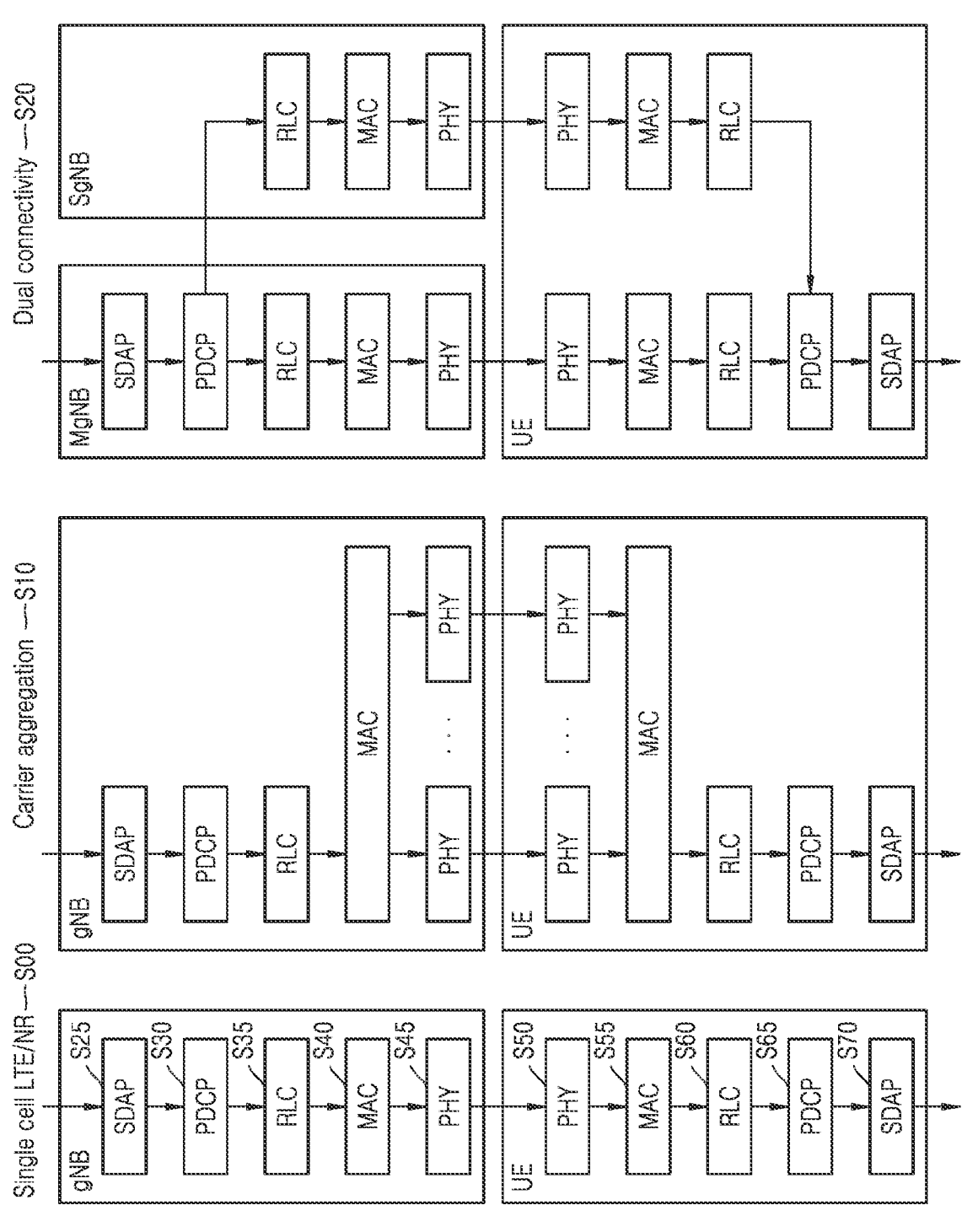
FIG. 11 is a diagram illustrating radio protocol structures of a base station and a terminal when performing single cell, carrier aggregation, and dual connectivity, according to an embodiment of the disclosure.

FIG. 11 is a diagram illustrating radio protocol structures of a base station and a terminal when performing single cell, carrier aggregation, and dual connectivity, according to an embodiment of the disclosure.

Referring to FIG. 11, a radio protocol of a next-generation mobile communication system in each of a terminal and an NR base station is composed of NR Service Data Adaptation Protocol (SDAP) S25 or S70, NR Packet Data Convergence Protocol (PDCP) S30 or S65, NR Radio Link Control (RLC) S35 or S60, and NR MAC Medium Access Control (MAC) S40 or S55.

The major functions of the NR SDAP S25 or S70 may include some of functions below.

Transfer of user plane data

Mapping between a QoS flow and a DRB for both DL an UL

Function of marking QoS flow ID in UL and DL (marking QoS flow ID in both DL and UL packets)

Reflective QoS flow to DRB mapping for the UL SDAP PDUs

With respect to the SDAP layer entity, the terminal may be configured via a RRC message, with information about whether to use a header of the SDAP layer entity or whether to use the function of the SDAP layer entity for each PD P layer entity, for each bearer, or for each logical channel, and when the SDAP header is configured, a NAS QoS reflective configuration 1-bit indicator and an AS QoS reflective configuration 1-bit indicator of the SDAP header may be used to indicate the terminal to update or reconfigure mapping information between a QoS flow and a data bearer for uplink and downlink. The SDAP header may include QoS flow ID information indicating QoS. The QoS information may be used as data processing priority i formation, scheduling information, or the like for supporting a seamless service.

The major functions of the NR PDCP layer S30 or S65 may include some of functions below.

Header compression and decompression function (Header compression and decompression: ROHC only)

Transfer of user data

In-sequence delivery of upper layer PDUs

Out-of-sequence delivery of upper layer PDUs

Reordering function (PDCP PDU reordering for reception)

Duplicate detection function (Duplicate detection of lower layer SDUs)

Retransmission function (Retransmission of PDCP SDUs)

Ciphering and deciphering function

Timer-based SDU discard in uplink The reordering of the NR PDCP entity refers to a function of reordering PDCP PDUs received from a lower layer in order based on a PDCP sequence number (SN), and may include a function of delivering data to a higher layer in the reordering order or a function of immediately delivering the data to the higher layer without considering an order, a function of recording missing PDCP PDUs by reordering the PDCP PDUs, a function of reporting a state of the missing PDCP PDUs to a transmitting side, and a function of requesting retransmission of the missing PDCP PDUs.

The major functions of the NR RLC layer S35 or S60 may include some of functions below.

Data transfer function (Transfer of upper layer PDUs)

In-sequence delivery of upper layer PDUs

Out-of-sequence delivery of upper layer PDUs

ARQ function (Error correction through ARQ)

Concatenation, segmentation, and reassembly function (Concatenation, segmentation and reassembly of RLC SDUs)

Re-segmentation function (Re-segmentation of RLC data PDUs)

Reordering function (Reordering of RLC data PDUs)

Duplicate detection function

Error detection function (Protocol error detection)

RLC SDU discard function

RLC re-establishment function

The in-sequence delivery function of the NR RLC entity S35 or S60 refers to a function of delivering RLC SDUs received from a lower layer to a higher layer in order. The in-sequence delivery function of the NR RLC entity may include a function of reassembling the RLC SDUs and delivering the reassembled RLC SDU when a plurality of RLC SDUs segmented from one RLC SDU are received, a function of reordering received RLC PDUs on an RLC SN or PDCP SN basis, a function of recording missing RLC PDUs by reordering the received RLC PDUs, a function of reporting status information of the missing RLC PDUs to a transmitting side, a function of requesting retransmission of the missing RLC PDUs, a function of delivering only RLC SDUs prior to a missing RLC SDU, to a higher layer in order when the missing RLC SDU exists, or a function of delivering all RLC SDUs received before a timer starts, to a higher layer in order although a missing RLC SDU exists when a certain timer expires, or a function of delivering only RLC SDUs prior to a missing RLC SDU, to a higher layer in order even when a missing RLC SDU exists, or a function of delivering all RLC SDUs received up to a current time, to a higher layer in order, even when a missing RLC SDU exists, when a certain timer is expired. Furthermore, the out-of-sequence delivery function of the NR RLC entity may process the RLC PDUs in order of reception and deliver the RLC PDUs to the NR PDCP entity regardless of SNs (out-of-sequence delivery), and when a received RLC PDU is a segment, the NR RLC entity may reassemble the segment with other segments stored in a buffer or subsequently received, into a whole RLC PDU and may transmit the RLC PDU to the NR PDCP entity. The NR RLC layer may not include the concatenation function, and the above function may be performed by the NR MAC layer, or may be replaced with the multiplexing function of the NR MAC layer.

The out-of-sequence delivery of the NR RLC entity S35 or S60 refers to a function of immediately delivering RLC SDUs received from a lower layer, to a higher layer out of an order, and may include a function of reassembling and delivering RLC SDUs, when a single RLC SDU is segmented into a plurality of RLC SDUs and received, and a function of storing RLC SNs or PDCP SNs of received RLC PDUs and recording missing RLC PDUs by aligning the received RLC PDUs in order.

The NR MAC layer S40 or S55 may be connected to several NR RLC layer entities configured in a terminal, and the major functions of the NR MAC layer may include some of functions below.

Mapping function (Mapping between logical channels and transport channels)

Multiplexing and demultiplexing function (Multiplexing/demultiplexing of MAC SDUs)

Scheduling information reporting function (Scheduling information reporting)

HARQ function (Error correction through HARQ)

Function of handling priority between logical channels (Priority handling between logical channels of one UE)

Function of handling priority between UEs (Priority handling between UEs by means of dynamic scheduling)

MBMS service identifying function (MBMS service identification)

Transport format selecting function (Transport format selection)

Padding function (Padding)

The NR PHY layer S45 or S50 may perform channel coding or modulation on higher layer data and convert the same into an OFDM symbol and transmit the OFDM symbol to a radio channel, or demodulate an OFDM symbol received via a radio channel and perform channel decoding on the demodulated OFDM symbol and transfer the channel-decoded OFDM symbol to a higher layer.

The detailed structure of the radio protocol structure may be variously changed according to a carrier (or cell) operating method. For example, when the base station transmits data to the terminal based on a single carrier (or cell), the base station and the terminal use a protocol structure having a single structure for each layer, such as S00. On the other hand, when the base station transmits data to the terminal based on CA (carrier aggregation) using multiple carriers in a single TRP, the base station and the terminal have a single structure up to RLC like S10, but a proto of for multiplexing the PHY layer through the MAC layer structure is used. As another example, when the base station transmits data to the terminal based on dual connectivity (DL) by using multiple carriers from multiple TRPs, the base station and the terminal have a single structure up to RLC like S20, but a protocol structure for multiplexing a PHY layer through the MAC layer is used.

Figure 12:
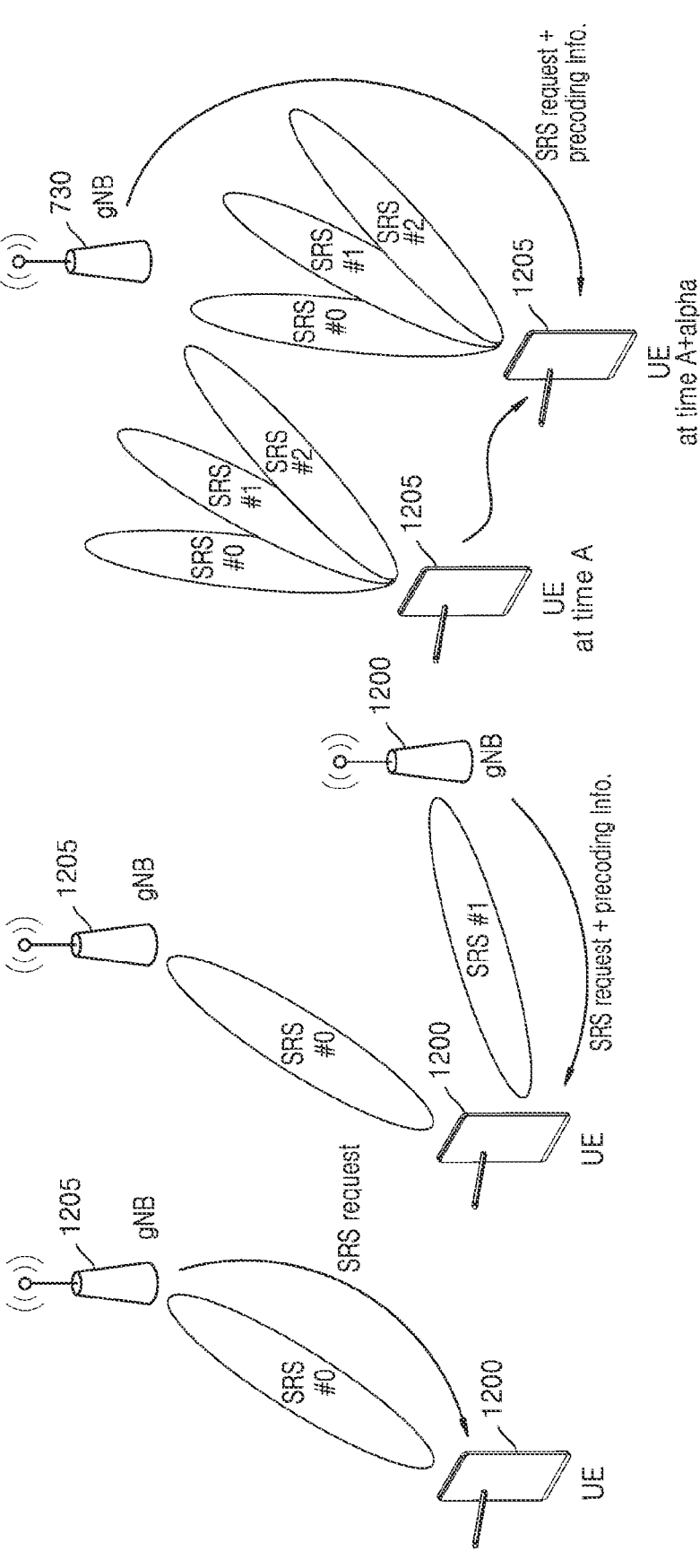
FIG. 12 is a diagram illustrating an example of various operation scenarios of an SRS according to an embodiment of the disclosure.

FIG. 12 is a diagram illustrating examples of various operating scenarios of SRS. Referring to FIG. 12, it is possible to consider at least the following three SRS operation scenarios in an NR system.

1) A base station 1205 configures a beam in one director to a terminal 1200 (in this specification, to set a beam/precoding in one direction includes not applying beam/precoding or applying a wide beam (cell-coverage or sector coverage), and the terminal 1200 transmits an SRS according to the transmission period and offset of the SRS in the case of periodic SRS or semi-persistent SRS, and transmits an SRS according to the SRS request of the base station in the case of aperiodic SRS (a time determined after the SRS request). Here, additional information for beam/precoding is not required for the SRSs.

2) Base stations 1175 and 1220 may set beams for the terminal 1170 in one or more directions, and a terminal 1170 may transmit a plurality of SRS beamformed in the one or more directions. For example, as shown in FIG. 12, it is possible to set SRS resource (or port) #0 to be beamformed to the base station 1175 and SRS resource (or port) #1 to be beamformed to the base station 1220. In this case, the base stations 1175 and 1220 need to inform not only an SRS request but also the SRS beam/precoding information, unlike the scheme 1) described above.

3) A base station 1230 may set beams for a terminal 1225 in one or more directions, and the terminal 1225 may transmit a plurality of SRS beamformed in the one or more directions. For example, referring to FIG. 12, the base station 1230 may configure the terminal 1225 to transmit an SRS by applying different beam/precoding to SRS resource (or port) #0, SRS resource (or port) #1, SRS resource(o port) #2. According to the above, even when the terminal 1225 has high mobility, stable communication may be performed through beam/precoder diversity. For example, the terminal 1225 may provide channel status information to the base station 1230 via SRS #2 at time A, and may provide channel status information to the base station 1230 via SRS #0 at time A+alpha. In this case, the base station 1230 needs to inform not only the SRS request but also the SRS beam/precoding information, unlike the scheme 1) described above.

Although described above based on SRS transmission, similarly, it is possible to extend to other UL channel/RS transmissions such as PRACH, PUSCH, and PUCCH, and detailed descriptions of all cases are omitted so as not to obscure the gist of the disclosure.

In the NR system, two measurement methods are supported to measure cross-link interference (CLI) between terminals. The first method is SRS-Reference Signal Received Power (SRS-RSRP that measures Reference Signal Received Power (RSRP) from SRS. The second method is a Cross Link Interference Received Signal Strength Indicator (CLI-RSSI) for measuring the reception power of interference in a specific resource. When the terminal measures SRS-RSRP, the terminal may receive SRS measurement configuration information similar to SRS transmission configuration information from the serving base station.

Figure 13:
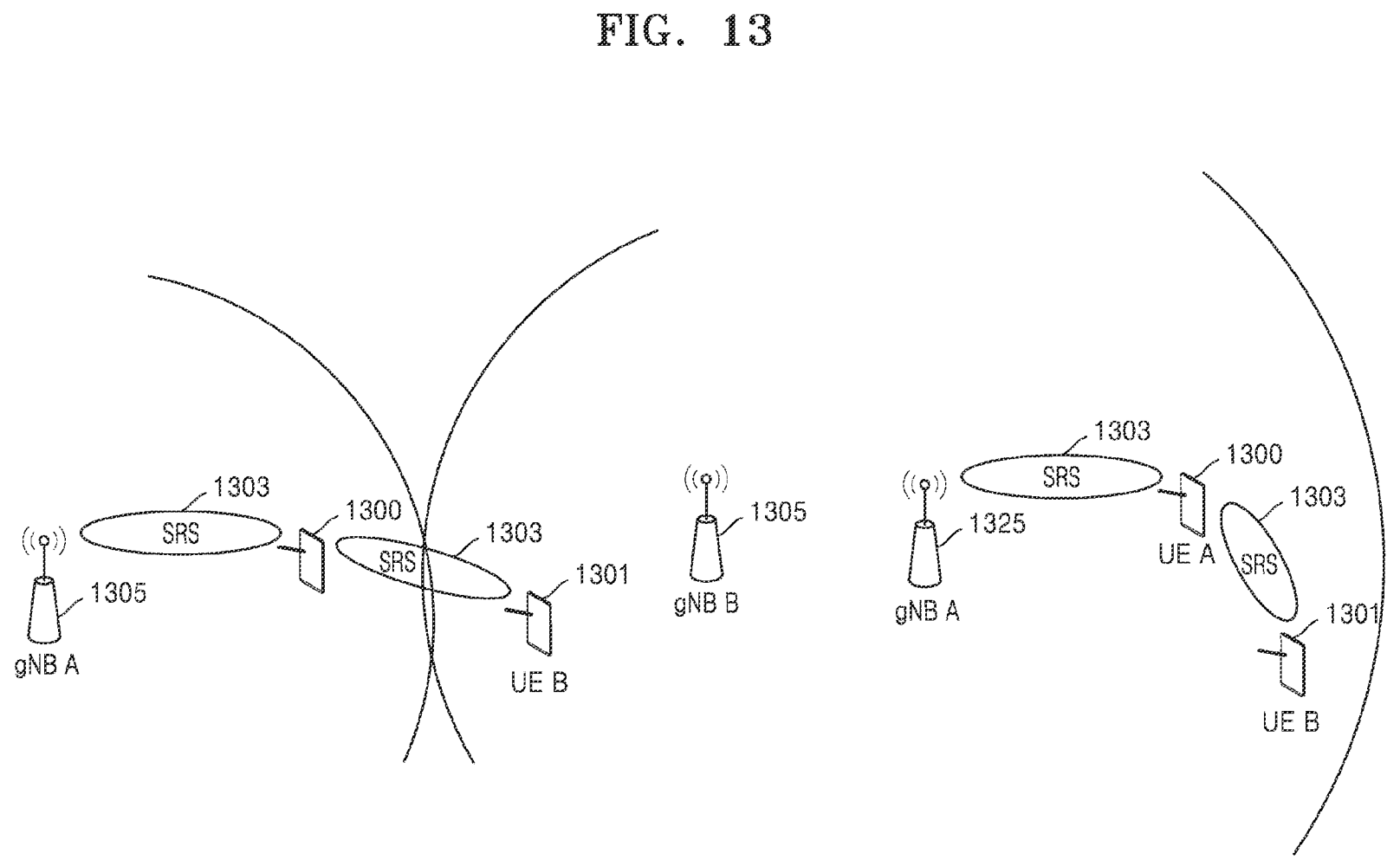

FIG. 13 is a diagram illustrating examples of cross-link interference measurement scenario according to an embodiment of the disclosure.

Referring to FIG. 13, it is possible to consider at least two SRS interference measurement scenarios below in an NR system.

1) The first scenario is a scenario for measuring SRS interference between adjacent terminals in different cells. In detail, a terminal A 1300 and a terminal B 1301 connected to two different base stations 1305 and 1315, respectively, in a situation where the two different base stations 1305 and 1315 exist are considered. The terminal A 1300 is connected to the base station A 1305, and the terminal B 1301 is connected to the base station B 1315. Here, the base station A 1305 may configure with a higher layer signal or indicate by a physical signal such that the terminal A 1300 transmits an SRS 1303, and the terminal A 1300 may receive a configuration or indication from the base station A 1305 and transmit the SRS 1303. The base station B 1315 may configure for the terminal 1301, via a higher layer signal, to measure CLI through receptor of the SRS 1303, and the terminal B 1301 may receive from the base station B 1315 a configuration regarding SRS measurement and measure the SRS 1303 transmitted by the terminal A 1300. The terminal B 1301 may measure the SRS 1303 and report a measurement result of the SRS 1303 to the base station B 1315. Information necessary for a measurement result report, for example, information including at least a transmission resource and a transmission time, may be received by the terminal B 1301 from the base station B 1315 through a higher layer signal in advance.

2) The second scenario is a scenario for measuring SRS interference between adjacent terminals in one cell. In detail, a terminal A 1310 and a terminal B 1311 connected to one a base station 1325 are considered. The terminal A 1310 is connected to the base station A 1325, and the terminal B 1311 is also connected to the base station A 1325. Here, the base station A 1325 may configure with a higher layer signal or indicate by a physical signal such that the terminal A 1310 transmits an SRS 1313, and the terminal A 1300 may receive a configuration or indication from the base station A 1305 and transmit the SRS 1313. The base station B 1325 may configure for the terminal 1311, via a higher layer signal, to measure CLI through reception of the SRS 1313, and the terminal B 1311 may receive from the base station B 1325 a configuration regarding SRS measurement and measure the SRS 1313 transmitted by the terminal A 1310. The terminal B 1311 may measure the SRS 1313 and report a measurement result of the SRS 1313 to the base station A 1325. Information necessary for a measurement result report, for example, information including at least a transmission resource and a transmission time, may be received by the terminal B 1311 from the base station A 1325 through a higher layer signal in advance.

In the disclosure, cross-link interference may be referred to as cross-link interference, CLI, uplink signal measurement of a terminal, or other various terms.

In the NR system, the terminal may be configured with information about a frequency axis start position and a width of a downlink bandwidth part, information about a frequency axis start position and a width of an uplink bandwidth part, information about a frequency axis start position and a width of an uplink reference signal such as SRS (sounding reference signal), information about a frequency axis start position and a width of an uplink channel such as PUCCH or PUSCH, independently through a higher layer, or may be indicated about the above information by L1 signaling.

When the terminal measures cross-link interference, when some pieces of the "information about the frequency axis start position and width of the downlink bandwidth part", "information about the frequency axis start position and the width of the uplink bandwidth part", "information about the frequency axis start position and the width for an uplink reference signal such as SRS (sounding reference signal)" and "information about the frequency axis start position and the width of an uplink channel such as PUCCH or PUSCH" do not match, the accuracy of cross-link interference measurement may be affected. In particular, the NR system supports dynamic change (BWP switching) for a downlink bandwidth part and an uplink bandwidth part, and thus, the accuracy of cross-link interference measurement may not be uniform.

In determining whether cooperative communication is applied, the terminal may use various methods in which PDCCH(s) for allocating PDSC to which cooperative communication is applied has a specific format, or PDCCH(s) for allocating PDSCH to which cooperative communication is applied include a particular indicator indicating whether cooperative communication is applied, or whether PDCCH(s) for allocating a PDSCH to which cooperative communication is applied is scrambled by a particular RNTI, or application of cooperative communication is assumed in a certain period indicated by a higher layer. Hereinafter, for convenience of description, a case in which a terminal receives a PDSCH to which cooperative communication is applied based on conditions similar to the above will be referred to as an NC-JT case.

Hereinafter, in the disclosure, determining a priority between A and B means selecting one having a higher priority according to a predefined priority rule and performing a corresponding operation or omitting or dropping an operation on one having a lower priority.

Figure 14:
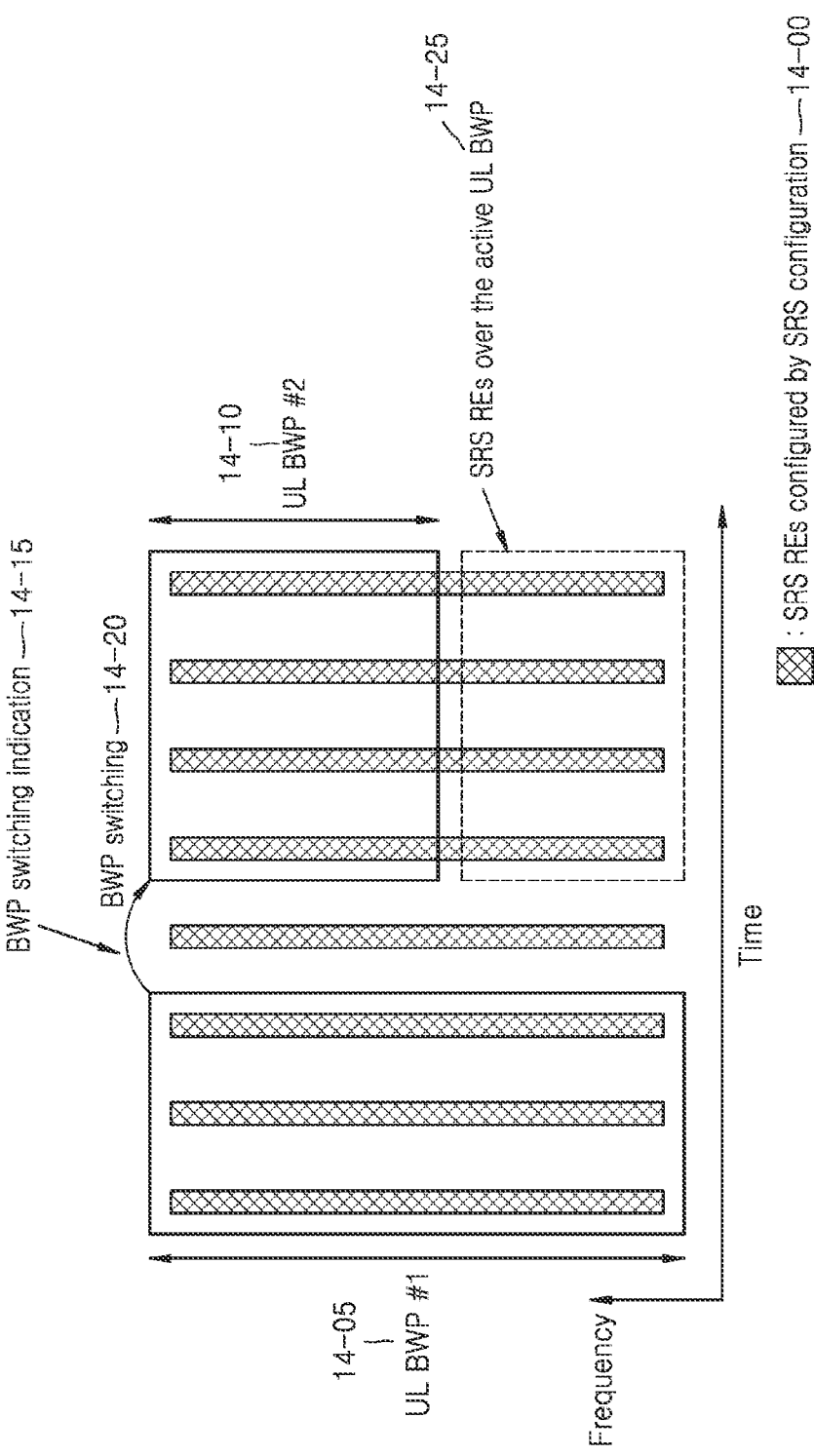
FIG. 14 is a diagram illustrating an example of switching of a reference signal transmission band due to a switch in an uplink bandwidth part, according to an embodiment of the disclosure.

FIG. 14 is a diagram illustrating an example of switching of a reference signal transmission band due to a switch in an uplink bandwidth part, according to an embodiment of the disclosure.

Referring to FIG. 14, a base station may configure for a terminal an uplink bandwidth part #1 14-05 and an uplink bandwidth part #2 14-10 which have different bandwidth parts from each other. In this case, the base station may additionally configure an uplink reference signal or channel such as SRS (14-00) to the terminal separately from the bandwidth part configuration. When the base station indicates to switch the bandwidth part from the uplink bandwidth part #1 having a wider bandwidth to the uplink bandwidth part #2 having a narrower bandwidth (14-15), the terminal performs the switch in the bandwidth part for a given time according to the base starting indication (14-20). Meanwhile, as the terminal is stipulated not to transmit an uplink reference signal or channel in a frequency band other than the currently used uplink bandwidth part (active UL BWP), frequency resources not included in uplink bandwidth part #2 after performing the bandwidth change (14-25), the uplink reference signal or channel is not transmitted regardless of the configuration.

In this case, when a certain terminal performs cross-link interference measurement depending only on the uplink reference signal or channel configuration, it may imply that the change in the actual uplink transmission resource due to the active UL BWP switch of the terminal which transmits the uplink reference signal or channel may not be recognized. This may cause a decrease in the cross-link interference measurement accuracy in the corresponding situation.

Figure 15:
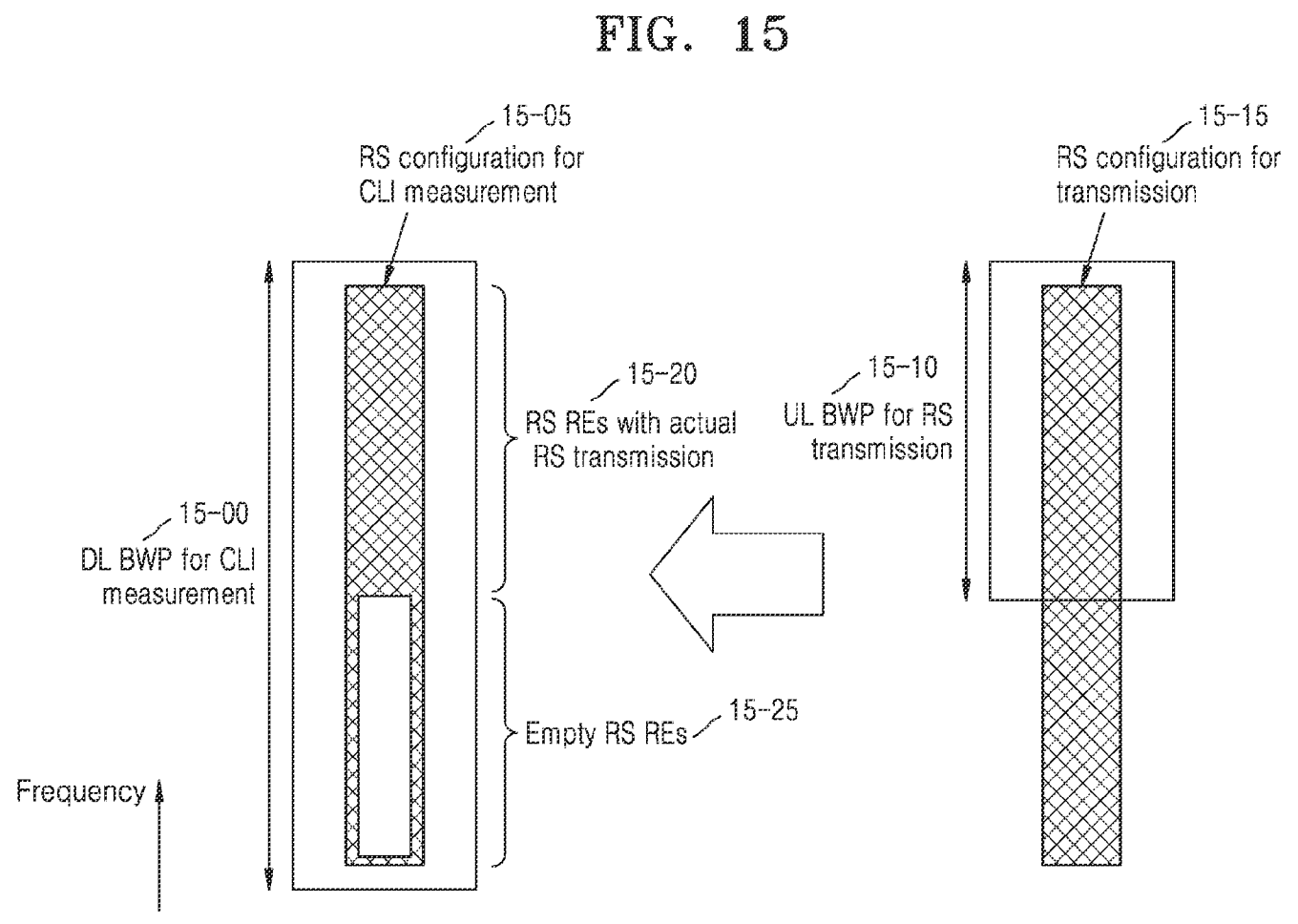

FIG. 15 is a diagram illustrating an example of a decrease in accuracy of cross-link interference measurement due to mismatch in bandwidths between uplink and downlink, according to an embodiment of the disclosure.

Referring to FIG. 15, a base station may configure, for a terminal, which is to measure cross-link interference, one or more downlink bandwidth parts (15-00) and uplink reference signal or channel information including resource information (RE location information, etc.) for measuring cross-link interference (15-05). In addition, according to one of the scenarios described above, the same or another base station may configure, for a terminal, which is to transmit an uplink signal or channel to be used for cross-link interference measurement, one or more uplink bandwidth parts (15-10) and an uplink signal or channel to be used in measurement of cross-link interference (15-15). Here, when a width of the uplink bandwidth part of the terminal transmitting an uplink signal or channel for cross-link interference measurement (15-10) is narrower than a width of a downlink bandwidth part of the terminal performing cross-link interference measurement (15-00), the cross-link interference measurement resource 15-05 received by the terminal performing cross-link interference measurement is divided into REs 15-20 through which an actual uplink signal or channel is transmitted and REs 15-25 which are configured but through which actual uplink signals or channels are not transmitted. The terminal performing the cross-link interference measurement may use a REs included in the cross-link interference measurement resource configuration (15-05) for a cross-link interference report without restrictions, and thus, the base station and the terminal which receive the cross-link interference report may not obtain selective information about the part 15-20 in which actual uplink transmission is included.

The cross-link interference measurement resource includes the time and frequency position of the PRB, the time and frequency position of the RE, etc. indicated by SRS configuration included or associated with SRS-RSRP or CLI-RSSI.

In the description of the disclosure, the cross-link interference report includes transmission of uplink control information (UCI) according to a configuration or indication such as SRS-RSRP or CLI-RSSI.

In the description of the disclosure, L1 filtering for cross-link interference measurement collectively refers to single measurement-based (one shot estimation, single estimation occasion) cross-link interference measurement is indicated by L1 signaling such as DCI or is activated by L2 signaling such as MAC CE.

In the description of the disclosure, L3 filtering for cross-link interference measurement collectively refers to multi-measurement-based cross-link Interference measurement (multi-shot estimation, multiple estimation occasions) that is activated by L2 signaling such as MAC CE or is configured and performed by L3 signaling such as RRC. Here, when performing multiple measurements, the terminal may calculate a cross-link interference report value by applying filter coefficients provided by L3 signaling such as RRC to each measurement value.

First Embodiment: L1 Filtering for CLI
Measurement

In a first embodiment, a cross-link interference measurement method based on L1 filtering is provided.

According to the first embodiment, the base station may indicate the terminal to perform single measurement-based (one shot estimation, single estimation occasion) cross-link interference measurement through L1 signaling such as DCI or activate it through L2 signaling such as MAC CE. Here, the terminal may be guaranteed to measure L1 cross-link interference of a smaller number than a certain number (e.g., a fixed value such as 1, 2, or 4, or a value set separately such as the number of L3 cross-link interference measurements via a higher layer) according to UE capability signaling or a predetermined agreement.

Here, the terminal may be additionally indicated from the base station through DCI, MAC CE, RRC, etc. about the bandwidth part for performing cross-link interference measurement independently of the applied downlink bandwidth part (active DL BWP).

Second Embodiment: BWP Assumption Method for
CLI Measurement

In a second embodiment, bandwidth part assumption methods for cross-link interference measurement and reporting are provided.

In order to solve a bandwidth mismatch problem between transmitting and receiving ends, which may occur during cross-link interference measurement, it is possible to limit the measurement band by one of the following methods when the terminal performs cross-link interference measurement and reporting.

1) The terminal may be limited to measure cross-link interference within a currently applied downlink bandwidth part (active DL BWP).

2) The terminal may be limited to measure cross-link interference within a bandwidth part having a smallest (or widest) band among the configured uplink bandwidth parts. In this case, a portion of the cross-link interference measurement band outside the downlink bandwidth part (active DL BWP) currently applied by the terminal is excluded from measurement and reporting.

3) The terminal may be limited to measure cross-link interference within an uplink bandwidth part configured as the initial UL BWP. Here, a portion of the cross-link interference measurement band outside the downlink bandwidth part (active DL BWP) currently applied by the terminal is excluded from measurement and reporting.

4) The terminal may be limited to measure cross-link interference within an uplink bandwidth part configured as default UL BWP. Here, a portion of the cross-link interference measurement band outside the downlink bandwidth part (active DL BWP) currently applied by the terminal is excluded from measurement and reporting.

5) The terminal may be independently configured with a bandwidth part (or band information) for the purpose of at least one cross-link interference measurement. Here, a portion of the cross-link interference measurement band outside the downlink bandwidth part (active DL BWP) currently applied by the terminal is excluded from measurement and reporting. When the base station has configured for a terminal with a bandwidth part (or band information) for at least one cross-link interference measurement, the base station may notify the terminal of whether to follow a preset agreement or order or which bandwidth part (band information) is to be used, through L1 signaling.

<Third Embodiment: Multiple SRS Configuration
for CLI Measurement Per BWP

In a third embodiment, a method of improving an uplink signal (SRS, etc.) or channel configuration for cross-link interference measurement and reporting is provided.

In order to solve a bandwidth mismatch problem between transmitting and receiving ends, which may occur during cross-link interference measurement, the base station may configure for the terminal a plurality of signals or channel information for cross-link interference measurement. The base station may configure one or more SRS configurations to be associated with SRS-RSRP or CLI-RSSI report in order to increase the accuracy of the SRS-RSRP or CLI-RSSI report. Next, the base station 1) may enable the terminal, which measures cross-link interference, to select one of the plurality of SRSs for cross-link interference measurement, configured above implicitly by active DL BWP or active UL BWP index, etc., or 2) may enable the terminal to select one the plurality of SRSs for cross-link interference measurement, configured above explicitly by L1 signaling such as DCI or by L2 signaling such as MAC CE.

Fourth Embodiment: Subband Reporting for CLI-RSRP

In a fourth embodiment, a method of improving SRS-RSRP or CLI-RSSI report configuration for cross-link interference measurement and reporting is provided.

In order to solve a bandwidth mismatch problem between transmitting and receiving ends, which may occur during cross-link interference measurement, the base station may be configured to report subband SRS-RSRP or CLI-RSSI to the terminal. For example, to increase the accuracy of SRS-RSRP or CLI-RSSI reporting, the base station may divide an SRS transmission band for cross-link interference measurement (or another transmission band of uplink signal/channel for cross-link interference measurement) into one or more subbands and configure to perform SRS-RSRP or CLI-RSSI reporting of different values for each of the subbands. After receiving a plurality of SRS-RSRP or CLI-RSSI values, the base station may determine a period of cross-link measurement band mismatch period, and not use a report value in the corresponding subband.

Fifth Embodiment: L1/L2 Signaling for CLI Measurement/update Skipping

In a fifth embodiment, another example of a method of improving SRS-RSRP or CLI-RSSI report configuration for cross-link interference measurement and reporting is provided.

In order to solve a bandwidth mismatch problem between the transmitting and receiving ends, which may occur during cross-link interference measurement, the base station may configure/indicate for a terminal or to the terminal to stop (skip) uplink signal/channel measurement for SRS-RSRP or CLI-RSSI in a specific time or frequency period or not to use a measurement value in the corresponding period, for SRS-RSRP or CLI-RSSI update. For example, the base station may notify the terminal of information (pattern) about time/frequency resources through higher layer signaling, or indicate the terminal to stop measuring cross-link interference through L1 signaling, and after receiving the corresponding indication, the terminal may apply a certain time/frequency offset and stop (skip) uplink signal/channel measurement for SRS-RSRP or CLI-RSSI or may not use a measurement value in the corresponding period, for SRS-RSRP or CLI-RSSI update.

The above-described embodiments may not be independent of each other, and in some cases, different embodiments may be applied. For example, when measuring L3 filtering-based cross-link interference, Embodiment 1 may bF applied, and when measuring L1 filtering-based cross-link interference, Embodiment 5 may be applied.

Figure 16:
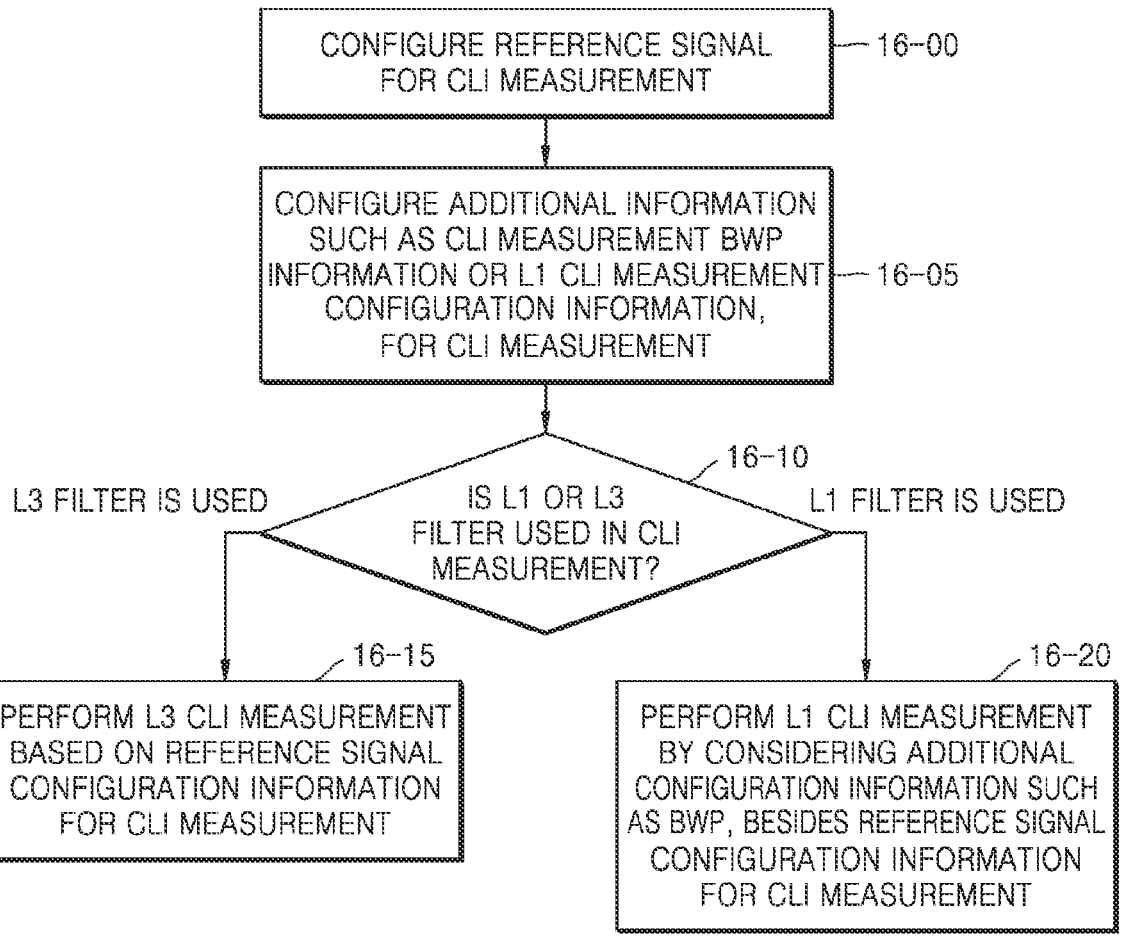
FIG. 16 is a diagram illustrating a cross-link interference measurement and reporting procedure according to an embodiment of the disclosure.

FIG. 16 is a diagram illustrating a cross-link interference measurement and reporting procedure according to an embodiment of the disclosure.

Referring to FIG. 16, a base station may configure for a terminal a reference signal, an uplink signal or a channel for cross-link interference measurement (16-00). The base station may additionally configure for the terminal additional information such as bandwidth part information (or band information), L1 filtering-based cross-link interference measurement information or the like, for cross-link interference measurement (16-05). Next, the terminal determines whether an 1L filter or an L3 filter is used in cross-link interference measurement (16-10). When an L3 filter is used, the terminal measures cross-link interference based on reference signal configuration information for cross-link interference measurement (16-00) and performs a report (16-15). When an L1 filter is used, besides the reference signal configuration information for cross-link interference measurement (16-00), the terminal may measure cross-link interference and report (16-20) by additionally considering additional information such as bandwidth part information (or band information), L1 filtering-based cross-link interference measurement information for cross-link interference measurement (16-05).

Figure 17:
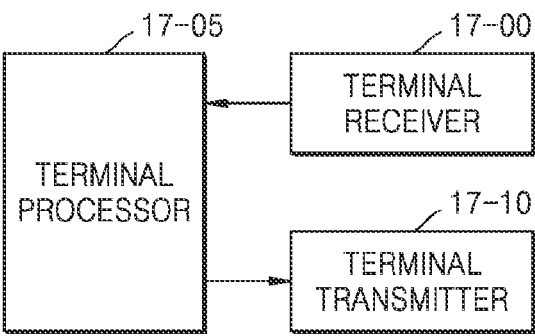
FIG. 17 illustrates a structure of a terminal in a wireless communication system according to an embodiment of the disclosure.

FIG. 17 illustrates a structure of a terminal in a wireless communication system according to an embodiment of the disclosure.

Referring to FIG. 17, the terminal may include a terminal receiver 17-00, a terminal transmitter 17-10, and a terminal processor (controller) 17-05.

The terminal receiver 17-00 and the terminal transmitter 17-10 may be together referred to as a transceiver. According to the communication method of the terminal described above, the terminal receiver 17-00, the terminal transmitter 17-10, and the terminal processor 17-05 of the terminal may operate. However, elements of the terminal are not limited thereto. For example, the terminal may include More or fewer elements (for example, a memory) than the described ones. Moreover, the terminal receiver 17-00, the terminal transmitter 17-10, and the terminal processor 17-05 may be implemented as one chip.

The terminal receiver 17-00 and the terminal transmitter 17-10 (or, a transceiver) may transmit or receive a signal to or from a base station. The sig al may include control information and data. In this regard, the transceiver may include an RF transmitter for up-converting and amplifying a frequency of a transmitted signal, and an RF receiver for amplifying low-noise and down-converting a frequency of a received signal. However, this is only an example of the transceiver and elements of the transceiver are not limited to the RF transmitter and the RF receiver.

Furthermore, the transceiver may receive a signal through a wireless channel and output the signal to the terminal processor 17-05, and may transmit a signal output from the terminal processor 17-05 through the wireless channel.

The memory (not shown) may store a program and data required for an operation of the terminal. Furthermore, the memory may store control information or data included in a signal obtained by the terminal. The memory may include a storage medium such as ROM, RAM, hard disk, CD-ROM, and DVD, or any combination thereof.

The terminal processor 17-05 may control a series of processes so that the terminal operates according to the above embodiments of the disclosure. The terminal processor 17-05 may be implemented as a controller or one or more processors.

Figure 18:
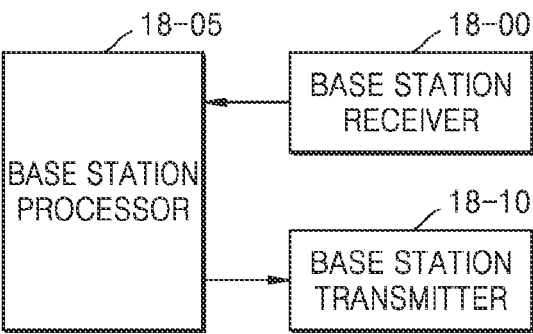
FIG. 18 illustrates a structure of a base station in a wireless communication system according to an embodiment of the disclosure.

FIG. 18 illustrates a structure of a base station in a wireless communication system according to an embodiment of the disclosure.

FIG. 18 is a block diagram of a structure of a base station in a wireless communication system according to an embodiment of the disclosure.

Referring to FIG. 18, the base station may include a base station receiver 18-00, a base station transmitter 18-10, and a base station processor (controller) 18-05.

The base station receiver 18-00 and the base station transmitter 18-10 may be together referred to as a transceiver. According to the communication method of the base station described above, the base station receiver 18-00, the base station transmitter 18-10, and the base station processor 18-05 of the base station may operate. However, elements of the base station are not limited thereto. For example, the base station may include more or fewer elements (for example, a memory) than the described ones. Moreover, the base station receiver 18-00, the base station transmitter 18-10, and the base station processor 18-05 may be implemented as one chip.

The base station receiver 18-00 and the base station transmitter 18-10 (or a transceiver) may transmit or receive a signal to or from a terminal. The signal may include control information and data. In this regard, the transceiver may include an RF transmitter for up-converting and amplifying a frequency of a transmitted signal, and an RF receiver for amplifying low-noise and down-converting a frequency of a received signal. However, this is only an example of the transceiver and elements of the transceiver are not limited to the RF transmitter and the RF receiver.

Furthermore, the transceiver may receive a signal through a wireless channel and output the signal to the base station processor 18-05, and may transmit a signal output from the base station processor 18-05 through the wireless channel.

The memory (not shown) may store a program and data required for an operation of the base station. Furthermore, the memory may store control information or data included in a signal obtained by the base station. The memory may include a storage medium such as ROM, RAM, hard disk, CD-ROM, and DVD, or any combination thereof.

The base station processor 18-05 may control a series of processes so that the base station operates according to the above embodiments of the disclosure. Also, the base station processor 18-05 may be implemented as a controller or one or more processors.

The methods according to the embodiments of the disclosure as described herein or in the following claims may be implemented as hardware, software, or a combination of hardware and software.

When implemented in software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described in the claims and the specification.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device, accessible through any or a combination of communication networks such as the Internet, an intranet, a local area network (LAN), a wide LAN (WLAN), and storage area network (SAN). Such a storage device may access the electronic device via an external port. Furthermore, an additional storage device on a communication network may access a device that performs the embodiments of the disclosure.

In the embodiments of the disclosure described above, an element or elements included in the disclosure are expressed in a singular or plural form depending on the described embodiments of the disclosure. However, the singular or plural form is selected properly for a situation assumed for convenience of description and does not limit the disclosure, and elements expressed in a plural form may include a single element and an element expressed in a singular form may include a plurality of elements.

Meanwhile, the embodiments disclosed in the specification and drawings are merely presented to easily describe the technical content of the disclosure and help understanding of the disclosure, and are not intended to limit the scope of the disclosure. That is, it will be obvious to one of ordinary skill in the art to which the disclosure belongs that different modifications may be achieved based on the technical spirit of the disclosure. Also, when necessary, the above respective embodiments may be employed in combination. For example, a base station and a terminal may be operated in a manner that portions of an embodiment of the disclosure are combined with portions of another embodiment of the disclosure. For example, a base station aid a terminal may be operated in a manner that portions of a first embodiment of the disclosure are combined with portions of a second embodiment of the disclosure. Also, although the embodiments are described based on FDD LTE systems, modifications based on the technical scope of the embodiments may be applied to other communication syst ms such as TDD LTE system, 5G or NR systems, or the like.

In the drawings for explaining the method of the disclosure, the order of description does not necessarily correspond to the order of execution, and the precedence relationship between the operations of the method may be changed or the operations may be executed in parallel.

Alternatively, some elements may be omitted and only some elements may be included in the drawings for explaining the method of the disclosure without impairing the gist of the disclosure.

Also, parts or all of the descriptions included in each of the embodiments of the method of the disclosure may be performed in combination without departing from the gist of the disclosure.

The invention claimed is:

1. An operating method of a first terminal in a wireless communication system, the operating method comprising:

receiving, from a base station, at least one configuration information associated with a reference signal for measuring cross-link interference (CLI);

selecting a measurement band based on the at least one configuration information in case that an uplink bandwidth part of a second terminal and an active downlink bandwidth part of the first terminal are different from each other;

measuring CLI through the reference signal based on the measurement band excluding a portion outside the active downlink bandwidth part of the first terminal; and reporting a result of the measuring, to the base station.

2. The operating method of claim 1, further comprising determining a bandwidth for measuring the CLI among the active downlink bandwidth part, wherein the CLI is determined based on a reference signal measured at the determined bandwidth.

3. The operating method of claim 2, wherein the determined bandwidth corresponds to, from among the uplink bandwidth, at least one of a narrowest bandwidth, a part configured as an initial uplink bandwidth, a part configured as a default uplink bandwidth part, or a part configured by the base station.

4. The method of claim 1, wherein the reporting of the result of the measuring comprises dividing the active downlink bandwidth part into subbands and reporting the result of the measuring, based on the subbands, and wherein the CLI is determined based on a reference signal measured in a subband in which the uplink bandwidth and the active downlink bandwidth part match each other, from among the reference signal.

5. The method of claim 1, further comprising receiving, from the base station, an indication about whether to stop measurement of the CLI through higher layer signaling, wherein the CLI is determined according to a reference signal measured based on the indication.

6. The method of claim 1, wherein the CLI is measured according to a configuration according to layer 1 signaling or layer 3 signaling.

7. A first terminal in a wireless communication system, the first terminal comprising:

a transceiver; and at least one processor connected to the transceiver, wherein the at least one processor is configured to:

receive, from a base station, at least one configuration information associated with a reference signal for measuring cross-link interference (CLI), select a measurement band based on of the at least one configuration information in case that an uplink bandwidth part of a second terminal and an active downlink bandwidth part of the first terminal are different from each other, measure CLI through the reference signal based on the measurement band excluding a portion outside the active downlink bandwidth part of the first terminal, and report a result of the measuring, to the base station.

8. The first terminal of claim 7, wherein the at least one processor is further configured to determine a bandwidth for measuring the CLI from among the active downlink bandwidth part, and wherein the CLI is determined based on a reference signal measured at the determined bandwidth.

9. The first terminal of claim 8, wherein the determined bandwidth corresponds to, from among the uplink bandwidth, at least one of a narrowest bandwidth, a part configured as an initial uplink bandwidth, a part configured as a default uplink bandwidth part, or a part configured by the base station.

10. The first terminal of claim 7, wherein the at least one processor is further configured to divide the active downlink bandwidth part into subbands and report the result of the measuring, based on the subbands, and the CLI is determined based on a reference signal measured in a subband in which the uplink bandwidth and the active downlink bandwidth part match each other, from among the reference signal.

11. The first terminal of claim 7, wherein the at least one processor receives, from the base station, an indication about whether to stop measurement of the cross-link interference, through higher layer signaling, and the CLI is determined according to a reference signal measured based on the indication.

12. The first terminal of claim 7, wherein the CLI is measured according to a configuration according to layer 1 signaling or layer 3 signaling.

13. An operating method of a base station in a wireless communication system, the operating method comprising:

transmitting, to a first terminal, at least one configuration information associated with a reference signal for measuring cross-link interference (CLI), wherein CLI measured through the reference signal is measured based on the at least one configuration information selected by the first terminal when an uplink bandwidth part of a second terminal and an active downlink bandwidth part of the first terminal are different from each other, and wherein a CLI measurement band excludes a portion outside the active downlink bandwidth part of the first terminal, and receiving a result of measuring, from the first terminal.

14. A base station in a wireless communication system, the base station comprising:

a transceiver; and at least one processor connected to the transceiver, wherein the at least one processor is further configured to:

transmit, to a first terminal, at least one configuration information associated with a reference signal transmitted by a second terminal, wherein cross-link interference (CLI) measured through the reference signal is measured based on the at least one configuration information selected by the first terminal when an uplink bandwidth part of a second terminal and an active downlink bandwidth part of the first terminal are different from each other, and wherein a CLI measurement band excludes a portion outside the active downlink bandwidth part of the first terminal, and receive a result of the measuring, from the first terminal.

15. The base station of claim 14, wherein the CLI is measured according to a configuration according to layer 1 signaling or layer 3 signaling.

* * * * *